(12) United States Patent
Hale

(10) Patent No.: US 7,797,077 B2
(45) Date of Patent: Sep. 14, 2010

(54) SYSTEM AND METHOD FOR MANAGING VENDING INVENTORY

(75) Inventor: Tim Hale, Dublin, CA (US)

(73) Assignee: Redbox Automated Retail, LLC, Oakbrook Terrace, IL (US)

( * ) Notice: Subject to any disclaimer, the term of this patent is extended or adjusted under 35 U.S.C. 154(b) by 488 days.

(21) Appl. No.: 11/408,632

(22) Filed: Apr. 21, 2006

(65) Prior Publication Data

US 2006/0259190 A1 Nov. 16, 2006

Related U.S. Application Data

(60) Provisional application No. 60/674,011, filed on Apr. 22, 2005.

(51) Int. Cl.
*G06F 17/00* (2006.01)
(52) U.S. Cl. .................. 700/236; 221/197; 221/287
(58) Field of Classification Search .................. 700/236; 21/197, 287
See application file for complete search history.

(56) References Cited

U.S. PATENT DOCUMENTS

| | | | |
|---|---|---|---|
| 1,901,243 A | 3/1933 | Horwitt |
| 2,098,697 A | 11/1937 | Vanderput |
| 3,267,436 A | 8/1966 | Etal |
| 3,379,295 A | 4/1968 | Clement |
| 3,622,995 A | 11/1971 | Dilks et al. |
| 3,648,241 A | 3/1972 | Naito et al. |
| 3,824,544 A | 7/1974 | Simjian |
| 3,826,344 A | 7/1974 | Wahlberg |
| 3,831,807 A | 8/1974 | Deaton et al. |
| 3,946,220 A | 3/1976 | Brobeck et al. |
| 3,964,577 A | 6/1976 | Bengtsson |
| 4,043,483 A | 8/1977 | Gore et al. |
| 4,073,368 A | 2/1978 | Mustapick |
| 4,300,040 A | 11/1981 | Gould |
| 4,306,219 A | 12/1981 | Main |
| 4,348,551 A | 9/1982 | Nakatani et al. |

(Continued)

FOREIGN PATENT DOCUMENTS

CA 1236546 5/1988

(Continued)

OTHER PUBLICATIONS

Patent Cooperation Treaty International Search Report Under Article 18 for Application PCT/US05/12563 dated Aug. 10, 2005.

(Continued)

*Primary Examiner*—Gene Crawford
*Assistant Examiner*—Timothy R Waggoner
(74) *Attorney, Agent, or Firm*—James P. Muraff; Neal, Gerber & Eisenberg LLP

(57) ABSTRACT

A system and method for managing vending inventory of digital video discs is provided. A plurality of digital video discs are stored in a plurality of storage compartments, wherein each of the compartments corresponds to a type of digital video disc. An inventory descriptor is generated, wherein the descriptor identifies a set of digital video discs. The inventory descriptor is scanned, causing a conveyor to convey the set of digital video discs from the storage compartments to a vending delivery module. The set of digital video discs is secured within the vending delivery module.

13 Claims, 50 Drawing Sheets

U.S. PATENT DOCUMENTS

| | | | |
|---|---|---|---|
| 4,385,366 A | 5/1983 | Housey, Jr. | |
| 4,388,689 A | 6/1983 | Hayman et al. | |
| 4,396,985 A | 8/1983 | Ohara | |
| 4,414,467 A | 11/1983 | Gould | |
| 4,415,065 A | 11/1983 | Sandstedt | |
| 4,449,186 A | 5/1984 | Kelly et al. | |
| 4,458,802 A | 7/1984 | Maciver | |
| 4,519,522 A | 5/1985 | McElwee | |
| 4,530,067 A | 7/1985 | Dorr | |
| 4,547,851 A | 10/1985 | Kurland | |
| 4,553,222 A | 11/1985 | Kurland et al. | |
| 4,567,359 A | 1/1986 | Lockwood | |
| 4,569,421 A | 2/1986 | Sandstedt | |
| RE32,115 E | 4/1986 | Lockwood et al. | |
| 4,598,810 A | 7/1986 | Shore et al. | |
| 4,649,481 A | 3/1987 | Takahashi | |
| 4,650,977 A | 3/1987 | Couch | |
| 4,668,150 A | 5/1987 | Blumberg | |
| 4,669,596 A | 6/1987 | Capers | |
| 4,675,515 A | 6/1987 | Lucero | |
| 4,706,794 A | 11/1987 | Awane et al. | |
| 4,722,053 A | 1/1988 | Dubno et al. | |
| 4,723,212 A | 2/1988 | Mindrum et al. | |
| 4,734,005 A | 3/1988 | Blumberg | |
| 4,766,548 A | 8/1988 | Cedrone et al. | |
| 4,767,917 A | 8/1988 | Ushikubo | |
| 4,775,935 A | 10/1988 | Yourick | |
| 4,778,983 A | 10/1988 | Ushikubo | |
| 4,789,045 A | 12/1988 | Pugh | |
| 4,789,054 A | 12/1988 | Shore et al. | |
| 4,797,818 A | 1/1989 | Cotter | |
| 4,812,629 A | 3/1989 | O'Neil et al. | |
| 4,812,985 A | 3/1989 | Hambrick et al. | |
| 4,814,592 A | 3/1989 | Bradt et al. | |
| 4,814,985 A | 3/1989 | Swistak | |
| 4,821,917 A | 4/1989 | Brown | |
| 4,825,045 A | 4/1989 | Humble | |
| 4,839,505 A * | 6/1989 | Bradt et al. | 700/236 |
| 4,847,764 A | 7/1989 | Halvorson | |
| 4,858,743 A | 8/1989 | Paraskevakos et al. | |
| 4,860,876 A | 8/1989 | Moore et al. | |
| 4,866,661 A | 9/1989 | de Prins | |
| 4,882,475 A | 11/1989 | Miller et al. | |
| 4,893,705 A | 1/1990 | Brown | |
| 4,893,727 A | 1/1990 | Near | |
| 4,896,024 A * | 1/1990 | Morello et al. | 235/381 |
| 4,903,815 A | 2/1990 | Hirschfeld et al. | |
| 4,915,205 A | 4/1990 | Reid et al. | |
| D308,052 S | 5/1990 | Dardeb et al. | |
| 4,941,841 A | 7/1990 | Darden et al. | |
| 4,945,428 A | 7/1990 | Waldo | |
| 4,947,028 A | 8/1990 | Gorog | |
| 4,959,686 A | 9/1990 | Spallone et al. | |
| 4,967,403 A | 10/1990 | Ogawa et al. | |
| 4,967,906 A * | 11/1990 | Morello et al. | 235/381 |
| 4,982,346 A | 1/1991 | Girouard et al. | |
| 4,991,739 A | 2/1991 | Levasseur | |
| 4,995,498 A | 2/1991 | Menke | |
| 5,007,518 A * | 4/1991 | Crooks et al. | 221/79 |
| 5,012,077 A | 4/1991 | Takano | |
| 5,013,897 A | 5/1991 | Harman et al. | |
| 5,019,699 A | 5/1991 | Koenck | |
| 5,020,958 A | 6/1991 | Tuttobene | |
| 5,028,766 A | 7/1991 | Shah | |
| 5,042,686 A | 8/1991 | Stucki | |
| 5,077,462 A | 12/1991 | Newell et al. | |
| 5,077,607 A | 12/1991 | Johnson et al. | |
| 5,085,308 A | 2/1992 | Wilhelm | |
| 5,088,586 A | 2/1992 | Isobe et al. | |
| 5,091,713 A | 2/1992 | Horne et al. | |
| 5,095,195 A | 3/1992 | Harman et al. | |
| 5,105,069 A | 4/1992 | Hakenewerth | |
| 5,128,862 A | 7/1992 | Mueller | |
| 5,133,441 A | 7/1992 | Brown | |
| 5,139,384 A * | 8/1992 | Tuttobene | 221/88 |
| 5,143,193 A | 9/1992 | Geraci | |
| 5,159,560 A | 10/1992 | Newell et al. | |
| 5,205,436 A | 4/1993 | Savage | |
| 5,206,814 A | 4/1993 | Cahlander et al. | |
| 5,207,784 A | 5/1993 | Schwartzendruber | |
| 5,212,649 A | 5/1993 | Pelletier et al. | |
| 5,235,509 A | 8/1993 | Mueller et al. | |
| RE34,369 E | 9/1993 | Darden et al. | |
| 5,273,183 A | 12/1993 | Tuttobene | |
| 5,313,392 A | 5/1994 | Temma et al. | |
| 5,313,393 A | 5/1994 | Varley | |
| 5,319,705 A | 6/1994 | Halter et al. | |
| 5,323,327 A | 6/1994 | Carmichael et al. | |
| 5,353,219 A | 10/1994 | Mueller et al. | |
| 5,383,111 A | 1/1995 | Homma et al. | |
| 5,385,265 A | 1/1995 | Schlamp | |
| 5,408,417 A | 4/1995 | Wilder | |
| 5,409,092 A | 4/1995 | Itako | |
| 5,418,713 A | 5/1995 | Allen | |
| 5,442,568 A | 8/1995 | Ostendorf et al. | |
| 5,445,295 A | 8/1995 | Brown | |
| 5,450,584 A | 9/1995 | Sekiguchi et al. | |
| 5,450,938 A | 9/1995 | Rademacher | |
| 5,467,892 A | 11/1995 | Schlamp | |
| 5,482,139 A | 1/1996 | Rivalto | |
| 5,484,988 A | 1/1996 | Hills et al. | |
| 5,499,707 A | 3/1996 | Steury | |
| 5,504,675 A | 4/1996 | Cragun et al. | |
| 5,510,979 A | 4/1996 | Moderi et al. | |
| 5,513,116 A | 4/1996 | Buckley et al. | |
| 5,546,316 A | 8/1996 | Buckley et al. | |
| 5,550,746 A | 8/1996 | Jacobs | |
| 5,555,143 A | 9/1996 | Hinnen et al. | |
| 5,559,714 A | 9/1996 | Banks et al. | |
| 5,561,604 A | 10/1996 | Buckley | |
| 5,576,951 A | 11/1996 | Lockwood | |
| 5,594,791 A | 1/1997 | Szalm et al. | |
| 5,615,123 A | 3/1997 | Davidson et al. | |
| 5,633,839 A | 5/1997 | Alexander et al. | |
| 5,637,845 A | 6/1997 | Kolls | |
| 5,644,727 A | 7/1997 | Atkins | |
| 5,647,505 A | 7/1997 | Scott | |
| 5,647,507 A | 7/1997 | Kasper | |
| 5,682,276 A | 10/1997 | Hinnen et al. | |
| 5,694,546 A | 12/1997 | Reisman | |
| 5,699,262 A | 12/1997 | Lang | |
| 5,699,528 A | 12/1997 | Hogan | |
| 5,715,403 A | 2/1998 | Stefik | |
| 5,724,069 A | 3/1998 | Chen | |
| 5,724,521 A | 3/1998 | Dedrick | |
| 5,732,398 A | 3/1998 | Tagawa | |
| 5,734,150 A | 3/1998 | Brown et al. | |
| 5,748,485 A | 5/1998 | Christiansen et al. | |
| 5,754,850 A | 5/1998 | Janssen | |
| 5,761,071 A | 6/1998 | Bernstein et al. | |
| 5,765,142 A | 6/1998 | Allred et al. | |
| 5,768,142 A | 6/1998 | Jacobs | |
| 5,769,269 A | 6/1998 | Peters | |
| 5,777,884 A | 7/1998 | Belka | |
| H1743 H | 8/1998 | Graves | |
| 5,790,677 A | 8/1998 | Fox | |
| 5,806,071 A | 9/1998 | Balderrama et al. | |
| 5,822,216 A | 10/1998 | Satchell, Jr. et al. | |
| 5,822,291 A | 10/1998 | Brindze et al. | |
| 5,831,862 A | 11/1998 | Hetrick et al. | |
| 5,832,503 A | 11/1998 | Malik et al. | |
| 5,850,442 A | 12/1998 | Muftic | |
| 5,870,716 A | 2/1999 | Sugiyama et al. | |
| 5,873,069 A | 2/1999 | Reuhl et al. | |

| Patent No. | Date | Inventor |
|---|---|---|
| 5,875,110 A | 2/1999 | Jacobs |
| 5,884,278 A | 3/1999 | Powell |
| 5,898,594 A | 4/1999 | Leason |
| 5,900,608 A | 5/1999 | Iida |
| 5,905,246 A | 5/1999 | Fajkowski |
| 5,923,016 A | 7/1999 | Fredregill |
| 5,930,771 A | 7/1999 | Stapp |
| 5,934,439 A | 8/1999 | Kanoh et al. |
| 5,936,452 A | 8/1999 | Utsuno |
| 5,938,510 A | 8/1999 | Takahashi et al. |
| 5,941,363 A | 8/1999 | Partyka |
| 5,943,423 A | 8/1999 | Muftic |
| 5,950,173 A | 9/1999 | Perkowski |
| 5,954,797 A | 9/1999 | Sidey |
| 5,956,694 A | 9/1999 | Powell |
| 5,959,869 A | 9/1999 | Miller et al. |
| 5,963,134 A | 10/1999 | Bowers et al. |
| 5,963,452 A | 10/1999 | Etoh et al. |
| 5,984,509 A | 11/1999 | Scott |
| 5,988,346 A | 11/1999 | Tedesco et al. |
| 5,988,431 A | 11/1999 | Roe |
| 5,997,170 A | 12/1999 | Brodbeck |
| 6,002,395 A | 12/1999 | Wagner et al. |
| 6,014,137 A | 1/2000 | Burns |
| 6,039,244 A | 3/2000 | Finsterwald |
| 6,044,362 A | 3/2000 | Neely |
| 6,047,338 A | 4/2000 | Grolemund |
| 6,050,448 A | 4/2000 | Willis |
| 6,056,194 A | 5/2000 | Kolls |
| 6,058,373 A | 5/2000 | Blinn et al. |
| 6,061,660 A | 5/2000 | Eggleston et al. |
| 6,062,478 A | 5/2000 | Izaguirre et al. |
| 6,072,481 A | 6/2000 | Matsushita et al. |
| 6,076,101 A | 6/2000 | Kamakura et al. |
| 6,078,848 A | 6/2000 | Bernstein et al. |
| 6,085,888 A | 7/2000 | Tedesco et al. |
| 6,101,483 A | 8/2000 | Petrovich et al. |
| 6,109,524 A | 8/2000 | Kanoh et al. |
| 6,115,649 A | 9/2000 | Sakata |
| 6,119,934 A | 9/2000 | Kolls |
| 6,123,223 A | 9/2000 | Watkins |
| 6,125,353 A | 9/2000 | Yagasaki |
| 6,126,036 A | 10/2000 | d'Alayer de Costemore d'Arc et al. |
| 6,134,547 A | 10/2000 | Huxley et al. |
| 6,138,911 A | 10/2000 | Fredregill et al. |
| 6,161,059 A | 12/2000 | Tedesco |
| 6,164,528 A | 12/2000 | Hills et al. |
| 6,169,483 B1 | 1/2001 | Ghaffari et al. |
| 6,179,206 B1 | 1/2001 | Matsumori |
| 6,181,981 B1 | 1/2001 | Varga et al. |
| 6,182,857 B1 | 2/2001 | Hamm et al. |
| 6,195,661 B1 | 2/2001 | Filepp et al. |
| 6,199,141 B1 | 3/2001 | Weinreb et al. |
| 6,199,720 B1 | 3/2001 | Rudick et al. |
| 6,201,474 B1 | 3/2001 | Brady et al. |
| 6,202,006 B1 | 3/2001 | Scott |
| 6,209,322 B1 | 4/2001 | Yoshida et al. |
| 6,243,687 B1 | 6/2001 | Powell |
| 6,250,452 B1 | 6/2001 | Partyka |
| 6,264,104 B1 | 7/2001 | Jenkins et al. |
| 6,286,139 B1 | 9/2001 | Decinque |
| 6,289,322 B1 | 9/2001 | Kitchen et al. |
| 6,295,482 B1 | 9/2001 | Tognazzini |
| 6,298,972 B1 | 10/2001 | Tedesco |
| 6,311,165 B1 | 10/2001 | Coutts et al. |
| 6,317,649 B1 | 11/2001 | Tedesco |
| 6,321,985 B1 | 11/2001 | Kolls |
| 6,327,230 B1 | 12/2001 | Miller et al. |
| 6,330,958 B1 | 12/2001 | Ruskin et al. |
| 6,334,110 B1 | 12/2001 | Walter et al. |
| 6,336,098 B1 | 1/2002 | Fortenberry et al. |
| 6,360,139 B1 | 3/2002 | Jacobs |
| 6,366,914 B1 | 4/2002 | Stern |
| 6,367,653 B1 | 4/2002 | Ruskin et al. |
| 6,367,696 B1 | 4/2002 | Inamitsu |
| 6,397,126 B1 | 5/2002 | Nelson |
| 6,397,199 B1 | 5/2002 | Goodwin, III |
| 6,412,654 B1 | 7/2002 | Cleeve |
| 6,415,555 B1 | 7/2002 | Montague |
| 6,415,950 B1 | 7/2002 | Robrechts |
| 6,416,270 B1 | 7/2002 | Steury et al. |
| 6,424,706 B1 | 7/2002 | Katz et al. |
| 6,430,470 B1 | 8/2002 | Nakajima |
| 6,435,406 B1 | 8/2002 | Pentel |
| 6,456,981 B1 | 9/2002 | Dejaeger et al. |
| 6,457,038 B1 | 9/2002 | Defosse |
| 6,462,644 B1 | 10/2002 | Howell et al. |
| 6,466,658 B2 | 10/2002 | Schelberg |
| 6,466,830 B1 | 10/2002 | Manross |
| 6,477,503 B1 | 11/2002 | Mankes |
| 6,493,110 B1 | 12/2002 | Roberts |
| 6,522,772 B1 | 2/2003 | Morrison |
| 6,527,176 B2 | 3/2003 | Baric |
| 6,539,282 B2 | 3/2003 | Metcalf et al. |
| 6,540,100 B2 | 4/2003 | Credle, Jr. et al. |
| 6,575,363 B1 | 6/2003 | Leason |
| 6,584,309 B1 | 6/2003 | Whigham |
| 6,584,450 B1 | 6/2003 | Hastings et al. |
| 6,584,564 B2 | 6/2003 | Olkin et al. |
| 6,587,748 B2 | 7/2003 | Baack |
| 6,587,835 B1 | 7/2003 | Treyz et al. |
| 6,595,342 B1 | 7/2003 | Maritzen |
| 6,606,602 B1 | 8/2003 | Kolls |
| 6,628,764 B1 | 9/2003 | Petite |
| 6,640,159 B2 | 10/2003 | Holmes et al. |
| 6,644,455 B2 | 11/2003 | Ichikawa |
| 6,644,495 B2 | 11/2003 | Ruskin et al. |
| 6,655,580 B1 | 12/2003 | Ergo et al. |
| 6,658,323 B2 | 12/2003 | Tedesco |
| 6,688,523 B1 | 2/2004 | Koenck |
| 6,696,918 B2 | 2/2004 | Kucharczyk et al. |
| 6,707,380 B2 | 3/2004 | Maloney |
| 6,707,381 B1 | 3/2004 | Maloney |
| 6,708,879 B2 | 3/2004 | Hunt |
| 6,711,464 B1 | 3/2004 | Yap et al. |
| 6,711,465 B2 | 3/2004 | Tomassi |
| 6,728,532 B1 | 4/2004 | Ahonen |
| 6,742,673 B2 | 6/2004 | Credle, Jr. et al. |
| 6,748,539 B1 | 6/2004 | Lotspiech |
| 6,754,559 B2 | 6/2004 | Itako |
| 6,757,585 B2 | 6/2004 | Ohtsuki |
| 6,792,334 B2 | 9/2004 | Metcalf et al. |
| 6,794,634 B2 | 9/2004 | Hair et al. |
| 6,814,256 B2 | 11/2004 | Clark |
| 6,847,861 B2 | 1/2005 | Lunak et al. |
| 6,850,816 B2 | 2/2005 | Garratt |
| 6,851,092 B2 | 2/2005 | Chang et al. |
| 6,854,642 B2 | 2/2005 | Metcalf et al. |
| 6,923,371 B2 | 8/2005 | Goodfellow |
| 6,932,270 B2 | 8/2005 | Fajkowski |
| 6,954,732 B1 | 10/2005 | DeLapa et al. |
| 6,959,285 B2 | 10/2005 | Stefanik |
| 6,959,286 B2 | 10/2005 | Perkowski |
| 6,965,869 B1 | 11/2005 | Tomita et al. |
| 6,968,365 B2 | 11/2005 | Hollstrom |
| 6,980,887 B2 | 12/2005 | Varga et al. |
| 7,024,381 B1 | 4/2006 | Hastings |
| 7,024,390 B1 | 4/2006 | Mori et al. |
| 7,043,497 B1 | 5/2006 | Carty et al. |
| 7,053,773 B2 | 5/2006 | McGarry et al. |
| 7,076,329 B1 | 7/2006 | Kolls |
| 7,079,922 B2 | 7/2006 | Komai |
| 7,085,556 B2 | 8/2006 | Offer |
| 7,085,727 B2 | 8/2006 | VanOrman |
| 7,108,180 B2 | 9/2006 | Brusso |

| | | | | | | |
|---|---|---|---|---|---|---|
| 7,139,731 B1 | 11/2006 | Alvin | | 2004/0243479 A1 | 12/2004 | Gross |
| 7,167,842 B1 | 1/2007 | Josephson, II et al. | | 2004/0243480 A1 | 12/2004 | Gross |
| 7,167,892 B2 | 1/2007 | Defosse et al. | | 2004/0249711 A1 | 12/2004 | Walker |
| 7,174,317 B2 | 2/2007 | Phillips | | 2004/0254676 A1* | 12/2004 | Blust et al. .................. 700/231 |
| 7,191,952 B2 | 3/2007 | Blossom | | 2004/0256402 A1 | 12/2004 | Chirnomas |
| 7,203,675 B1 | 4/2007 | Papierniak et al. | | 2004/0260600 A1 | 12/2004 | Gross |
| 7,209,893 B2 | 4/2007 | Nii | | 2004/0267604 A1 | 12/2004 | Gross |
| 7,233,916 B2 | 6/2007 | Schultz | | 2004/0267640 A1 | 12/2004 | Bong |
| 7,234,609 B2 | 6/2007 | DeLazzer | | 2005/0027648 A1 | 2/2005 | Knowles |
| 7,236,946 B2 | 6/2007 | Bates | | 2005/0033855 A1 | 2/2005 | Moradi et al. |
| 7,240,843 B2 | 7/2007 | Paul | | 2005/0060246 A1 | 3/2005 | Lastinger |
| 7,347,359 B2 | 3/2008 | Boyes et al. | | 2005/0080510 A1 | 4/2005 | Bates |
| 7,350,230 B2 | 3/2008 | Forrest | | 2005/0085946 A1 | 4/2005 | Visikivi |
| 7,366,586 B2 | 4/2008 | Kaplan et al. | | 2005/0086127 A1 | 4/2005 | Hastings et al. |
| 7,389,243 B2 | 6/2008 | Gross | | 2005/0091069 A1 | 4/2005 | Chuang |
| 7,406,693 B1 | 7/2008 | Goodwin, III | | 2005/0096936 A1 | 5/2005 | Lambers |
| 7,444,296 B1 | 10/2008 | Barber et al. | | 2005/0109836 A1 | 5/2005 | Ben-Aissa |
| 7,499,768 B2 | 3/2009 | Hoersten et al. | | 2005/0177494 A1 | 8/2005 | Kelly |
| 2001/0011252 A1 | 8/2001 | Kasahara | | 2005/0197855 A1 | 9/2005 | Nudd |
| 2001/0011680 A1 | 8/2001 | Soltesz | | 2005/0230410 A1 | 10/2005 | DeLazzer et al. |
| 2001/0027357 A1 | 10/2001 | Grobler | | 2005/0230473 A1 | 10/2005 | Fajkowski |
| 2001/0035425 A1 | 11/2001 | Rocco | | 2005/0261977 A1 | 11/2005 | Kiji |
| 2001/0037207 A1 | 11/2001 | Dejaeger | | 2005/0267819 A1 | 12/2005 | Kaplan |
| 2001/0047223 A1 | 11/2001 | Metcalf | | 2005/0274793 A1 | 12/2005 | Cantini |
| 2002/0029196 A1 | 3/2002 | Metcalf | | 2005/0283434 A1 | 12/2005 | Hahn-Carlson |
| 2002/0046122 A1 | 4/2002 | Barber et al. | | 2005/0289032 A1 | 12/2005 | Hoblit |
| 2002/0046123 A1 | 4/2002 | Nicolini | | 2006/0026031 A1 | 2/2006 | Gentling |
| 2002/0065579 A1 | 5/2002 | Tedesco | | 2006/0041508 A1 | 2/2006 | Pham |
| 2002/0074397 A1 | 6/2002 | Matthews | | 2006/0074777 A1 | 4/2006 | Anderson |
| 2002/0082917 A1 | 6/2002 | Takano | | 2006/0095286 A1 | 5/2006 | Kimura |
| 2002/0084322 A1 | 7/2002 | Baric | | 2006/0095339 A1 | 5/2006 | Hayashi |
| 2002/0087334 A1 | 7/2002 | Yamaguchi et al. | | 2006/0096997 A1 | 5/2006 | Yeo |
| 2002/0095680 A1 | 7/2002 | Davidson | | 2006/0122881 A1 | 6/2006 | Walker |
| 2002/0125314 A1 | 9/2002 | Jenkins | | 2006/0149685 A1 | 7/2006 | Gross |
| 2002/0133269 A1 | 9/2002 | Anselmi | | 2006/0155575 A1 | 7/2006 | Gross |
| 2002/0161475 A1 | 10/2002 | Varga et al. | | 2006/0184395 A1 | 8/2006 | Millwee |
| 2002/0165787 A1 | 11/2002 | Bates | | 2006/0190345 A1 | 8/2006 | Crowley |
| 2002/0165788 A1 | 11/2002 | Bates | | 2006/0212360 A1 | 9/2006 | Stefanik |
| 2002/0165821 A1 | 11/2002 | Tree | | 2006/0212367 A1 | 9/2006 | Gross |
| 2002/0169715 A1 | 11/2002 | Ruth | | 2006/0231612 A1 | 10/2006 | Walker |
| 2002/0183882 A1 | 12/2002 | Dearing et al. | | 2006/0231613 A1 | 10/2006 | Walker |
| 2002/0195491 A1 | 12/2002 | Bunch | | 2006/0231614 A1 | 10/2006 | Walker |
| 2003/0004828 A1 | 1/2003 | Epstein | | 2006/0235746 A1 | 10/2006 | Hammond |
| 2003/0023453 A1 | 1/2003 | Hafen | | 2006/0235747 A1 | 10/2006 | Hammond |
| 2003/0033054 A1 | 2/2003 | Yamazaki | | 2006/0241967 A1 | 10/2006 | Gross |
| 2003/0057219 A1 | 3/2003 | Risolia | | 2006/0242059 A1 | 10/2006 | Hansen |
| 2003/0061094 A1 | 3/2003 | Banerjee | | 2006/0247823 A1 | 11/2006 | Boucher |
| 2003/0105554 A1 | 6/2003 | Eggenberger | | 2006/0259190 A1 | 11/2006 | Hale |
| 2003/0125961 A1 | 7/2003 | Janda | | 2006/0259192 A1 | 11/2006 | Lowe |
| 2003/0130762 A1 | 7/2003 | Tomassi | | 2006/0265101 A1 | 11/2006 | Kaplan |
| 2003/0149510 A1 | 8/2003 | Takahashi | | 2006/0265286 A1 | 11/2006 | Evangelist |
| 2003/0163382 A1 | 8/2003 | Stefanik | | 2006/0266823 A1 | 11/2006 | Passen |
| 2003/0167231 A1 | 9/2003 | Winking | | 2006/0272922 A1 | 12/2006 | Hoersten et al. |
| 2003/0212471 A1 | 11/2003 | Chakravarti | | 2006/0273152 A1 | 12/2006 | Fields |
| 2004/0006537 A1 | 1/2004 | Zelechoski | | 2007/0005438 A1 | 1/2007 | Evangelist |
| 2004/0010340 A1 | 1/2004 | Guindulain Vidondo | | 2007/0011093 A1 | 1/2007 | Tree |
| 2004/0016620 A1 | 1/2004 | Davis | | 2007/0050083 A1 | 3/2007 | Signorelli |
| 2004/0030446 A1 | 2/2004 | Guindulain Vidondo | | 2007/0050256 A1 | 3/2007 | Walker |
| 2004/0050648 A1 | 3/2004 | Carapelli | | 2007/0050266 A1 | 3/2007 | Barber |
| 2004/0064377 A1 | 4/2004 | Ergo | | 2007/0051802 A1 | 3/2007 | Barber |
| 2004/0068346 A1 | 4/2004 | Boucher | | 2007/0063020 A1 | 3/2007 | Barrafato |
| 2004/0068451 A1 | 4/2004 | Lenk | | 2007/0063027 A1 | 3/2007 | Belfer |
| 2004/0078328 A1 | 4/2004 | Talbert | | 2007/0084917 A1 | 4/2007 | Fajkowski |
| 2004/0079798 A1 | 4/2004 | Messenger | | 2007/0094245 A1 | 4/2007 | Vigil |
| 2004/0133466 A1 | 7/2004 | Redmond et al. | | 2007/0095901 A1 | 5/2007 | Illingworth |
| 2004/0153413 A1 | 8/2004 | Gross | | 2007/0125104 A1 | 6/2007 | Ehlers |
| 2004/0158503 A1 | 8/2004 | Gross | | 2007/0130020 A1 | 6/2007 | Paolini |
| 2004/0158504 A1 | 8/2004 | Gross | | 2007/0136247 A1 | 6/2007 | Vigil |
| 2004/0158871 A1 | 8/2004 | Jacobson | | 2007/0156442 A1 | 7/2007 | Ali |
| 2004/0162783 A1 | 8/2004 | Gross | | 2007/0156578 A1 | 7/2007 | Perazolo |
| 2004/0172274 A1 | 9/2004 | Gross | | 2007/0162183 A1 | 7/2007 | Pinney |
| 2004/0172275 A1 | 9/2004 | Gross | | 2007/0162184 A1 | 7/2007 | Pinney |
| 2004/0172342 A1 | 9/2004 | Gross | | 2007/0169132 A1 | 7/2007 | Blust |

| | | | |
|---|---|---|---|
| 2007/0175986 A1 | 8/2007 | Petrone | |
| 2007/0179668 A1 | 8/2007 | Mellin | |
| 2007/0185776 A1 | 8/2007 | Nguyen | |
| 2007/0210153 A1 | 9/2007 | Walker | |
| 2008/0027835 A1 | 1/2008 | LeMasters et al. | |
| 2008/0239961 A1 | 10/2008 | Hilerio et al. | |

FOREIGN PATENT DOCUMENTS

| | | |
|---|---|---|
| CA | 2302753 | 5/1999 |
| DE | 35 29 155 A1 | 2/1987 |
| EP | 0 060 643 B1 | 9/1982 |
| EP | 205691 | 12/1986 |
| EP | 0 249 367 A2 | 12/1987 |
| EP | 572119 | 12/1993 |
| EP | 287367 | 10/1998 |
| EP | 986033 | 3/2000 |
| EP | 1367549 | 12/2003 |
| FR | 2 549 624 A1 | 1/1985 |
| FR | 2 559 599 A1 | 8/1985 |
| FR | 2 562 293 A1 | 10/1985 |
| GB | 380926 | 9/1932 |
| GB | 2143662 | 2/1985 |
| GB | 2172720 | 9/1986 |
| GB | 2402242 | 12/2004 |
| JP | 55156107 | 12/1980 |
| JP | 56047855 | 4/1981 |
| JP | 02178795 | 7/1990 |
| JP | 03062189 | 3/1991 |
| JP | 03119496 | 5/1991 |
| JP | 10247982 | 9/1998 |
| WO | WO 87/00948 A1 | 2/1987 |
| WO | WO 87/05425 A1 | 9/1987 |
| WO | WO8804085 | 6/1988 |
| WO | WO9300644 | 1/1993 |
| WO | WO8806771 | 9/1998 |
| WO | WO 98/47799 | 10/1998 |
| WO | WO 99/24902 A1 | 5/1999 |
| WO | WO0038120 | 6/2000 |
| WO | WO 00/72160 A1 | 11/2000 |
| WO | WO 02/25552 | 3/2002 |
| WO | WO 02/29708 A1 | 4/2002 |
| WO | WO2004070646 | 8/2004 |
| WO | WO2005062887 | 7/2005 |
| WO | WO2006112817 | 10/2006 |

OTHER PUBLICATIONS

Communication from International Searching Authority transmitting International Search Report and Written Opinion, mailed Aug. 10, 2005 for International Application PCT/US05/12563.
International Search Report for Application PCT/US06/015125 dated Jan. 11, 2007.
International Search Report for Application PCT/US06/015126 dated Apr. 3, 2008.
International Search Report for Application PCT/US06/015129 dated Sep. 20, 2006.
International Search Report for Application PCT/US06/015130 dated Nov. 22, 2006.
International Search Report for Application PCT/US06/015132 dated May 10, 2007.
International Search Report for Application PCT/US06/015133 dated Jun. 6, 2007.
Office Action mailed Aug. 28, 2006 for U.S. Appl. No. 10/824,781.
Office Action mailed Apr. 24, 2007 for U.S. Appl. No. 11/409,516.
Office Action mailed Apr. 27, 2007 for U.S. Appl. No. 11/480,630.
Office Action mailed Sep. 6, 2007 for U.S. Appl. No. 11/408,789.
Office Action mailed Sep. 10, 2007 for U.S. Appl. No. 11/409,175.
Office Action mailed Sep. 27, 2007 for U.S. Appl. No. 11/409,260.
Office Action mailed Sep. 27, 2007 for U.S. Appl. No. 11/408,610.
Office Action mailed Dec. 6, 2007 for U.S. Appl. No. 11/408,630.
Office Action dated Dec. 21, 2007 for U.S. Appl. No. 11/408,632.
Office Action dated Mar. 17, 2008 for U.S. Appl. No. 11/408,789.
Notice of Allowance mailed Apr. 18, 2007 for U.S. Appl. No. 10/824,781.
Office Action mailed Jun. 29, 2007 for U.S. Appl. No. 11/408,607.
Office Action mailed Jan. 24, 2008 for U.S. Appl. No. 11/408,607.
Notice of Allowance mailed Jun. 26, 2008 for U.S. Appl. No. 11/408,607.
Office Action mailed Jul. 28, 2008 for U.S. Appl. No. 11/408,789.
Office Action mailed Apr. 23, 2008 for U.S. Appl. No. 11/408,630.
Notice of Allowance mailed Dec. 7, 2007 for U.S. Appl. No. 11/409,516.
Office Action mailed May 22, 2008 for U.S. Appl. No. 11/408,610.
Office Action mailed May 13, 2008 for U.S. Appl. No. 11/409,175.
Patent Cooperation Treaty International Search Report and Written Opinion for PCT/US06/15131 dated Jul. 7, 2008.
Patent Cooperation Treaty International Search Report and Written Option for PCT/US06/15127 dated Jun. 19, 2008.
Office Action mailed Oct. 17, 2008 for U.S. Appl. No. 11/408,610.
Notice of Allowance Dated Oct. 29, 2008 for U.S. Appl. No. 11/408,630.
Final Office Action mailed Oct. 29, 2008 for U.S. Appl. No. 11/408,632.
Office Action dated Nov. 18, 2008 for U.S. Appl. No. 11/767,065.
Office Action mailed Dec. 30, 2008 for U.S. Appl. No. 11/863,909.
Office Action mailed Jan. 6, 2009 for U.S. Appl. No. 11/409,175.
Supplementary Search Report dated Jan. 21, 2009 for European Patent Application EP05736275.
Office Action mailed Mar. 17, 2009 for U.S. Appl. No. 11/408,632.
Office Action mailed Mar. 31, 2009 for U.S. Appl. No. 12/056,215.
Final Office Action mailed Apr. 16, 2009 for U.S. Appl. No. 11/408,610.
Notice of Allowance Dated May 4, 2009 for U.S. Appl. No. 11/767,065.
Examination Report for EP 05736275.8 dated May 15, 2009.
Office Action mailed Jun. 18, 2009 for U.S. Appl. No. 11/409,175.
Office Action mailed Jun. 26, 2009 for U.S. Appl. No. 11/408,789.
1982 Issue Rolling Stones Magazine, Film Rentals by Vending Machine.
1984 Picture of U.S. Installation of Japanese Manufactured VHS Rental Kiosk.
Office Action mailed Jul. 27, 2009 for U.S. Appl. No. 11/863,909.
Office Action mailed Aug. 3, 2009 for U.S. Appl. No. 12/110,101.
Final Office Action mailed Oct. 20, 2009 for U.S. Appl. No. 12/056,215.
Notice of Allowance mailed Dec. 2, 2009 for U.S. Appl. No. 12/110,101.
Final Office Action mailed Dec. 9, 2009 for U.S. Appl. No. 11/409,175.
Notice of Allowance mailed Dec. 31, 2009 for U.S. Appl. No. 11/408,789.
Office Action mailed Jan. 11, 2010 for U.S. Appl. No. 11/863,909.
Office Action dated Jan. 25, 2010 for U.S. Appl. No. 12/056,215.

* cited by examiner

SHOPPING CART

| Title | Rent/Buy | Due Date | Due Time | Price | Remove |
|---|---|---|---|---|---|
| The Bourne Supremacy 417 | *Rent | 02/09/2005 | 10.00 PM | $1.00 | Remove 418 |

Sub Total $1.00
Tax $0.05
Total $1.05

[HELP] [START OVER]  [ADD ANOTHER MOVIE] [PROMO CODE]  419 [CHECKOUT]

SYSTEM AND METHOD FOR MANAGING VENDING INVENTORY

CROSS-REFERENCE TO RELATED APPLICATIONS

This application claims priority from U.S. Provisional Patent Application Ser. No. 60/674,011, filed Apr. 22, 2005, which is incorporated herein by reference. U.S. patent application Ser. No. 10/824,781, filed on Apr. 15, 2004, is also incorporated herein by reference.

TECHNICAL FIELD

The invention relates to a system and method for managing a vending inventory having a set of vendible media products. More particularly, the present invention provides a method for generating an inventory descriptor corresponding to the set of vendible media products and delivering the products from a plurality of predetermined locations.

BACKGROUND OF THE INVENTION

While the present invention is often described herein with reference to a digital video disc distribution system, an application to which the present invention is advantageously suited, it will be readily apparent that the present invention is not limited to that application and can be employed in vending systems used to distribute a wide variety of vending products.

Currently, brick-and-mortar digital video disc ("DVD") stores dominate the movie video and video game rental landscape in the U.S. One element repeatedly cited for success of certain brick-and-mortar store video rental franchises is perceived high availability of new video releases. Consumers want their entertainment on demand, and through stocking multiple units of each new release, successful brick-and-mortar companies deliver as promised.

Pay-per-view video services, mail-based video rental services and Internet-based video rental services are also known. Internet based video rental services have been plagued by their inability to meet the demands of consumers for new video releases during peak viewing times, leading to increased customer dissatisfaction. Pay-per-view video services offer only limited selections to viewers during any time period, resulting in significantly less rentals per any given period of time.

The foregoing indicates that there is a tremendous market potential for aligning regular routines of consumers (e.g., shopping, getting coffee or gas or going to a convenience store) with their DVD movie video and video game rental activities.

The present invention can function as a DVD dispensing machine-based distribution system that recognizes the consumer demand recognized of traditional video rental stores by having multiple units of each new release per video dispensing machine. The dispensing machines can stock up to two thousand DVDs (movies and/or games), making them competitive with existing brick-and-mortar video rental superstores.

The present invention distinguishes itself from such stores by offering major benefits not conventionally offered by such stores, including additional cross-marketing programs (e.g., promotional rentals for a certain amount of dollars spent at the hosting store) and convenience (e.g., open always).

The present invention yields a competitive advantage in the DVD rental marketplace by offering consumers cross-marketing/promotional programs, convenience of selection (e.g., computer-based searches for movies and recommendations based on consumer profiles), and extended hours. The present invention employs a more cost effective, convenient platform than brick-and-mortar stores. In addition, with the present invention, DVD dispensing machines can be situated in hosting locations having high foot traffic, such as at a popular hosting location and/or a high foot traffic area at a hosting location.

The present invention can be operated at a substantial savings over the costs associated with traditional brick-and-mortar video rental stores. For example, the present invention does not require hourly employees at the dispensing machines or restocking them with inventories, due to the ability of article transport storage units delivered to/picked up from host locations by third-party delivery services, such as overnight courier services.

Unlike brick-and-mortar stores, the present invention does not require an on-site store manager because all operational decisions can be made at a centralized location by a management team office remote from the hosting locations. Unlike brick-and-mortar stores, the present invention does not require a great deal of physical space. Unlike brick-and-mortar stores, the present invention has low operating costs because no heating or air conditioning is required for the dispensing machines and they consume a relatively low level of electrical energy. In addition, the present invention has low maintenance costs and downtime.

The present invention addresses all of these shortcomings of traditional brick-and-mortar stores in a convenient and cost effective delivery vehicle having the added bonus of serving as an effective promotional platform that drives incremental sales to hosting locations. In addition, the present invention overcomes these disadvantages by offering more new releases and older selections for any given time period, lower cost per viewing, and more convenience than internet-based and pay-per-view services.

Dispensing machines are known. Dispensing machines have been traditionally used to distribute a wide variety of goods, including, among other things, snack foods. Conventional dispensing machines used in article dispensing systems must be restocked with inventory manually. In the conventional machines, the inventory articles are uploaded to the machines and offloaded from the machines by dedicated route servicemen, who are provided access to the storage space. Route servicemen conventionally are employed to control inventory of a plurality of dispensing machines situated at a plurality of hosting locations. In order to stock the machines with inventory, a serviceman typically first removes the articles of inventory designated for offloading one by one prior to uploading new articles of inventory one by one. An alternative manner of removing inventory designated for offloading from a dispensing machine is by removal of all inventory in the machine by removing a drawer containing all articles of inventory. This latter approach of removing inventory articles is particularly suitable for dispensing machines that are either directly connected or in close proximity to manned dispensing locations.

Most dispensing machines must be serviced by a serviceman to upload new dispensable articles of inventory into the machines in multiple quantities. Conventional drawers used to stock dispensing machines with inventory and remove articles designated for offloading from dispensing machines require a dedicated service man for carrying out the stocking and removal tasks. In addition, conventional drawers do not permit automated access to the article dispensing machines. Such conventional drawers allow the servicemen to have access to the articles of inventory being stocked into the dispensing machine and the articles of inventory being removed from the dispensing machine. The present invention overcomes the disadvantages associated with traditional methods of providing merchandise to dispensing machines.

The present invention is provided to solve the problems discussed above and other problems, and to provide advantages and aspects not provided by prior systems and methods of this type. A full discussion of the features and advantages of the present invention is deferred to the following detailed description, which proceeds with reference to the accompanying drawings.

SUMMARY OF THE INVENTION

The present invention is a compact article dispensing machine in which a removable and substitutable article transport storage unit is used to carry out inventory functions for an article dispensing machine. Each unit is locked in transport and the articles cannot be extracted from the unit unless the unit is installed within the locked dispensing machine.

These units are preferably furnished with articles slated for inventory at a central location and then locked and provided to authorized personnel who, in turn, deliver the locked units to a plurality of dispensing machines. At each location, the servicing of the machine consists essentially in initiating the resident unit removal process by entering the appropriate commands at the machine. This will cause the unit residing within the dispensing machine to be automatically ejected from the machine. The previously installed unit is then removed from the machine, and the new unit delivered from the central location is then installed into the machine. Preferably, the machine automatically pulls the unit into the machine and the unit is locked in place. The unit is unlocked and opened, preferably within the locked dispensing machine and the machine then has access to the articles in the unit. Removed units are returned to the central location by the third party freight company and are processed for the next shipment of inventory. Authorized customers can then select articles from the inventory of the dispensing machines.

The present invention provides a removable article transport storage unit for the handling of articles of inventory. The unit has a particularly simple, yet reliable, construction for use in article dispensing machines. This aspect of the present invention makes it particularly suitable for use in association with DVD dispensing machines.

Preferably, each unit is configured to receive a plurality of articles of inventory to be stocked into and/or removed from an article dispensing machine. In that regard, each unit is configured to have an interior with a volume sufficiently large enough to receive and store an appropriate quantity of the particular kind of inventory to be dispensed. The articles of inventory are preferably stored within the unit in an aligned relationship, and most preferably in racks contained within the unit.

Each unit can be received within a receptacle associated with a dispensing machine and preferably is opened automatically once the unit is received into the receptacle to permit rapid stocking of inventory articles into the dispensing machine. In that regard, a robotic arm preferably positioned in the dispensing machine is actuated and upon opening of the inventory transport and stocking unit, the robotic arm causes uploading and/or offloading of inventory articles, as desired. In one embodiment, the unit may be quickly received on and/or removed from a drawer at the dispensing machine for stocking of the machine or replenishment of inventory into the unit for subsequent stocking of an article dispensing machine with inventory.

The flow of inventory can be controlled at a centralized inventory control or supply center. In addition, the removal of offloaded articles of inventory from a received article transport and storage unit can be carried out at the inventory control or supply office. Furthermore, the replenishment of articles of inventory into the units can be carried out at the inventory control or supply office, translating into increased quality control and security associated with the articles dispensable at dispensing machines.

The article transport storage unit is tamper and theft proof and easy to handle. The article transport storage units reduce theft and personnel costs and ensure a steady supply of new releases suitable for each dispensing machine.

Following installation into a dispensing machine, the article transport storage unit can be unlocked and opened automatically to release the DVDs. The article transport storage units cannot be opened prior to installation, thus deterring and preventing theft that typically plagues video rental stores. The resident article transport storage unit is closed and locked automatically and then removed from the machine and returned to a system inventory control or supply office via the third party delivery service. Only authorized personnel at the system inventory control or supply office are able to unlock and open the returned article transport storage unit and remove the individual DVDs, preferably stored within racks within the interior of the unit.

The present invention provides a system for distributing DVD movie videos and video games for home entertainment or other use. The present invention links the regular routines of consumers to renting and/or purchasing movie videos and/or video games from a dispensing machine.

The dispensing machines can include a user-friendly control interface resembling the interface conventionally used in association with an automated teller machine. The dispensing machines also preferably have a graphical user interface with touch screen interface control capability. In addition, if desired, multiple control interfaces can be incorporated in dispensing machines situated at high traffic locations, such as by being positioned on each side panel of such machines.

The dispensing machines used in the present invention preferably incorporate a slot loading DVD drive associated therewith that permits video related to a desired advertisement or trailer to be read from DVD media at the machine location. The video content read from the DVD media will preferably be stored in a storage unit (e.g., hard drive) associated with the dispensing machine and can be accessed, played and presented on the associated video display monitor, as desired.

The dispensing machines used in the present invention are fully automated, integrated DVD movie video and video game rental and/or purchase systems. The present invention preferably incorporates robust, secure, scalable software that provides a fully personalized user experience and real-time feedback to hosting locations and advertisers, scalable hardware that leverages existing technologies such as touch screen, focused audio speakers and plasma video monitors, technology utilizing the Internet through a system website, and an article transport storage unit that facilitates the exchange of new DVDs for old DVDs in each machine with virtually no need for human intervention. These technologies and others fill long felt needs in the art and give advantages over conventional video distribution options. The present invention functions as much as a promotional platform as it does a rental kiosk.

By situating the dispensing machines at hosting locations where there is both high repeat foot traffic and the opportunity to utilize marketing/promotional programs to leverage the synergies between hosting locations, such as grocery stores, consumers are enticed to use the dispensing machines. For example, a grocery store hosting a machine could offer its preferred cardholders reduced price DVD rentals or even free rentals for a specified dollar amount of groceries purchased by linking certain aspects of its preferred cardholder promotional program with the promotional software used by the present invention. This and other types of creative promotions can be implemented to ensure that the dispensing machines are valuable to the hosting locations and their patrons alike.

Renting DVDs from the dispensing machines is seen as more rewarding because of such promotional programs. The rental experience is more convenient for the consumer versus renting from traditional brick-and-mortar video stores as the rental experience is closely tied to the shopping routines of the consumer and the hours of hosting locations. The present invention fosters enhanced customer loyalty, satisfaction and goodwill for the hosting locations, as well as the opportunity to share revenues generated by the dispensing machines at their hosting site.

By utilizing the dispensing machines and the fully interactive, real-time, linked Internet website, consumers can rent one or more DVD movie videos and/or video games directly from dispensing machines as well as indirectly by making a rental reservation through the website for later pickup at a conveniently located machine. The dispensing machines will preferably be fully networked with each other, with the inventory control or supply office and with the system website Internet links at each hosting location. Through this linked network, the rental experience for each consumer, can be customized based on a profile for each consumer, such as via personalized home pages and rental screens.

In addition, the rental experience can be customized for each hosting location. For example, a large number of Spanish language films can form the basis for the inventory in dispensing machines situated at a hosting location with predominately Spanish speaking patrons. Furthermore, by leveraging the network, the present invention is able to run customized promotional program tailored to the unique needs of each hosting location and provide feedback as to the success of such promotion in real time via network links to the hosting location computers.

The present invention has the advantage of generating revenue from the following sources: movie and video game rentals, cross-marketing promotional programs whereby preferred customer or other targeted customer segments at a hosting location are encouraged to patronize the store and repeatedly rent from the dispensing machines, advertising revenues resulting from video advertisements displayed on plasma video display monitors incorporated as part of the dispensing machines, advertisements presented on DVD jacket case covers dispensed from the dispensing machines, and banner ads displayed on the system website. The present invention can also generate revenues from sales of new and pre-viewed movie videos and new and used video games via the system website and dispensing machines, and recurring revenue generated through membership-based rentals (e.g., monthly fees paid by a consumer in exchange for a fixed number of rentals over a specified period of time on a discounted basis).

Through use of the present invention, new customers are drawn to the hosting locations to take advantage of the added service and convenience of renting DVD media from within the locations and the cross-marketing promotions, such as reduced DVD rental rates that are offered to preferred customers and/or those spending a specified amount of money on the products and services offered by the host locations. The host locations can also share in the revenue generated by the dispensing machines at its location.

Several aspects of the present invention distinguish it from conventional options. The present invention utilizes software designed to provide real-time monitoring of the inventory at each dispensing machine, customer history and demographic information, and inventory management, among other things. The interactive system website will be linked to the dispensing machines and provide customers with the ability to query machine locations and select and reserve DVDs for rental.

The present invention also incorporates a unique article transport storage unit that provides the ability to exchange the inventory of the dispensing machines with little need for human intervention. The present invention also is designed to provide for automated query of rental patterns. Furthermore, on a per machine basis, the present invention also provides for automatic survey of the system inventory of existing movies/games and new releases. By comparing these two sources of information, the present invention provides for automatic selection of the DVDs in each dispensing machine that are experiencing a low rental rate and therefore should be automatically pulled by the robotic arm for offloading and loaded into the article transport storage unit residing inside the machine.

The present invention includes a user-friendly website to facilitate the consumer experience. The website permits a consumer to browse new releases and older titles, query titles in stock for viewing or purchase, read reviews and recommendations from critics and other users, locate a machine based on inputting a preferred geographical area such as a particular zip code enroll as a member, and view movie trailers and promotions. Members are able to do all of the foregoing tasks, and are able to modify their preferences, alter or cancel their membership, and view special members only promotions. Additionally, existing members are greeted by a customized homepage which is personalized for each member based on their inputted preferences and viewing habits (e.g., preferred genres, already viewed movies, etc.). The website is preferably accessible from a variety of hardware units and in a variety of formats. For example, the website may be accessed from personal digital assistants, cell phones and personal computers.

Each dispensing machine is a "smart" machine such that each machine has an Internet uplink that networks all of the machines together through the Internet, coordinates the user experience via the system website, and permits the system administrator to manage all of its operations at a centralized location. The present invention permits coordinated roll-out of promotional programs across all or select dispensing machines, real-time feedback from each machine as to its use and functionality, and coordinates distribution of movie trailers and promotional programs across all or select machines.

The present invention can generate revenue by selling time slots to movie studios, food manufacturers and other select parties to play their trailers and/or promotions on the plasma video display monitors. The trailers and/or promotions can be loaded into the dispensing machines and stored in a storage unit associated with the machine through the use of a DVD drive. These promotional efforts can be complemented by selling ad space on the DVD rental jacket covers and selling banner ads on the system website and/or ad space on the panels of the dispensing machines.

When desired, the existing/resident article transport storage unit will be swapped out for a new article transport and storage unit containing new releases and popular existing titles, which can delivered by a third party overnight courier service. The foregoing process is entirely automated, and the only need for human intervention occurs when authorized personnel from the third party delivery service approaches a designated unit with the new article transport storage unit. Each article transport storage unit contains a radio frequency identification transmitter that triggers a proximity sensor positioned at each dispensing machine. As the delivery person approaches a specified unit, the transmitter communicates with the proximity sensor in known manner to cause the dispensing machine to release the resident article transport storage unit, which the delivery person will swap for the new article transport storage unit being delivered. The entire process takes just a few minutes and can be done without causing any dispensing machine downtime.

One benefit of the present invention is that it can provide a unique means for automatic inventory control and restocking of flat-pack type products such as DVD jewel cases and the like from an article dispensing machine.

Another benefit of the present invention is that it can permit unmanned loading and offloading of DVD cases in large quantity through remote networking of dispensing machines to an inventory control or supply office.

Another benefit of the present invention is that it can provide an article transport and storage unit that is readily removable from a dispensing machine by authorized personnel from a third party delivery company without requiring the use of a dedicated serviceman.

Another benefit of the present invention is that it can provide for efficient, automated stocking of inventory articles into a dispensing machine and removal of inventory articles from a dispensing machine.

A further benefit of the present invention is that it can provide an improved method of initiating the steps of stocking articles of inventory into a dispensing machine and removing articles of inventory from a dispensing machine.

Another benefit of the present invention is that it can provide a unique coupling and actuating mechanism carried by a dispensing mechanism for causing the dispensing and restocking of articles from a removable article transport storage unit.

Another benefit of the present invention is that it can be adapted to receive a pair of trays or racks contained within an article transport and storage unit to allow distribution of either two different types of articles or a double quantity of the same type of article, with articles being removed selectively from each tray or rack to stock dispensing machines with inventory, as desired.

Another benefit of the present invention is that it can provide a method for automated inventory control so that electronic data records can be kept related to inventory control for each dispensing machine within a network of such machines.

Another benefit of the present invention is that it can provide for a linked network of dispensing machines all in communication with each other and with an inventory control office, preferably via the internet, such that the inventory of each dispensing machine on the network can be reviewed so that inventory decision making functions can be centralized and carried out at the inventory control or supply office.

Further benefits of the present invention are to substantially reduce the time and expense involved in the stocking and maintenance of article dispensing machines situated at a plurality of hosting locations over a given period, and to reduce any losses due to pilferage of articles.

The invention provides a method for managing a vending inventory having a set of vendible media products. The method comprises the step of generating an inventory descriptor corresponding to the set of vendible media products, wherein the set of vendible media products comprises a first and a second vendible media product stored in first and second locations, respectively. The method further comprises the steps of generating a signal to dispense the first vendible media product from the first location, and generating a signal to dispense the second vendible media product from the second location. The method also comprises the step of securing the set of vendible media products in a vending delivery module.

In one embodiment, each of the vendible media products is a DVD. In another embodiment, the first and second locations are storage bins storing a plurality of DVDs. In yet another embodiment, the method further comprises the step of conveying the first and second vendible media products to the vending delivery module via a conveyor belt. In a further embodiment, the inventory descriptor corresponds to a delivery route. In yet another embodiment, the method comprises the step of scanning the inventory descriptor.

The invention further provides a system for managing vending inventory of vendible media products. The system comprises a plurality of storage compartments, each storing a type of vendible media products. The system also comprises an inventory descriptor corresponding to a set of vendible media products, wherein the set of vendible media products is stored in the plurality of storage compartments. The system further comprises a controller for receiving and processing data from the inventory descriptor and for generating a signal to deliver the set of vendible media products from the plurality of storage compartments.

In another embodiment, the invention provides a method for managing vending inventory comprising the step of receiving a vending module containing a vendible media product. The method also comprises the step of reading an inventory descriptor, wherein the inventory descriptor identified the vendible media product. The method further comprises the steps of identifying a storage location corresponding to the vendible media product, and conveying the vendible media product to the storage location.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 38 is an illustration of a user interface for a plurality of rental and purchase transactions for a plurality of vendible media products at a vending apparatus;

FIG. 46 is an illustration of a user interface for viewing and editing customer user information stored in a database configured for use with a vending apparatus;

DETAILED DESCRIPTION

Figure 1:
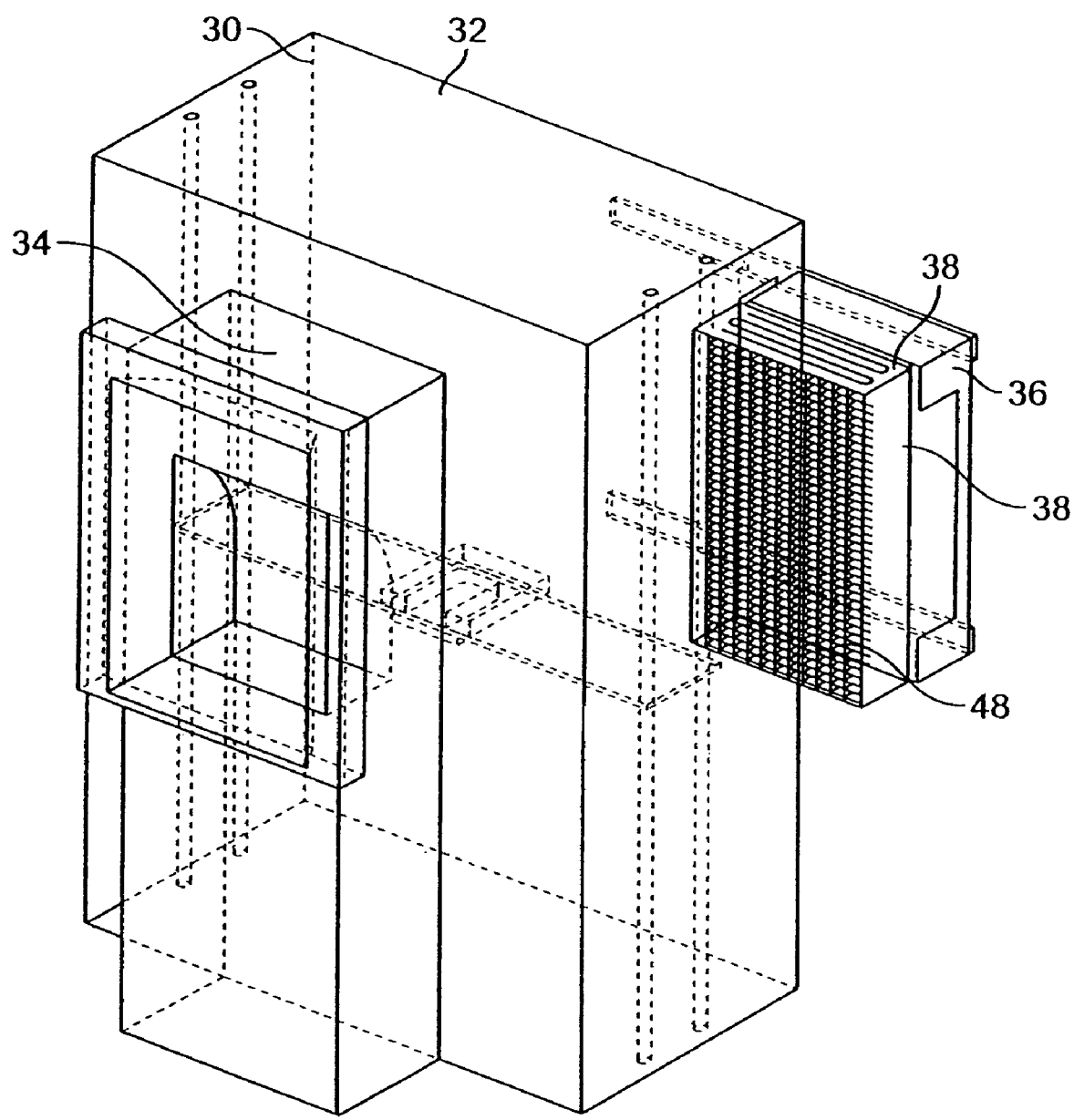
FIG. 1 is a perspective view of an article dispensing machine and an article transport storage unit constructed in accordance with the principles of the present invention.
Figure 2:
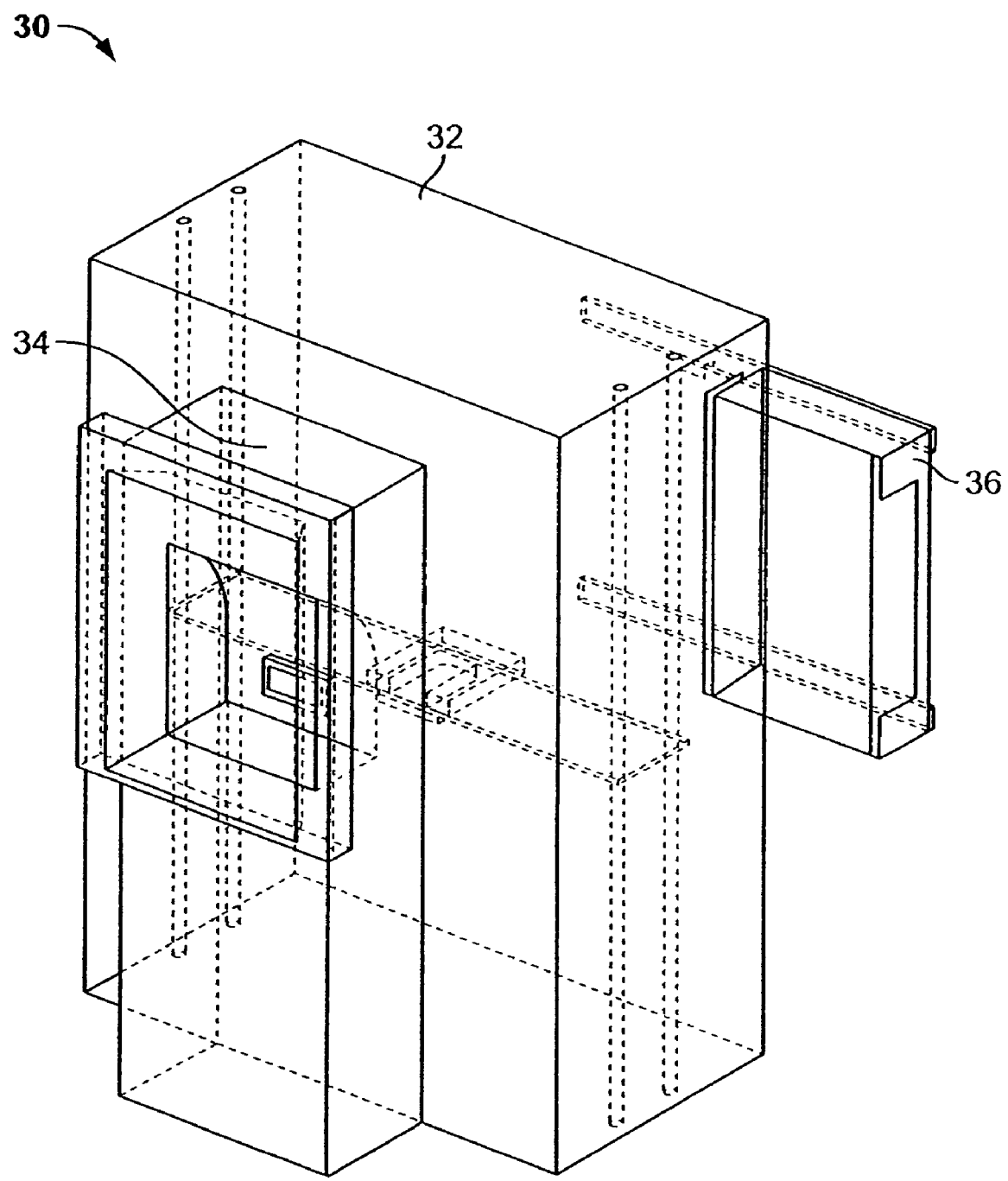
FIG. 2 is another perspective view of the article dispensing machine illustrated in FIG. 1.
Figure 3:
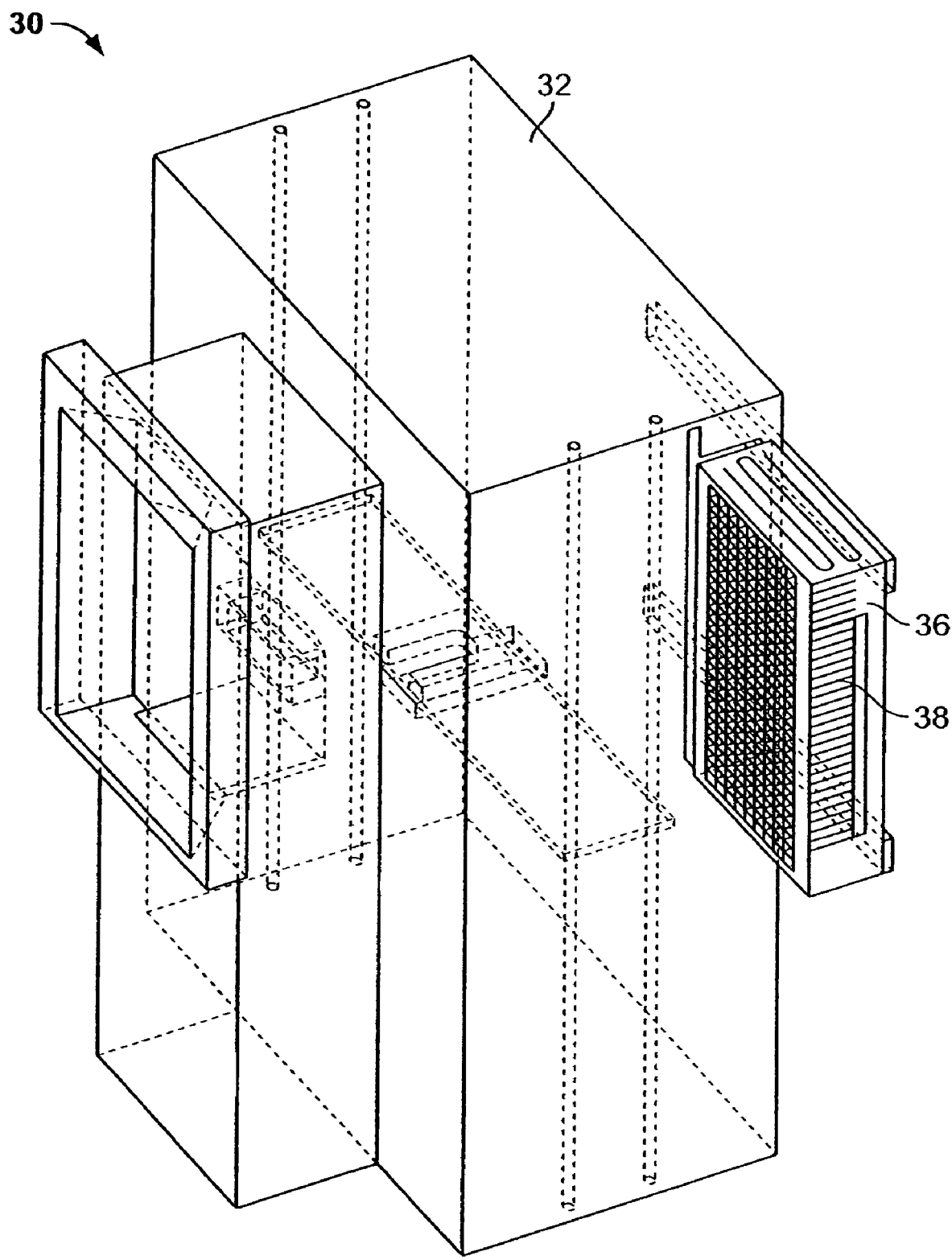
FIG. 3 is another perspective view of the article dispensing magazine illustrated in FIG. 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-5 illustrate an article dispensing machine generally designated 30. Article dispensing machine 30 is one of a plurality of article dispensing machines included within an article distribution system having a plurality of such machines situated at a plurality of hosting locations. The article dispensing machines of a particular article distribution system preferably form a network. As such, those machines are preferably in electrical communication with each other and with a central office from which inventory decisions can be made.

In a preferred application, the article dispensing machines 30 of the system are directed to DVD dispensing machines that can be utilized by consumers to purchase and/or rent movie videos and/or video games embodied on DVD discs. Nonetheless, those skilled in the art will appreciate that article dispensing machine 30 is not limited to the application of DVD distribution, but rather will have applicability for use in the distribution of a variety of articles.

As illustrated, article dispensing machine 30 includes a cabinet housing 32 with front, rear, top, bottom and side panels. Dispensing machine 30 further includes a user interface portion 34 and an article transport storage unit holder 36 designed to receive an article transport storage unit 38, as desired.

The machine housing 32 is preferably a combination molded fiberglass and sheet metal cabinet. However, those skilled in the art will appreciate that the housing can be constructed from a variety of other suitable materials and with a variety of other suitable manufacturing techniques.

In the article dispensing machine embodiment illustrated in FIGS. 1-5, the article dispensing machine 30 preferably has a total height of eighty-one inches, a total width of fifty-seven inches, and a total depth of forty-six inches. Assuming the construction described above with reference to this illustrated embodiment of the article dispensing machine, machine 30 and article transport storage unit 38 (when empty) preferably have an approximate combined weight of six hundred sixty pounds.

Figure 4:
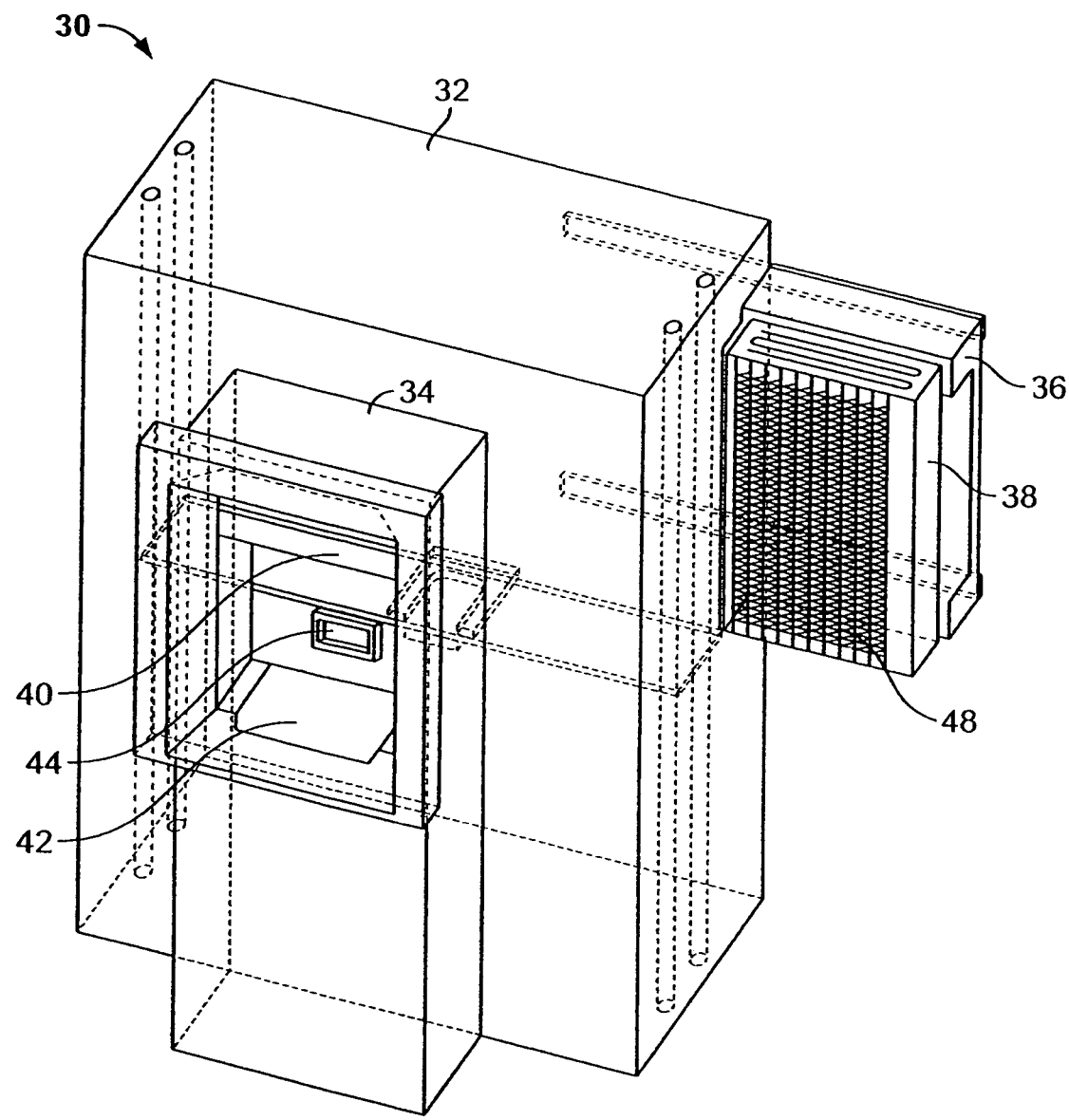
FIG. 4 is another perspective view of the article dispensing machine illustrated in FIG. 1.
Figure 5:
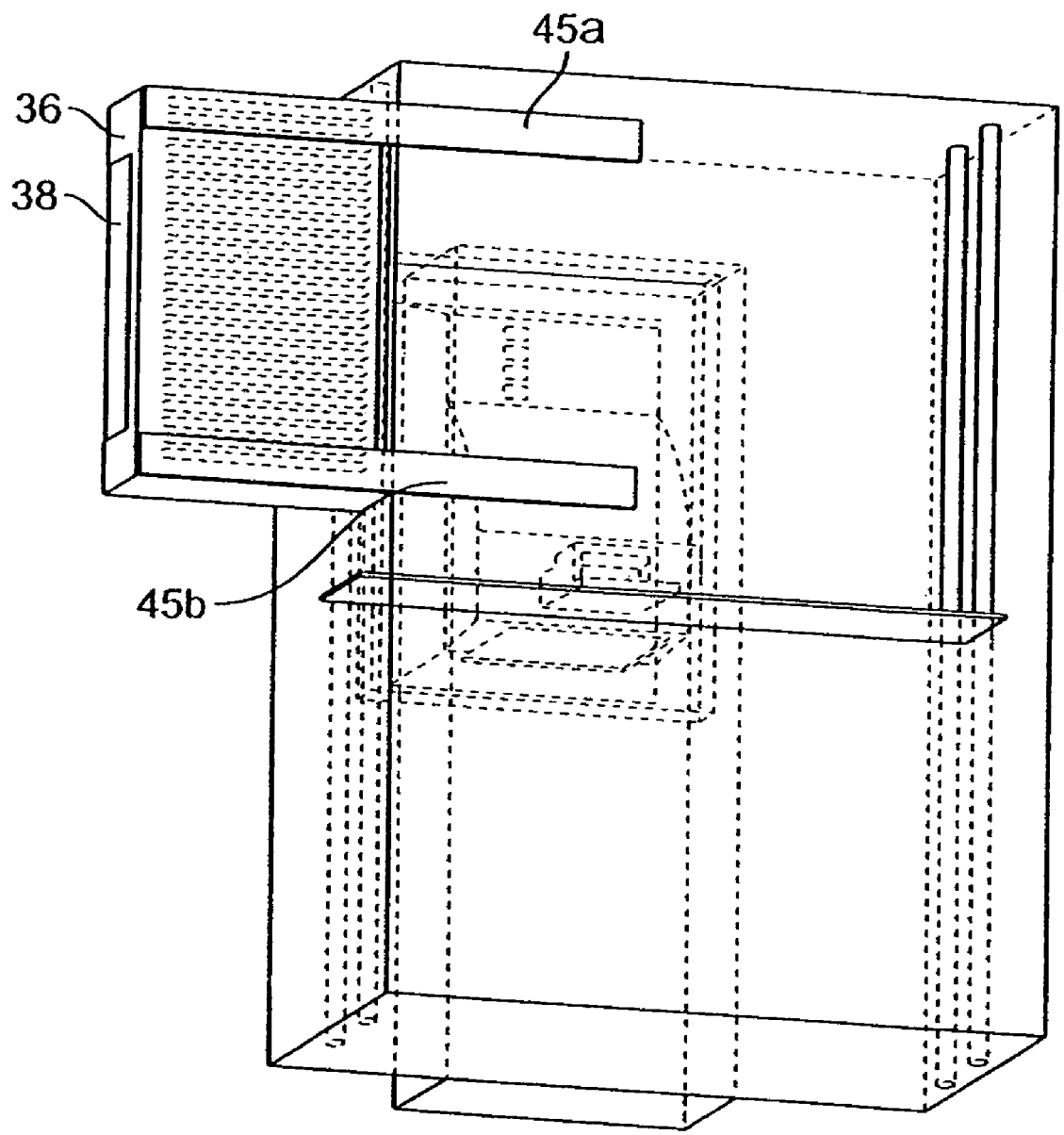
FIG. 5 is a rear view of the article dispensing machine illustrated in FIG. 1.

As shown most clearly in FIG. 4, the user interface portion 34 of housing 32 includes a card reader 40, a keypad and/or touch screen 42 and an article transfer opening 44. The card reader 40 is preferably designed in known fashion to read magnetically encoded membership and/or credit cards for authorizing the distribution of articles of inventory through the article transfer opening 44. Keypad and/or touch screen 42 permits consumers and/or inventory stocking personnel to communicate with the dispensing machine 30 and/or a central office linked in electrical communication with the dispensing machine. Keypad and/or touch screen 42 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks. Additionally, known audio technology could be incorporated with article dispensing machine 30.

Furthermore, it will be appreciated that additional user interface portions having additional or even identical user interface components could be incorporated within article dispensing machine 30. For example, these components could be incorporated on other panels of the housing 32 of machine 30 so that the machine can be used simultaneously by multiple consumers, translating into more efficient distribution of articles in high traffic areas.

The article transport storage unit holder 36 is able to slide in and out of housing 32. Holder 36 is connected to two generally spaced and parallel rails 45a, 45b positioned within housing 32. The holder 36 can be manually slid into and out of housing 32, as desired. Alternatively, a drive motor (not shown) can be used to slide holder 36 into and out of housing 32, as desired.

Figure 8:
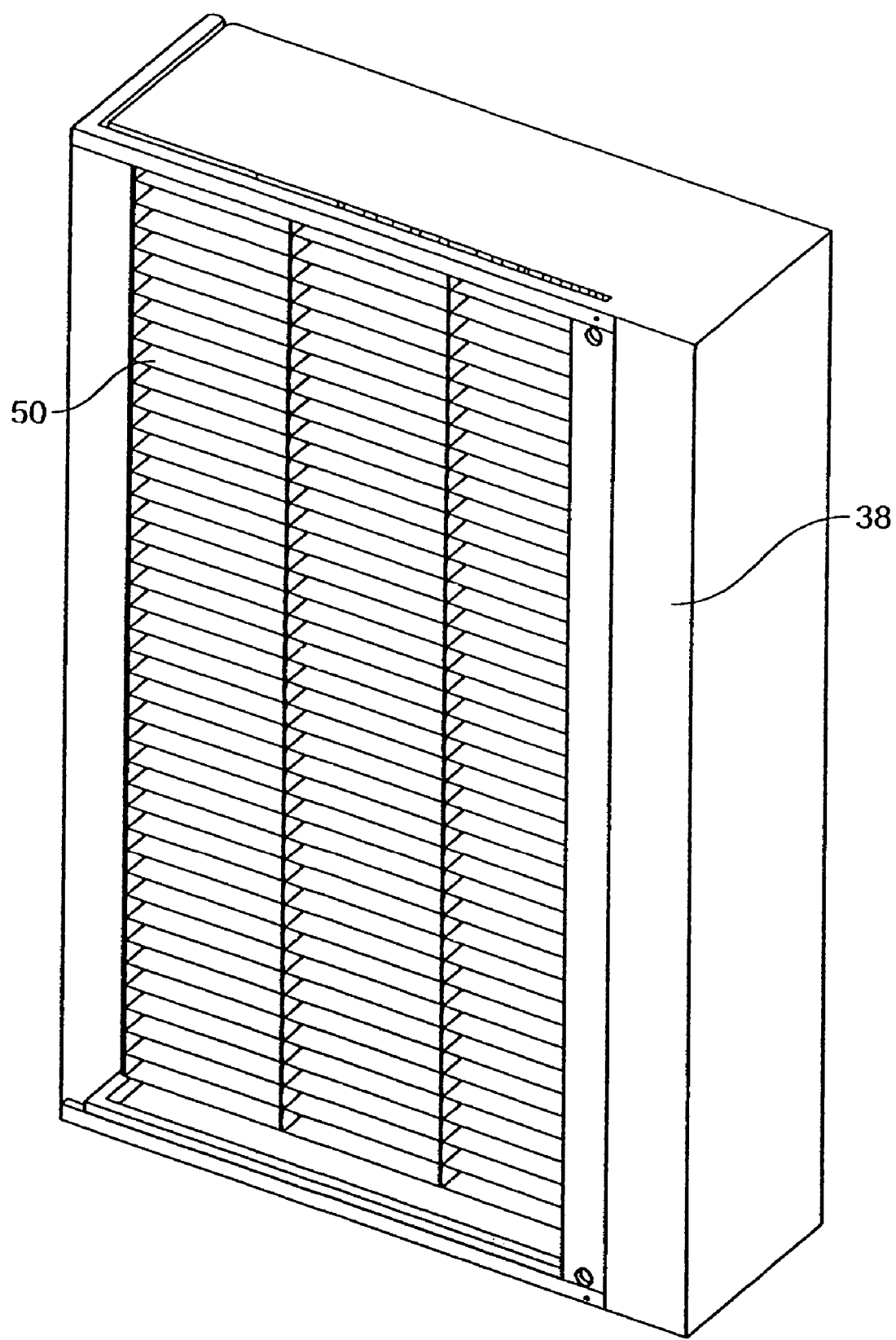
FIG. 8 is a perspective view of the article transport storage unit illustrated in FIG. 6.
Figure 10:
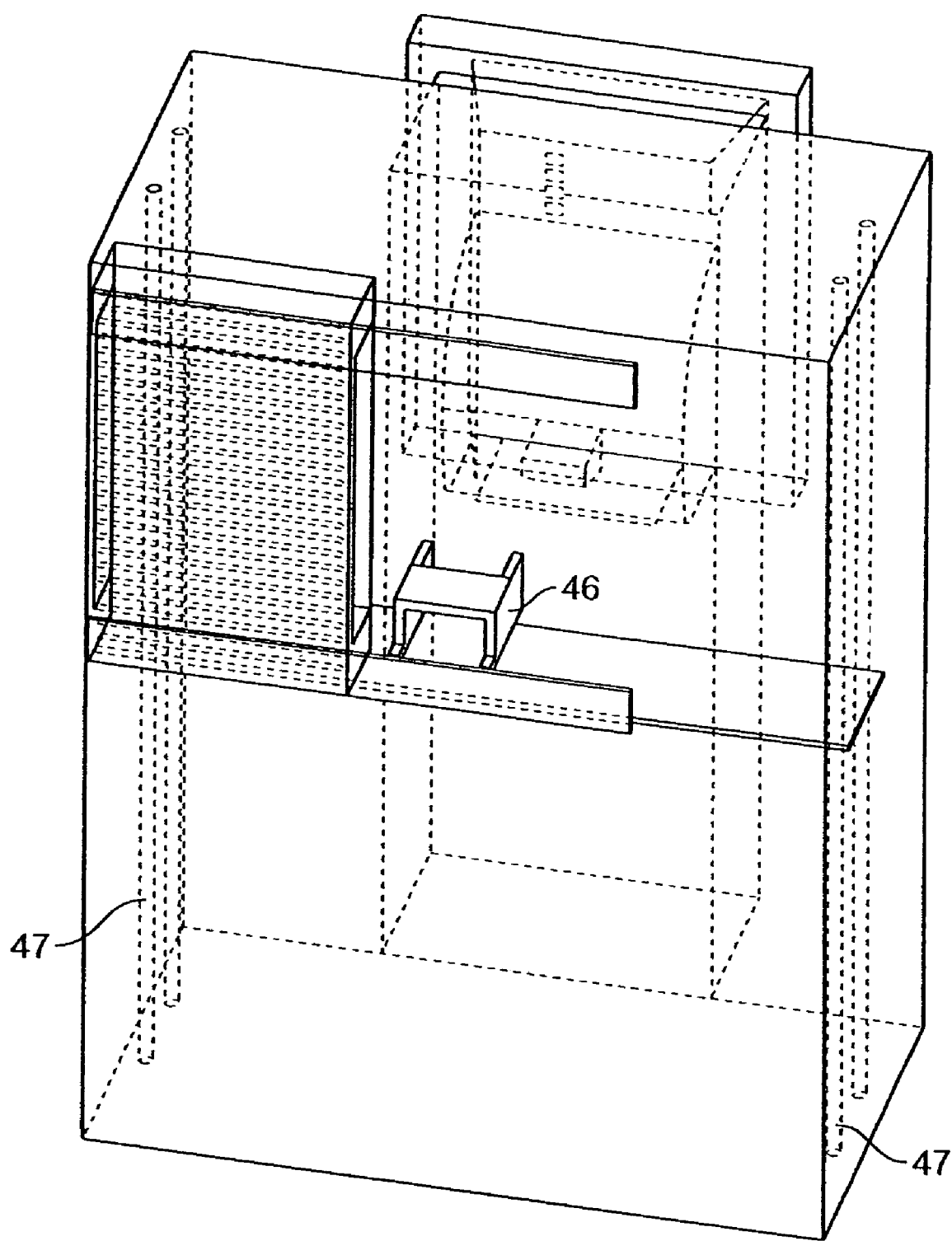
FIG. 10 is a partially open rear perspective view of the article dispensing machine illustrated in FIG. 1.

Referring now to FIG. 10, a robotic arm 46 positioned within article dispensing machine 30 is illustrated. The position of robotic arm 46 can be due to a powered drive motor (not shown). Rails 47, at least some of which are illustrated in FIG. 8, are included to define paths for movement of robotic arm 46. Robotic arm 46 can preferably move in all the x, y and z directions. Using known electromechanical technology, robotic arm 46 can be used to open and close the article transport storage unit 38, as desired, and can further be used to move returned articles into the unit and grab and dispense requested articles from the unit, as desired.

Figure 6:
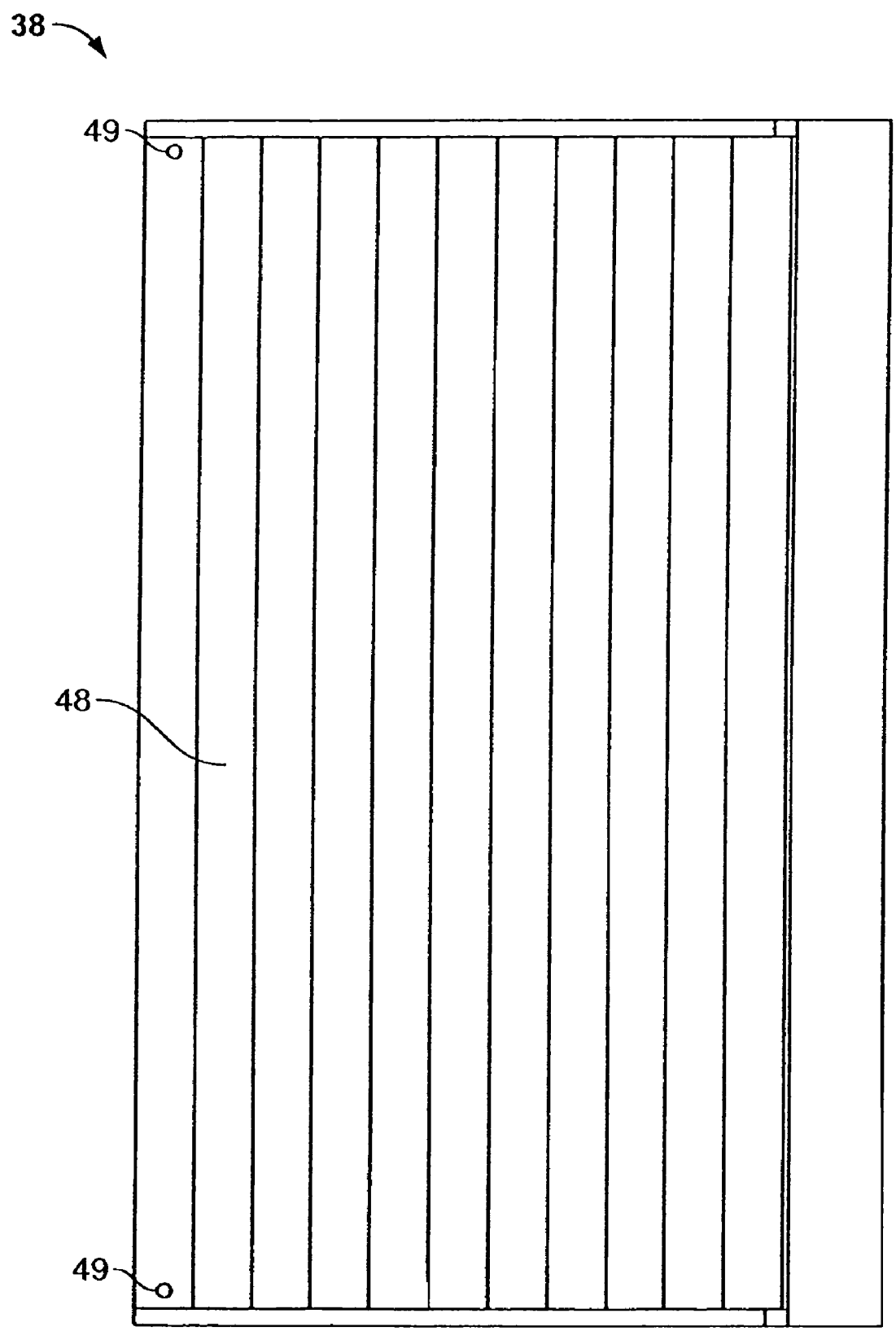
FIG. 6 is an elevational view of the article transport storage unit illustrated in FIG. 1, shown in a closed condition.
Figure 7:
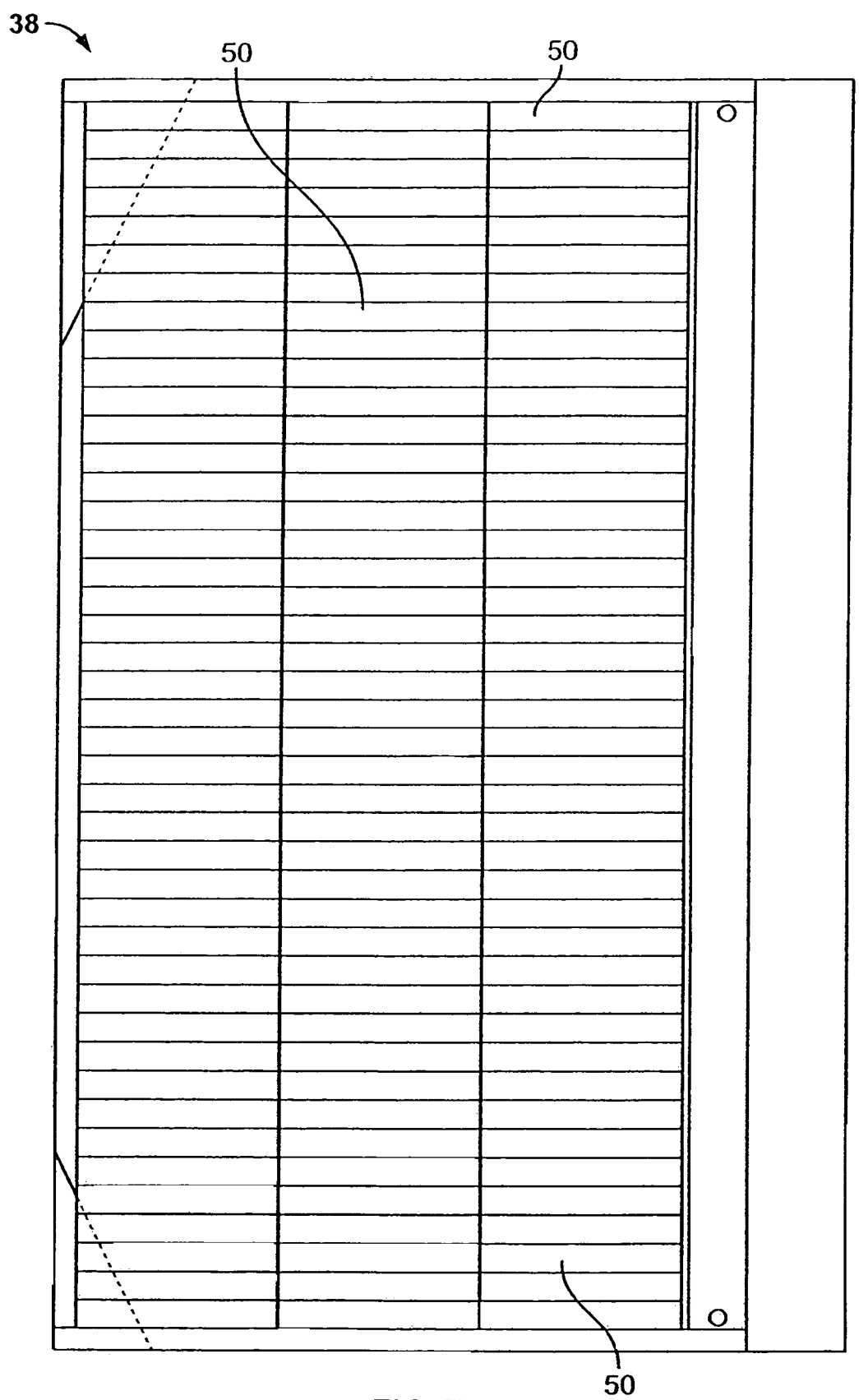
FIG. 7 is an elevational view of the article transport storage unit illustrated in FIG. 6, shown in an open condition.

FIGS. 6-9 illustrate a generally rectangular-shaped article transport storage unit 38. As best illustrated in FIG. 6, the article transport storage unit 38 includes a roller door 48 shown closed but designed to be selectively opened to grant access to the interior of the unit. The roller door 48 can incorporate catches 49 to facilitate the opening and closing process, as described below. FIGS. 7 and 8 illustrate the article transport storage unit 38 with its roller door 48 open. As shown, the interior of article transport storage unit 38 preferably includes a plurality of compartments 50 forming racks configured to receive articles slated for inventory within the article dispensing machine. The interior compartments 50 in the illustrated article transport storage unit 38 are formed by a plurality of laterally and longitudinally extending compartment boundary panels and are designed to receive a plurality of articles. Generally, a thirty inch wide, thirty-six inch long and eight inch deep article transport storage unit can store one hundred twenty DVD cases. While the compartments 50 of the illustrated article transport storage unit 38 are particularly suitable for flat pack type articles, such as DVD cases, it will be appreciated that the compartments of a particular article transport storage unit can be designed to receive a variety of types of articles, as desired. It will further be appreciated that the number of compartments in the interior of a unit can be varied to accommodate a different quantity of articles slated for inventory at a dispensing machine. In addition, an article transport storage unit may be designed to hold a plurality of types of articles and articles having a plurality of sizes and shapes, as desired.

Figure 9:
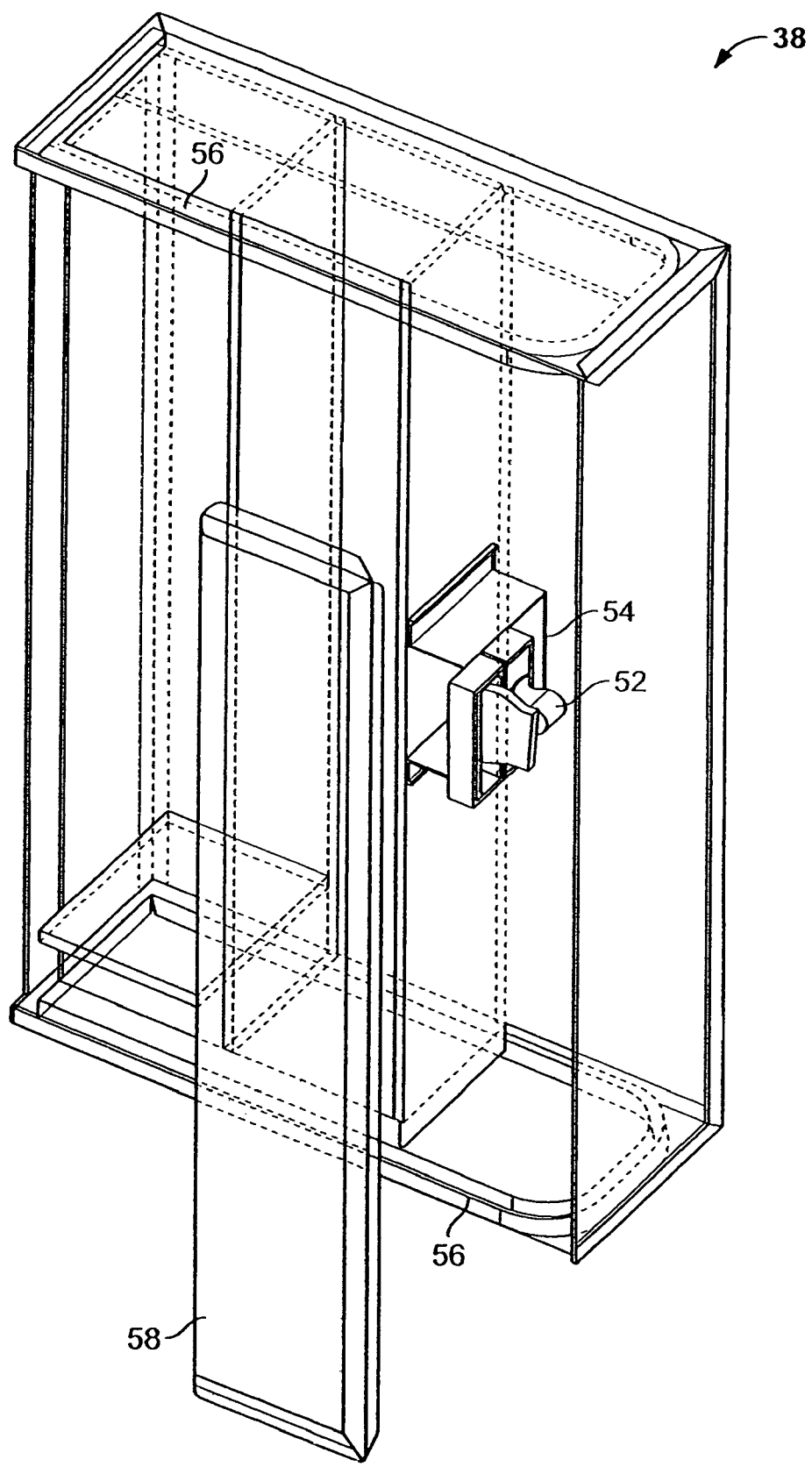
FIG. 9 is a rear perspective view of the article transport storage unit illustrated in FIG. 6.

FIG. 9 illustrates a latch block 52 positioned and designed to selectively lock the roller door 48 of the article transport storage unit. The unit also includes an electrical switch 54 in the form of a solenoid positioned and designed to cause the latch block 52 to move between two distinct positions, one of which enables movement of the roller door along its J-shaped track 56, the other of which prevents such movement. A removable cover 58 for the locking mechanism is also illustrated in FIG. 9.

With the present invention, the article transport storage units are filled with inventory at a centralized inventory supply center. Once filled with articles slated for dispensing machine inventory, the roller doors 48 of the article transport storage units 38 are closed and locked by system administration personnel. Thereafter, a particular article transport storage unit is then delivered to a particular article dispensing machine as illustrated in FIG. 1. This delivery can be made by third party delivery companies, such as overnight courier services.

The authorized serviceman initiates the appropriate routine for removal of the previously installed article transport storage unit. A variety of mechanisms can provide access to the machine by the serviceman. For example, a personal digital assistant having an infrared transmitter can actuate an optional drive motor associated with the holder mechanism and cause the previously installed article transport storage unit to be carried outside the dispensing machine housing. Additionally, the delivered article transport storage unit can include a radio frequency identification tag that can similarly actuate an optional holder mechanism drive motor. Additionally, the serviceman can enter appropriate commands at the user interface keypad to initiate the unit removal process. Furthermore, ejection of the holder can be accomplished manually.

In any event, the previously installed article transport storage unit is ejected from the housing of the dispensing machine during the removal process. The ejected unit is locked upon removal from the holder to prevent access to the articles forming the contents of the unit. In that regard, the electrical switch 54 is de-energized when the unit is removed from the holder, causing the block to move to its locked position. The removed article transport storage unit can be delivered back to an inventory supply center by the third party freight company for restocking of appropriate articles slated for inventory of a particular dispensing machine.

When the removed article transport storage unit arrives back at the inventory supply center, it can be unlocked and opened, its contents can be emptied and it can be refilled with articles, based on the desired inventory at its newly assigned dispensing machine. Thereafter, that unit can be delivered to its assigned dispensing machine to update the inventory of articles available for consumption at that machine.

Following removal of the previously installed article transport storage unit, the delivered article transport storage unit is placed on the holder mechanism. In particular, the top and bottom panels of the article transport storage unit will rest upon the extracted holder mechanism.

Upon placement of the unit onto the holder mechanism, the electrical switch is actuated, causing the block to move to its unlocked position. This allows the unit door to be opened so the interior of the unit can be accessed.

The holder mechanism can then be slid into the dispensing machine along its associated rails. This sliding can be done manually, or more preferably, under the power of the drive motor, as desired. In the event that a drive motor is used for automatic installation of the article transport storage unit, the motor can be actuated by a sensor mechanism that detects that the unit is secure within the holder mechanism. As a result, the automated installation of the delivered article transport storage unit can be done by simply placing the unit onto the holder mechanism.

In the embodiments of the dispensing machine and the article transport storage unit illustrated in FIGS. 1-10, the back panel of the article transport storage unit acts as the cover door for the dispensing machine to prevent access therein. The holder mechanism secures the article transport storage unit within the cabinet.

Upon installation of the article transport storage unit into the dispensing machine, the robotic arm positioned within the dispensing machine can open the roller door of the article transport storage unit and has access to the articles delivered for dispensing machine inventory. Alternatively, the door catches can be caught by cooperating fingers positioned within the machine housing while the holder mechanism is slid into the housing. This allows the unit to be installed into the machine housing, but prevents the door from being inserted into the housing much past the fingers to cause the door to slide along its O-shaped track, thereby opening the unit to permit access to its interior by the robotic arm.

During subsequent removal of the article transport storage unit, the roller door is closed by the robotic arm or alternatively by the action of sliding the holder mechanism out of the machine housing. The electrical switch is de-energized upon removal of the unit from the holder mechanism, causing the latch mechanism to shift into its locked position to prevent the roller door from opening and exposing the contents of the unit.

Figure 11:
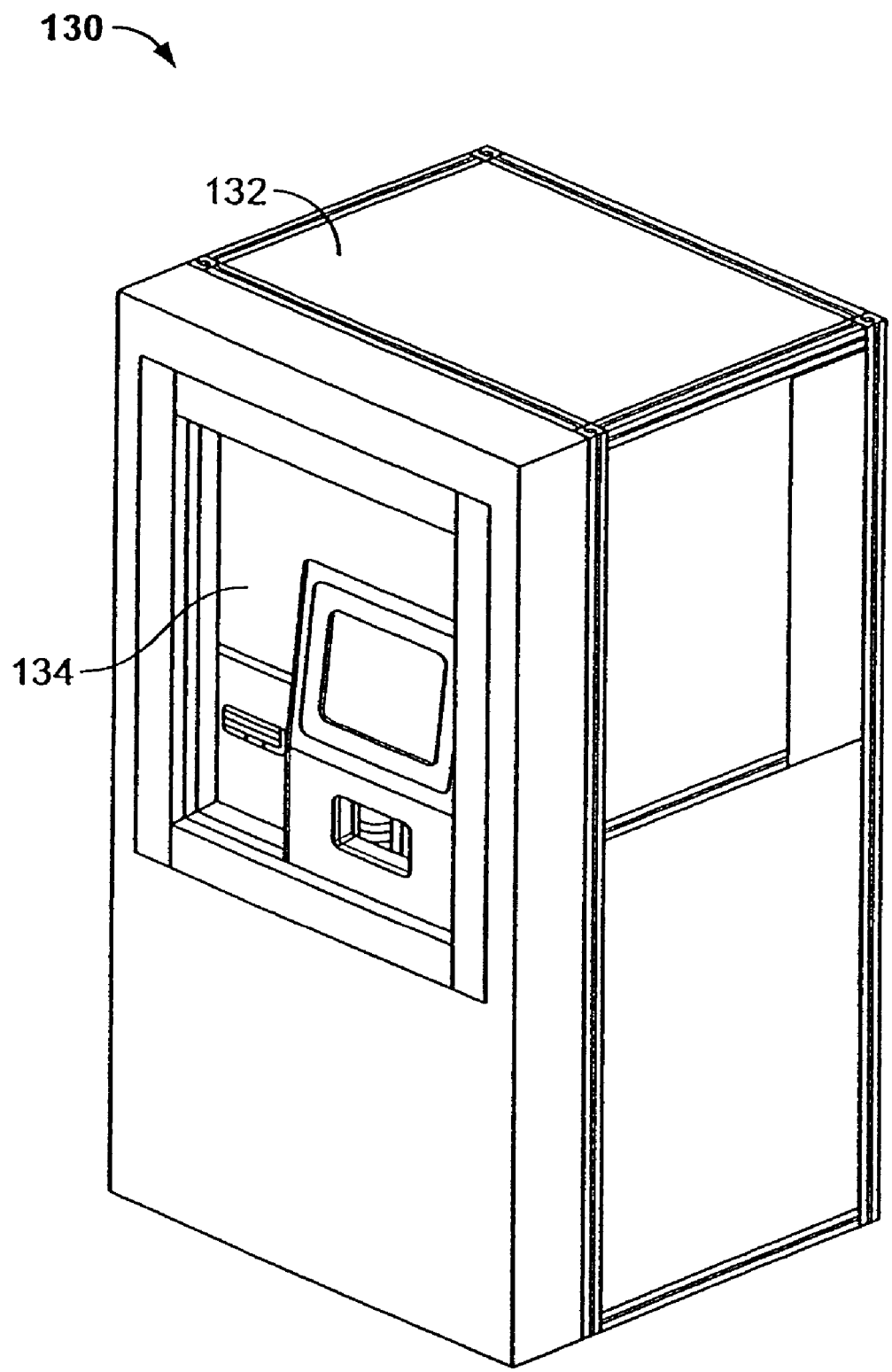
FIG. 11 is a perspective view of another embodiment of an article dispensing machine constructed in accordance with the principles of the present invention.
Figure 12:
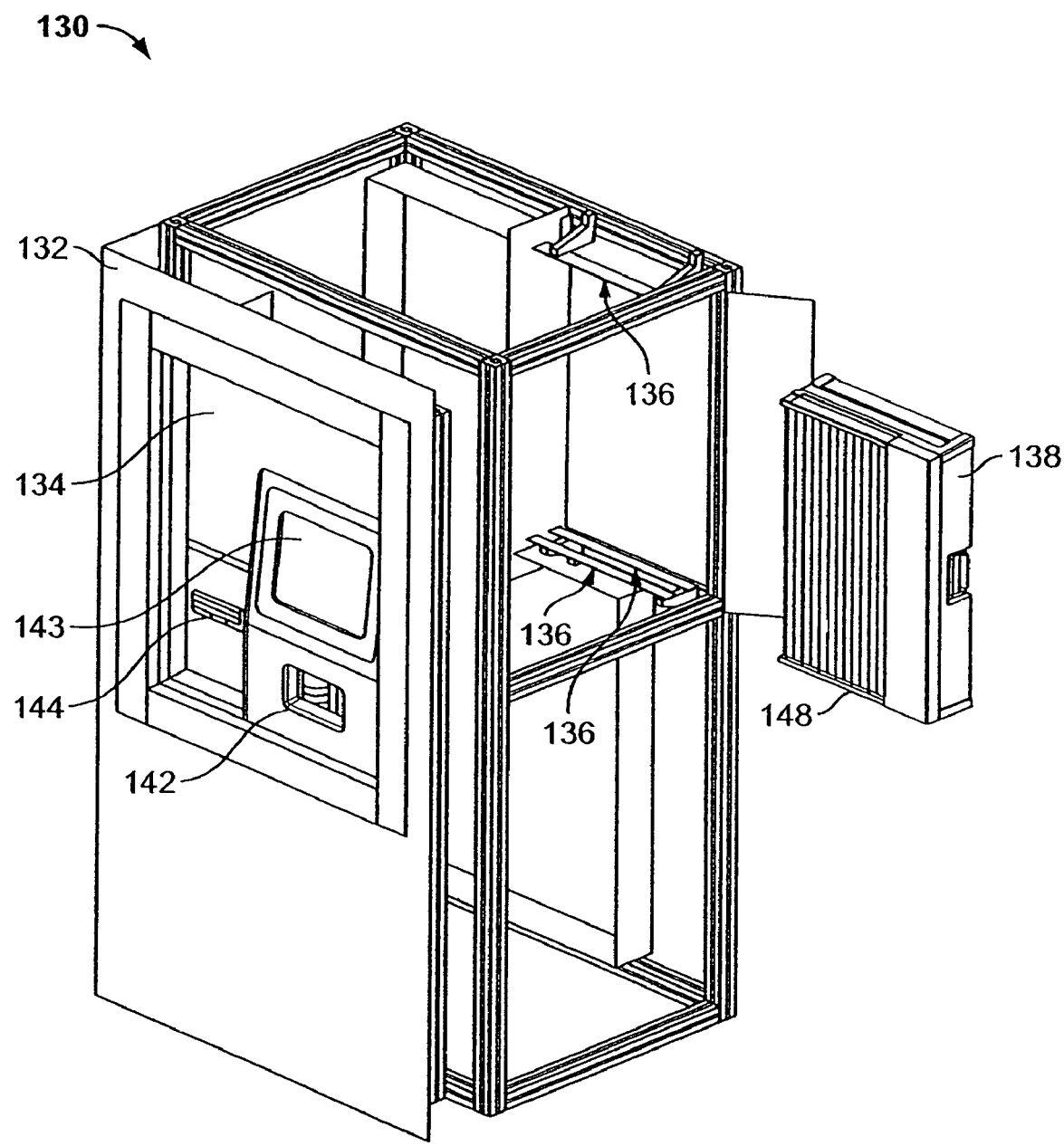
FIG. 12 is a partially exploded perspective view of the article dispensing machine illustrate in FIG. 1, along with another embodiment of an article transport storage unit constructed in accordance with the principles of the present invention.
Figure 13:
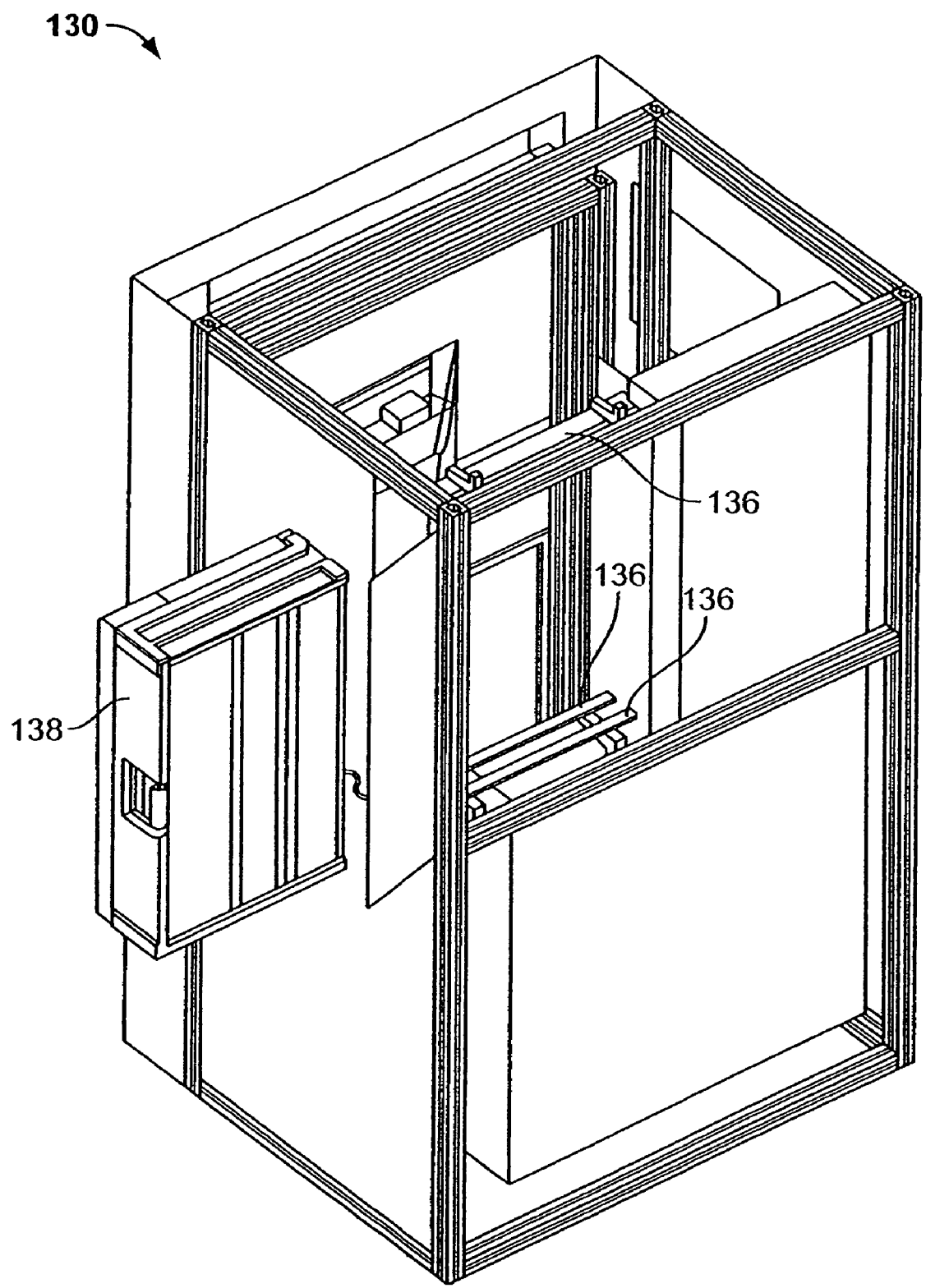
FIG. 13 is a partially exploded rear perspective view of the article dispensing machine and article transport storage unit illustrated in FIG. 13.
Figure 14:
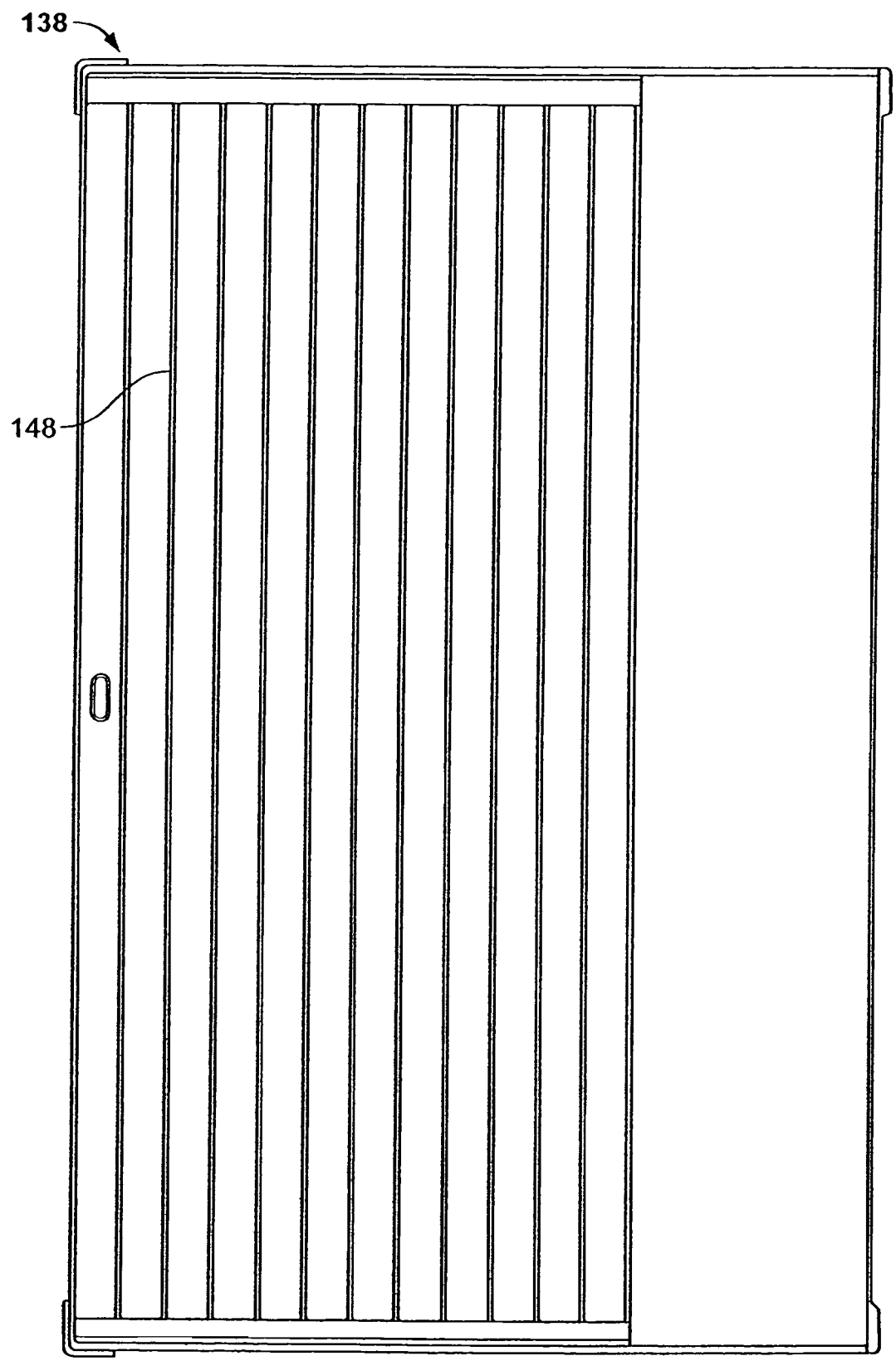
FIG. 14 is a front elevational view of the article transport storage unit illustrated in FIG. 13, shown in a closed condition.

FIGS. 11-13 illustrate another article dispensing machine generally designated 130 forming one of a plurality of article dispensing machines included within a networked article distribution system.

Article dispensing machine 130 includes a cabinet housing 132 with front, rear, top, bottom and side panels. Dispensing machine 130 further includes a user interface portion 134 and opposing rails 136 designed to receive an article transport storage unit 138, as desired. The machine housing 132 is preferably a combination molded fiberglass and sheet metal cabinet.

The user interface portion 134 of housing 132 preferably includes a card reader 142, a display monitor 143 and an article transfer opening 144. The card reader 142 is preferably designed in known fashion to read magnetically encoded membership and/or credit cards for authorizing the distribution of articles of inventory through the article transfer opening 144.

Display monitor 143 permits consumers and/or inventory stocking personnel to communicate with the dispensing machine 130 and/or a central office linked in electrical communication with the dispensing machine. Display monitor 143 also permits consumers and/or inventory stocking personnel to enter appropriate commands directed to carrying out specific machine tasks.

Display monitor 143 provides for a user interface presenting visual display of pertinent information during the servicing and distribution processes of machine 130. Display monitor 143 preferably incorporates known plasma video technology and known touch screen technology. As such, display monitor 143 preferably operates as a user interface for entry of commands designed to carry out machine tasks. Optionally, a keypad can be included to permit all or some of those functions to be carried out.

Additionally, known audio technology could be incorporated within article dispensing machine 130. Preferably, known audio technology is incorporated within dispensing machine 130 to broadcast focused audio directed to relatively small (e.g., 3 square feet) locations in front of the machines and/or in other designated locations at a hosting site.

Furthermore, it will be appreciated that additional user interface portions having additional or even identical user interface components could be incorporated within article dispensing machine 130. For example, these components could be incorporated on other panels of the housing 132 of machine 130 so that the machine can be used simultaneously by multiple consumers, translating into more efficient distribution of articles in high traffic areas.

The article transport storage unit 138 can be slid in and out of housing 132. Each article transport storage unit 138 has guides positioned along the top and bottom panels of the unit. The guides are designed to cooperate with the associated rails 136 contained within machine 130.

A robotic arm (not shown) is positioned within article dispensing machine 130. A powered drive motor (not shown) can be used to move the robotic arm. Rails are preferably included to define paths for movement of the robotic arm, and the robotic arm can preferably move in all the x, y and z directions. Using known electromechanical technology, the robotic arm can be used to open and close the article transport storage unit 138, as desired, and can further be used to move returned articles into the unit and grab and dispense requested articles from the unit, as desired.

Figure 15:
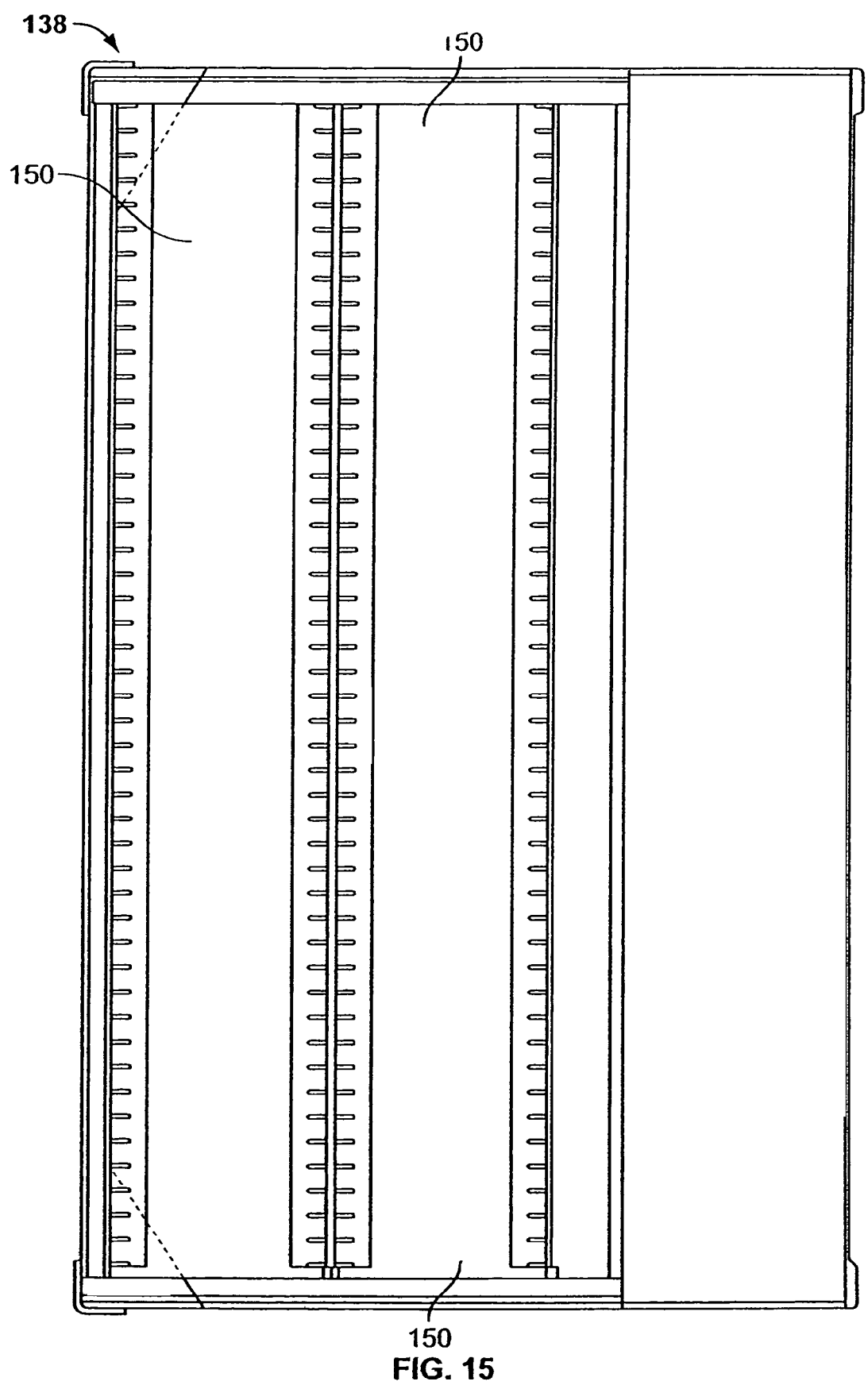
FIG. 15 is a front elevational view of the article transport storage unit illustrated in FIG. 14, shown in an open condition.
Figure 16:
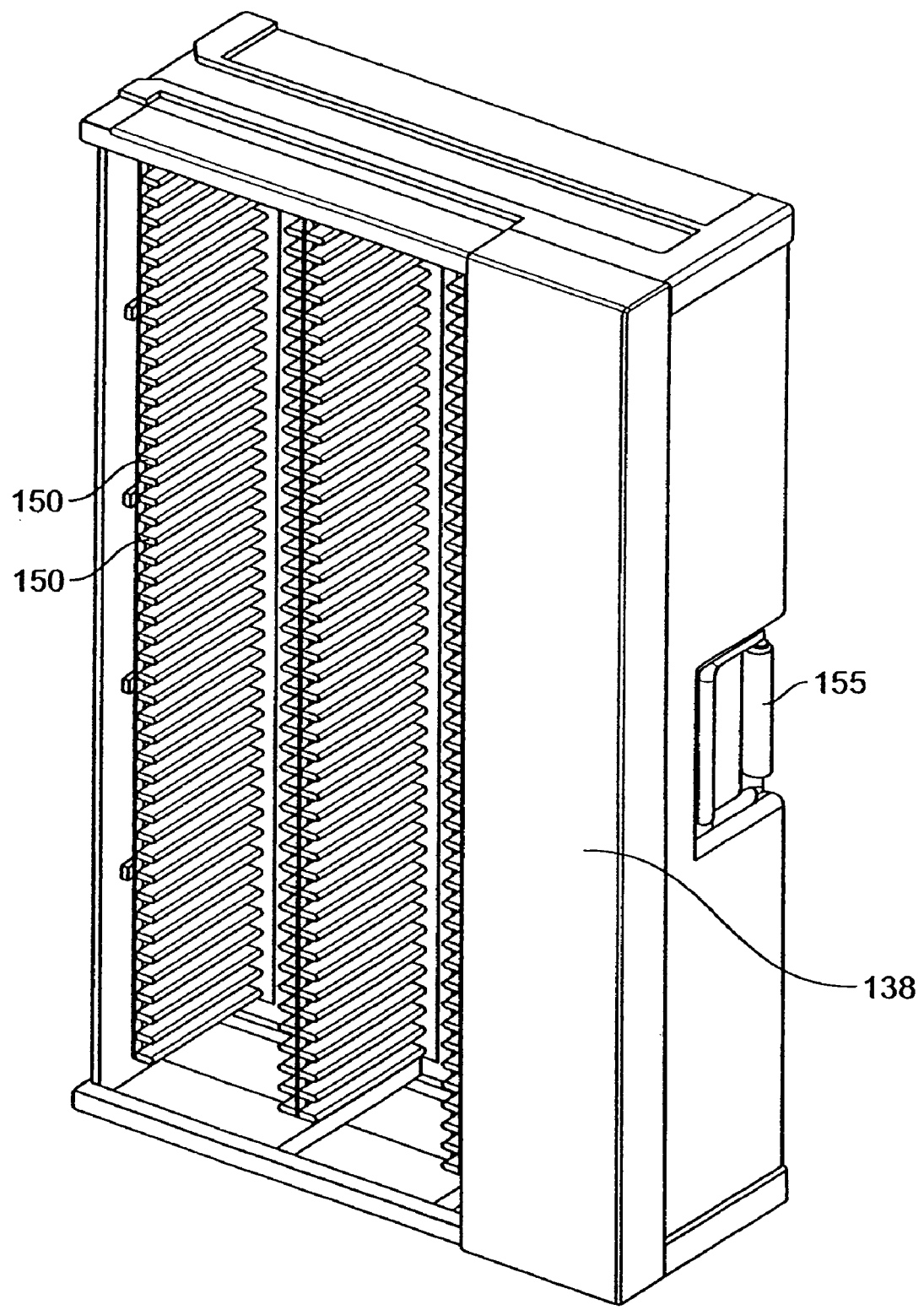
FIG. 16 is a perspective view of the article transport storage unit illustrated in FIG. 14, shown in an open condition.
Figure 17:
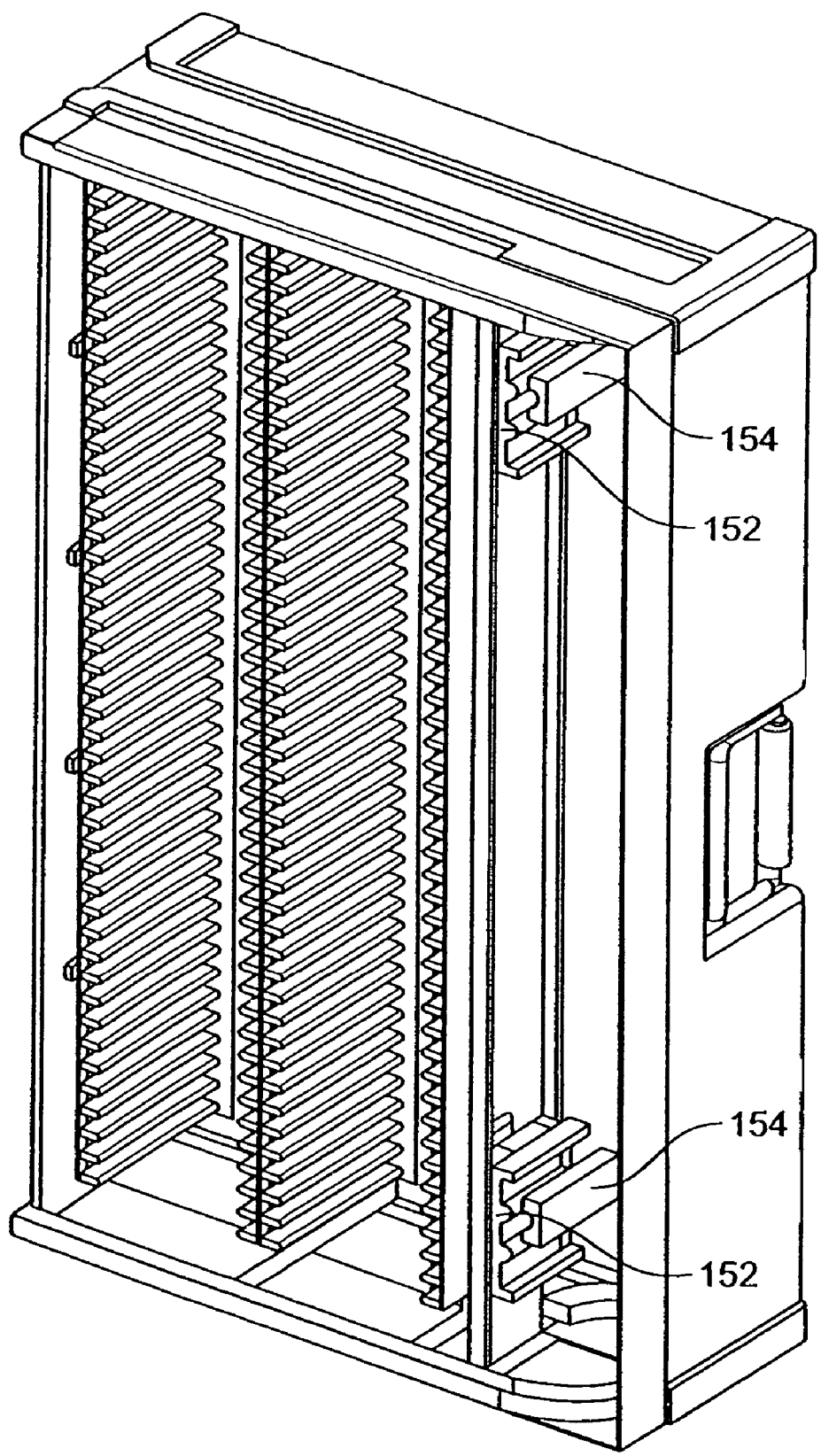
FIG. 17 is another perspective view of the article transport storage unit illustrated in FIG. 14, shown in an open condition.
Figure 18:
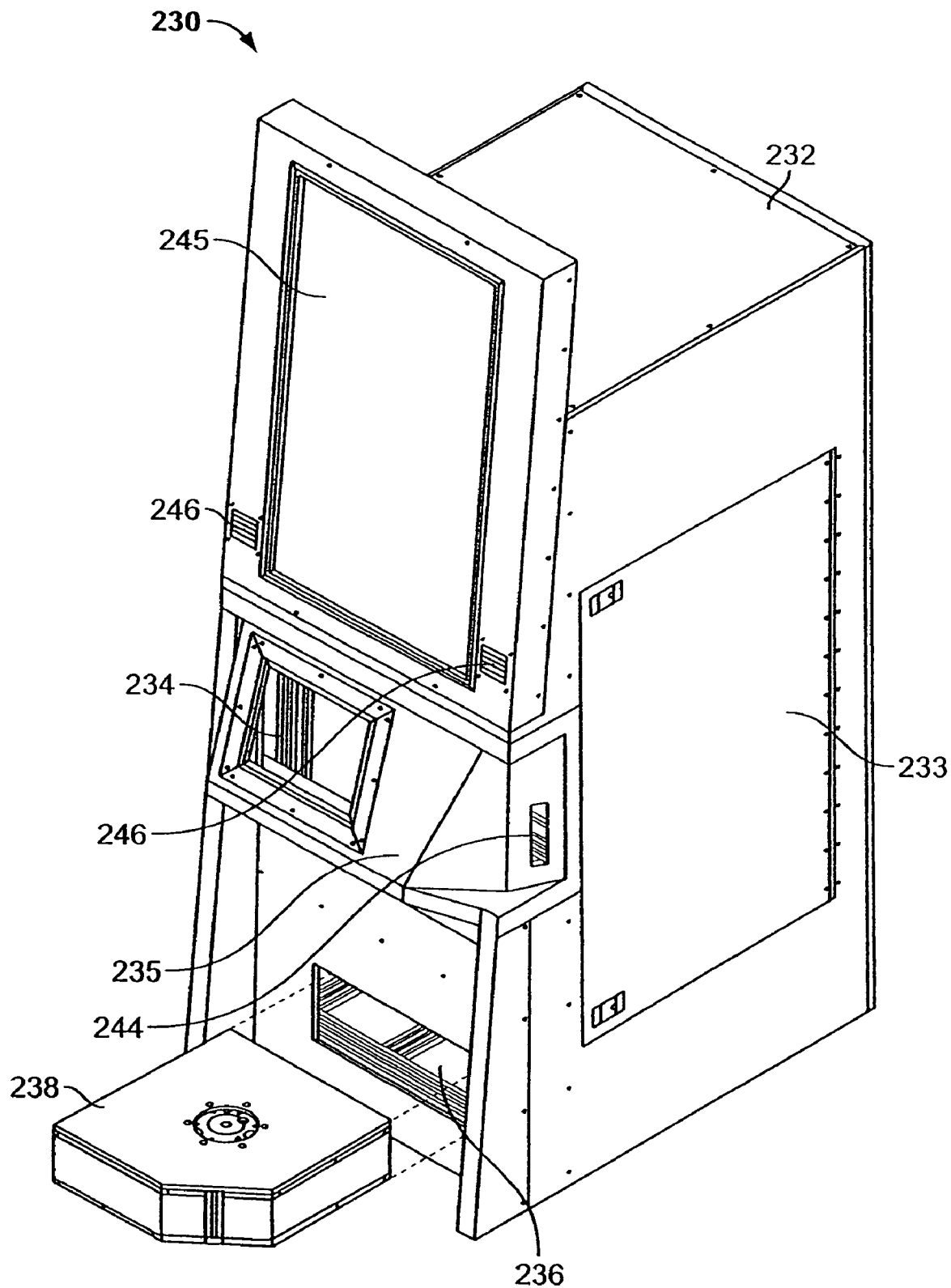
FIG. 18 is a partially exploded perspective view of another embodiment of an article dispensing machine constructed in accordance with the principles of the present invention and another embodiment of an article transport storage unit constructed in accordance with the principles of the present invention.
Figure 19:
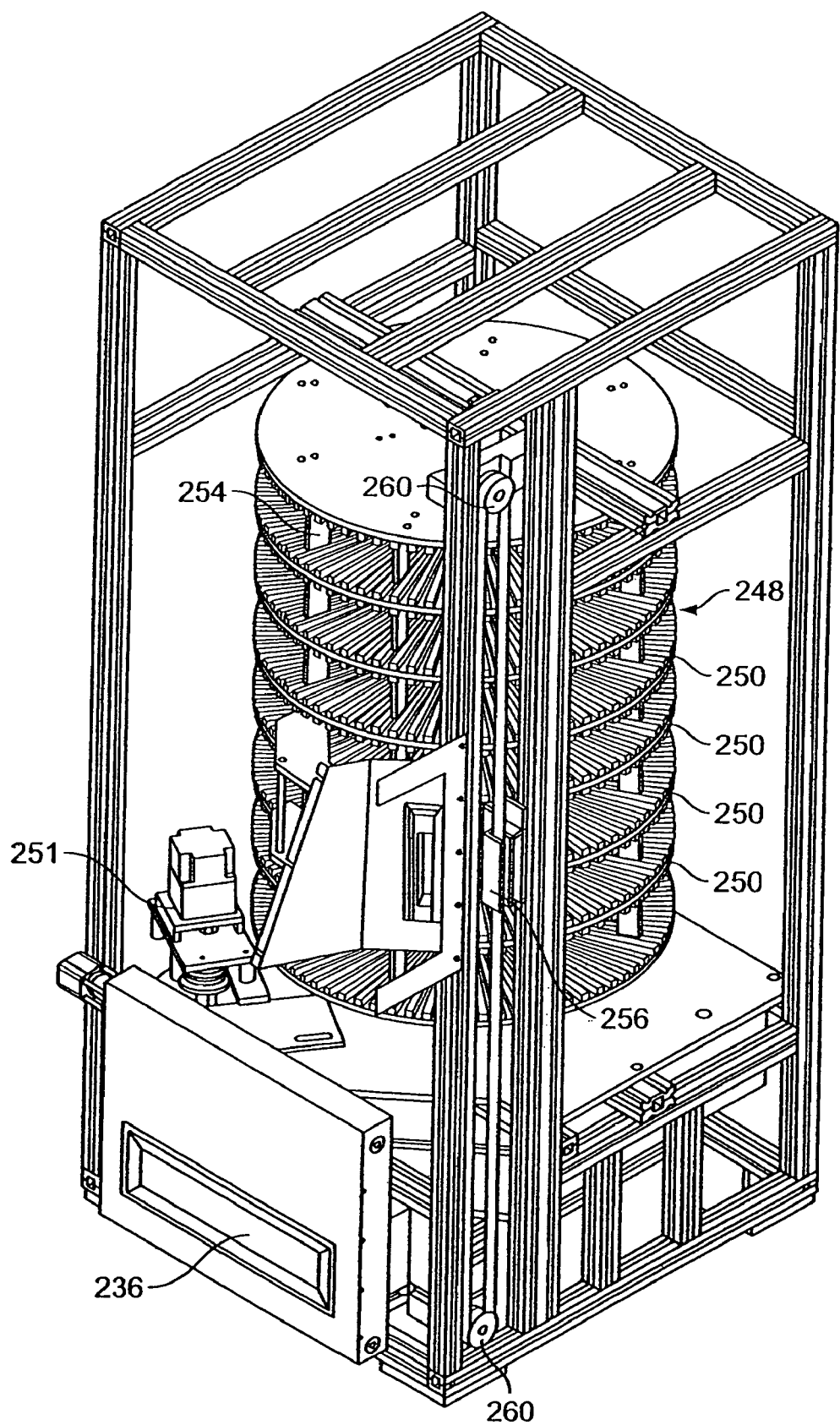
FIG. 19 is a partially open perspective view of the article dispensing machine illustrated in FIG. 18.
Figure 20:
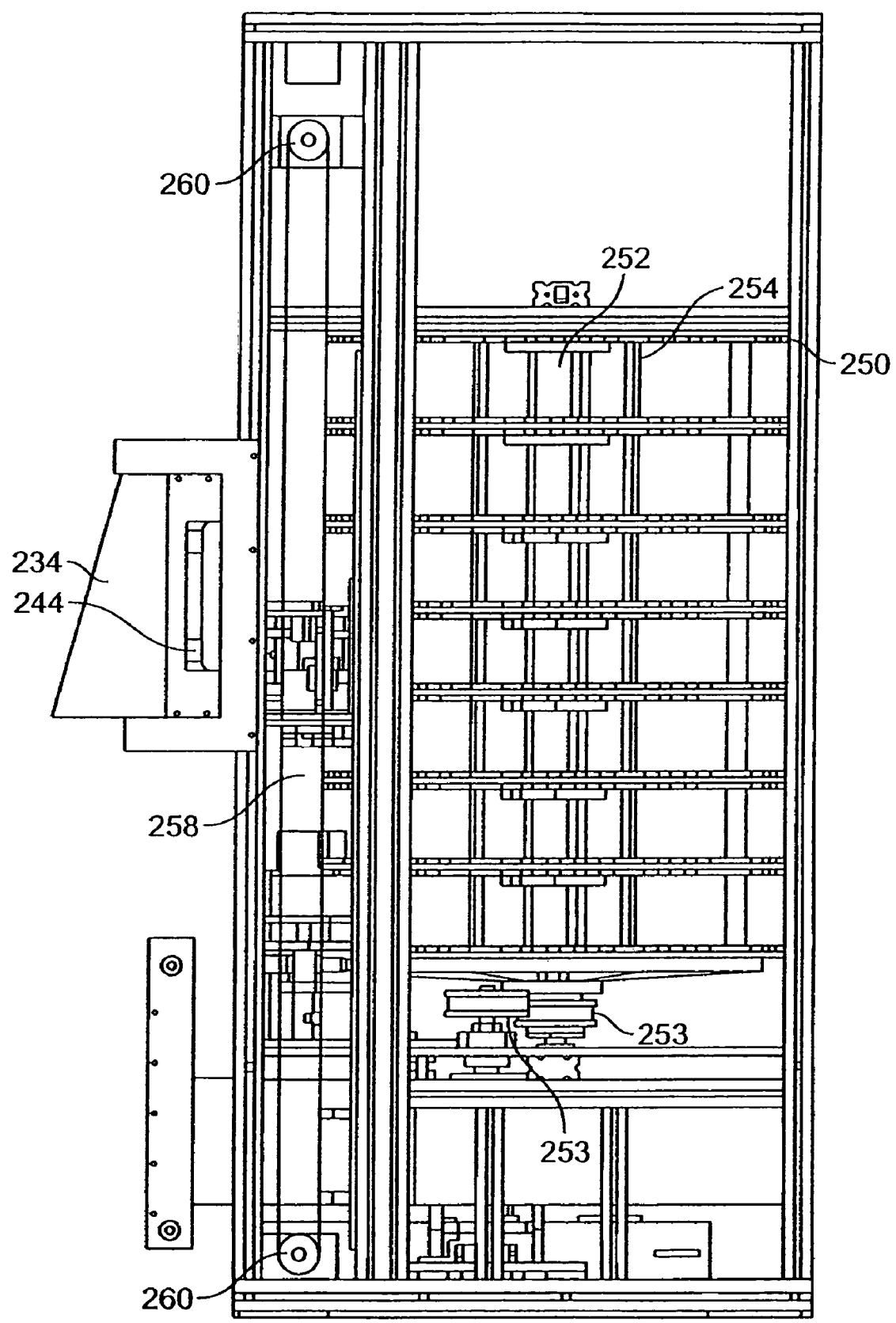
FIG. 20 is a partially open side elevational view of the article dispensing machine illustrated in FIG. 18.

FIGS. 14-17 illustrate a generally rectangular-shaped article transport storage unit 138. As used herein, the terms "article transport storage unit" and "vending delivery module" are synonymous, and refer to an apparatus for transporting a plurality of vendible media products to and from a vending apparatus 30. The article transport storage unit 138 includes a roller door 148, shown closed but designed to be selectively opened to grant access to the interior of the unit. FIGS. 15-17 illustrate the article transport storage unit 138 with its roller door 148 open. As shown, the interior of article transport storage unit 138 preferably includes a plurality of compartments 150 configured to receive articles slated for inventory within the article dispensing machine. The interior compartments 150 in the illustrated article transport storage unit 38 are formed by a plurality of longitudinally extending compartment boundary panels and a plurality of laterally extending compartment boundary panels extending from a longitudinally extending boundary panel partially towards another longitudinally extending boundary panel. The laterally extending boundary panels can be aligned to retain opposite ends of the same side of flat-pack type article.

While the compartments 150 of the illustrated article transport storage unit 138 are particularly suitable for flat-pack type articles, such as DVD cases, it will be appreciated that the compartments of a particular article transport storage unit can be designed to receive a variety of types of articles, as desired. It will further be appreciated that the number of compartments in the interior of a unit can be varied to accommodate a different quantity of articles slated for inventory at a dispensing machine. In addition, an article transport storage unit may be equipped with racks having compartments of different types so that it is designed to hold a plurality of types of articles and articles having a plurality of sizes and shapes, as desired.

FIG. 17 illustrates latch blocks 152 positioned and designed to selectively lock the roller door 148 of the article transport storage unit. The unit also includes electrical switches 154 positioned and designed to cause the latch blocks 152 to enable and prevent the roller door to be opened.

With the present invention, the article transport storage units are filled with inventory at a centralized inventory supply center. Once filled with articles slated for dispensing machine inventory, the roller doors 148 of the article transport storage units 138 are closed and locked by system administration personnel. Thereafter, a particular article transport storage unit is then delivered to a particular article dispensing machine. The article transport storage unit 138 preferably includes a handle 155 to facilitate delivery. Delivery of an article transport storage unit to the hosting site can be made by third party delivery companies, such as overnight courier services.

The authorized serviceman initiates the appropriate routine for removal of the previously installed article transport storage unit. A variety of mechanisms can provide access to the machine by the serviceman. For example, a personal digital assistant having an infrared transmitter can unlock a side door panel of the machine and provide access by the serviceman. Additionally, the delivered article transport storage unit can include a radio frequency identification tag that can similarly actuate the holder mechanism drive motor. Additionally, the serviceman can enter appropriate commands at the user interface keypad to initiate the unit removal process.

In any event, the previously installed article transport storage unit is accessible and removable from the housing of the dispensing machine during the removal process. The previously installed unit is locked prior to it being accessible, thereby securing the articles forming the contents of the unit. In particular, once the previously installed unit is moved from its fully inserted position, the electrical switches are deactivated (de-energized), causing the latch blocks to move into their locked positions. Once removed, the previously installed article transport storage unit can be delivered back to an inventory supply center by the third party freight company for restocking of appropriate articles slated for inventory of a particular dispensing machine.

When the removed article transport storage unit arrives back at the inventory supply center, it can be unlocked and opened, its contents can be emptied and it can be refilled with articles, based on the desired inventory at its newly assigned dispensing machine. Thereafter, that unit can be delivered to its assigned dispensing machine to update the inventory of articles available for consumption at that machine.

Following removal of the previously installed article transport storage unit, the delivered article transport storage unit is installed into the dispensing machine. In particular, the guides are slid into cooperating relationship with the rails within the machine so that the unit rests upon the rails and is secured thereby.

In the embodiments of the dispensing machine and the article transport storage unit illustrated in FIGS. 11-17, the rails and guides cooperate to secure the article transport storage unit within the cabinet.

Upon installation of the article transport storage unit into the dispensing machine to its fully inserted position, the electrical switches are actuated, causing the latch blocks to move to their unlocked positions. As a result, the roller door associated with the unit is permitted to be opened. Opposing latches on opposite sides of the unit allow the unit roller door to be opened only when mating latches meet up with their counterparts. When actuated, these elements unlock the door and the door will open or close as the unit moves in or out of the machine. An electronic solenoid in the article transport storage unit is actuated and unlocks the roller door only when the proper electronic connection is made between the unit and the machine. Under these circumstances, the roller door will open or close as the magazine moves in or out of the machine. As the magazine is pulled into the vending machine, the magazine will lock into place allowing new articles to be uploaded into the vending machine. The robotic arm positioned within the dispensing machine then opens the door and thereafter has access to the articles delivered for dispensing machine inventory.

During subsequent removal of the article transport storage unit, the roller door is closed by the robotic arm and the latch mechanism is shifted into its locked position to prevent the roller door from opening and exposing the contents of the unit. This closing and locking of the roller door can be carried out prior to unlocking the side door panel and making the article transport storage unit accessible. These actions will take place once the unit moves from its fully inserted position.

FIGS. 18-21 illustrate another preferred embodiment of an article dispensing machine generally designated 230 forming one of a plurality of article dispensing machines included within a networked article distribution system. Article dispensing machine 230 includes a cabinet housing 232 with front, rear, top, bottom and side panels. The illustrated side panel of cabinet housing 232 preferably includes a door panel 233 that can be opened for repair of components included within machine 230.

The machine housing 232 is preferably a combination molded fiberglass and sheet metal cabinet. However, those skilled in the art will appreciate that the housing can be constructed from a variety of other suitable materials and with a variety of other suitable manufacturing techniques.

Dispensing machine 230 further includes a user interface portion and an article transport storage unit transfer opening 236 with an associated door designed to receive an article transport storage unit 238, as desired. The user interface portion of housing 232 can include a touch activated display screen 234 for input of commands, a card reader 235 and an article transfer opening 244. The article transfer opening 244 permits distribution of requested articles through the opening and receipt of returned articles through the opening.

The card reader 235 (details not shown) is preferably designed in known fashion to read magnetically encoded membership and/or credit cards for authorizing the distribution of articles of inventory through the article transfer opening 244. The touch screen 234 permits consumers and/or inventory stocking personnel to communicate with the dispensing machine 230 and/or a central office linked in electrical communication with the dispensing machine. Touch screen 234 also permits consumers and/or inventory stocking personnel to enter appropriate commands directed to carrying out specific machine tasks.

In particular, the display monitor of the dispensing machine 230 preferably incorporates known touch screen technology. As such, it provides for a user interface presenting visual display of pertinent information during the servicing and distribution processes of machine 230 and operates as a user interface for entry of commands designed to carry out machine tasks.

The dispensing machine 230 preferably includes an additional display monitor 245. Display 245 preferably incorporates known plasma video technology and provides for display of trailers, advertisements and other desired point-of-purchase video effects.

Dispensing machine 230 also preferably includes speaker units 246. Preferably, known audio technology is incorporated within dispensing machine 230 to broadcast focused audio directed to relatively small (e.g., three square feet) locations in front of the machines from speaker units 246 and/or in other designated locations at a hosting site.

Referring now to components positioned in the interior of dispensing machine 230, the machine includes a storage rack unit 248 having a plurality of circular-shaped storage racks 250 sharing a common central axis. A motor 251 is configured to drive a shaft 252, which is positioned along the common central axis of storage rack unit 248 to provide for rotation of the storage racks 250, as desired. Wheels 253 are included to receive a belt used to rotate the wheels and, in turn, rotate shaft 252.

Each storage rack 250 includes radially extending, angularly separated compartment panels defining article receiving compartments designed to receive and retain flat-type pack articles, such as DVD cases, as desired. The compartment panels are preferably axially aligned to retain the opposing sides of DVD cases at the top and bottom ends thereof. In that regard, the DVD cases are preferably retained between successive vertical pairs of storage racks 250. The storage racks 250 are vertically spaced by axially extending support members 254.

The dispensing machine includes a robotic arm 256 that is connected to a conveying belt 258 carried by rollers 260. At least one of the rollers 260 is driven by a motor to provide for movement of robotic arm 256.

Figure 21:
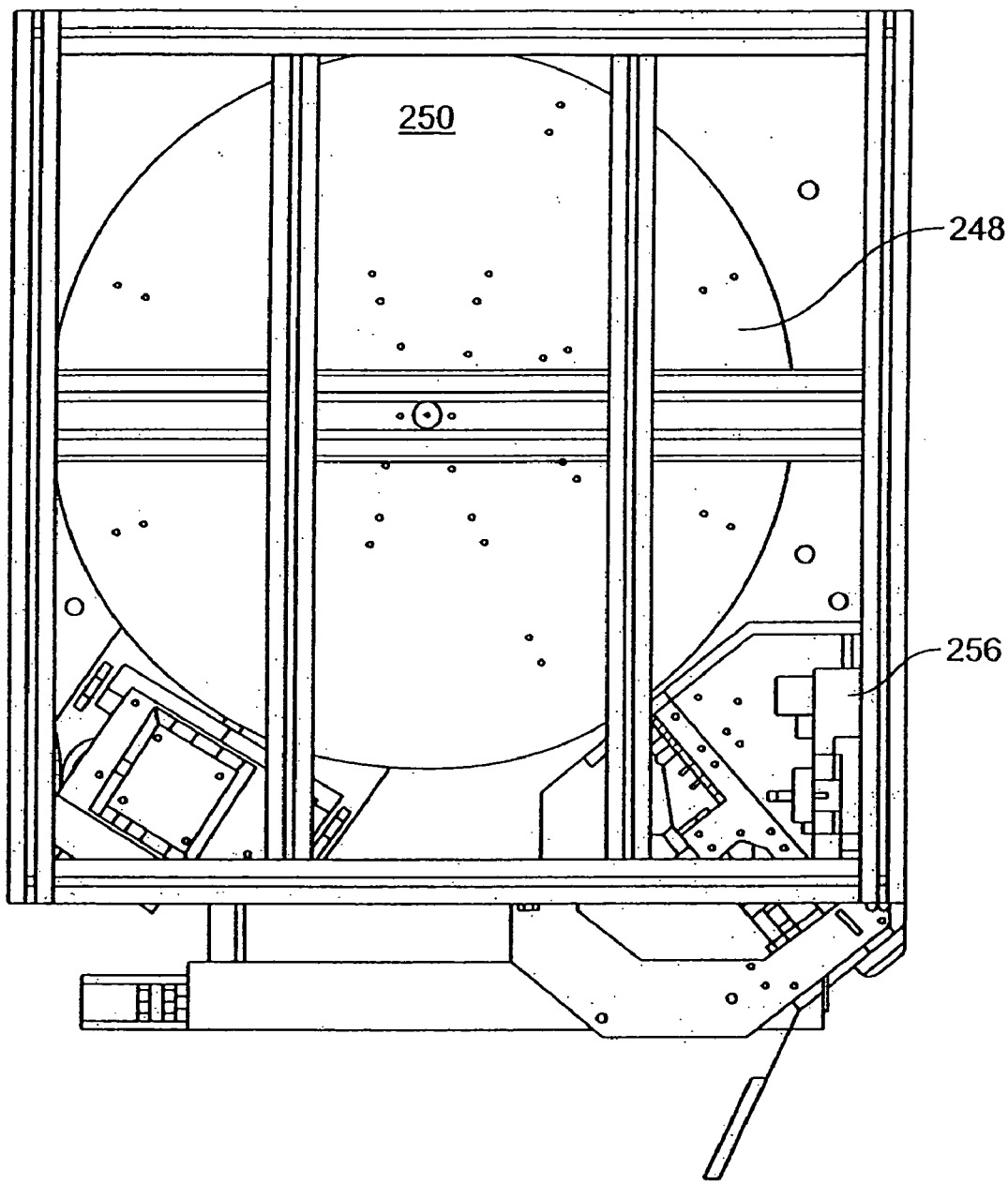
FIG. 21 is a partially open top view of the article dispensing machine illustrated in FIG. 18.
Figure 22:
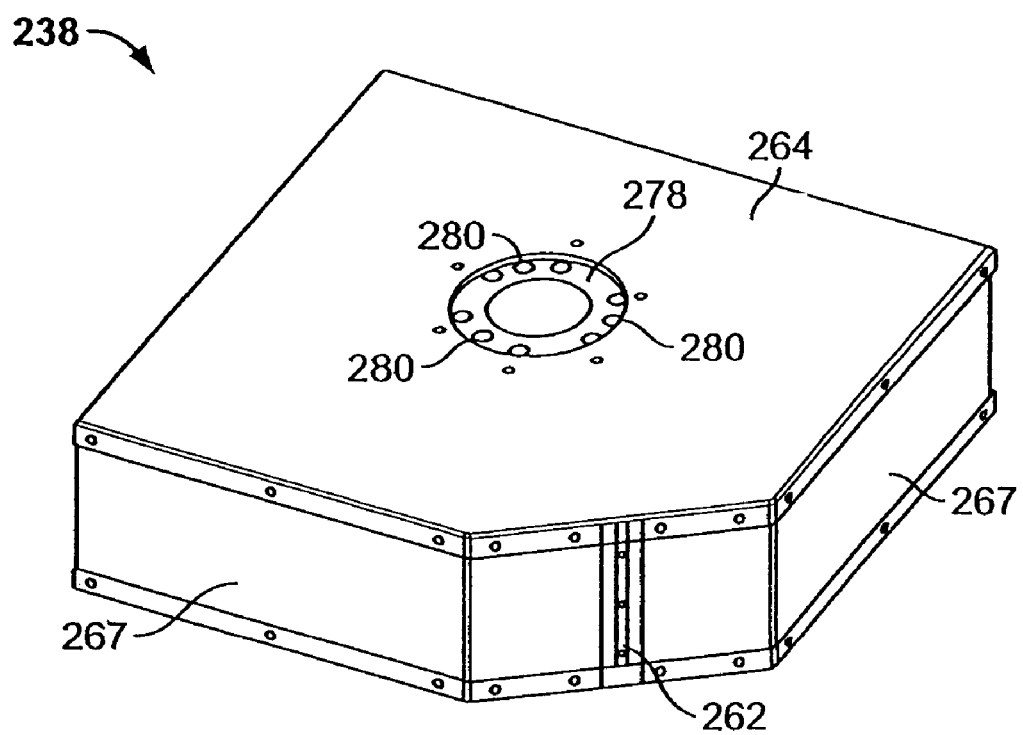
FIG. 22 is a perspective view of the article transport storage unit illustrated in FIG. 18.
Figure 23:
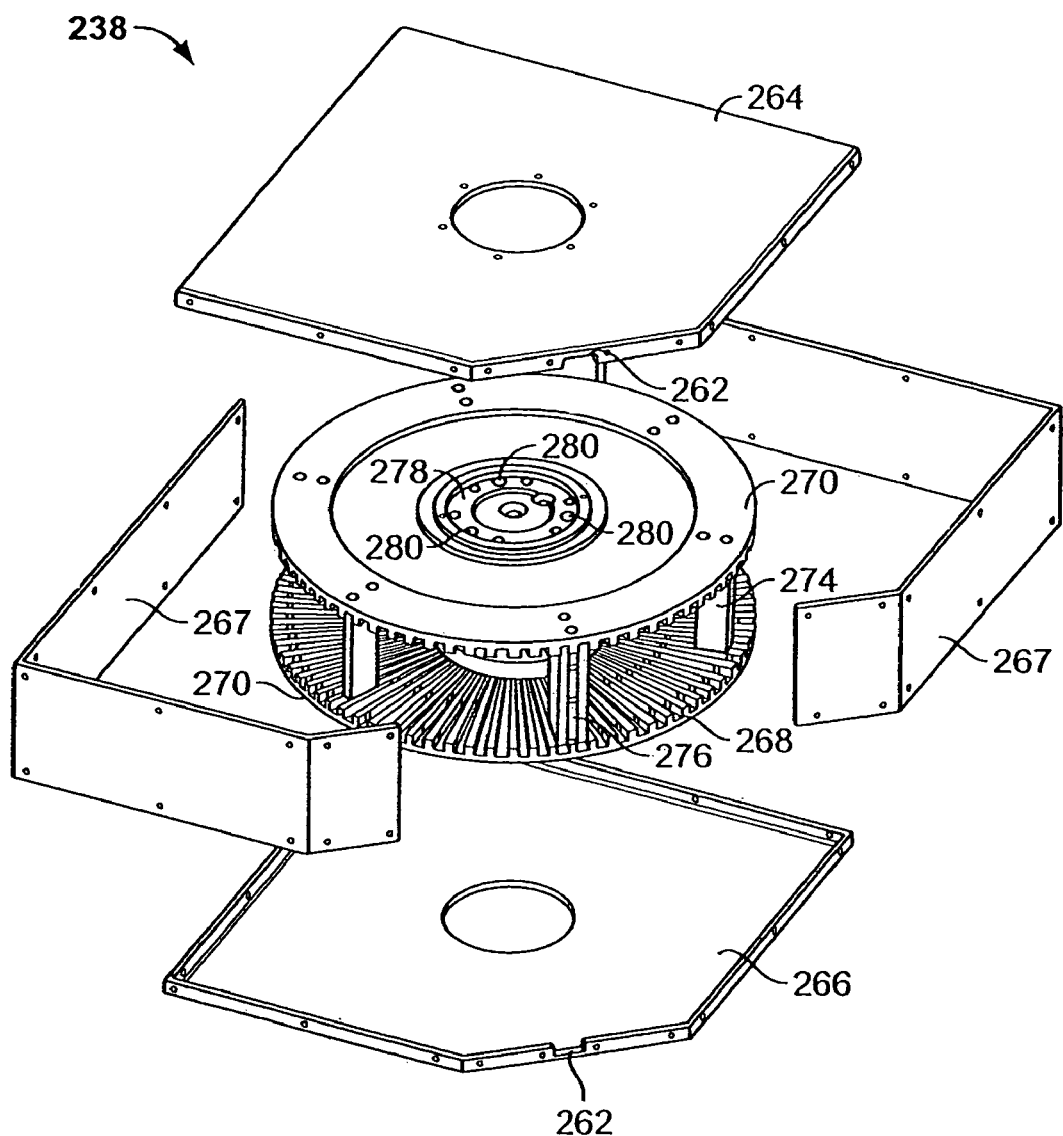
FIG. 23 is an exploded perspective view of the article transport storage unit illustrated in FIG. 18.

FIG. 21 illustrates an article transport storage unit 238 having a generally square configuration with a cut off corner. The article transport storage unit 238 is designed to have an opening 262, which permits articles to be removed from and inserted into the unit.

Article transport storage unit 238 includes a top panel 264 having a shaft aligned bore extending through it, a bottom panel 266 also having a shaft aligned bore extending through it, side panels 267, and a storage rack unit 268 illustrated as having two axially aligned, circular-shaped storage racks 270. As shown, top panel 264, bottom panel 266 and side panels 267 are constructed to form opening 262 when assembled.

Each storage rack 270 includes radially extending, angularly separated compartment panels defining article receiving compartments designed to receive and retain flat-type pack articles slated for inventory, such as DVD cases, as desired. The compartment panels are preferably axially aligned to retain the opposing sides of DVD cases at the top and bottom ends thereof. In that regard, the DVD cases are preferably retained in compartments illustrated as slots formed between successive vertical pairs of storage racks 270.

The storage racks 270 are vertically spaced by axially extending support members 274. In addition, a closing member 276 configured from two adjacent locked slots extends between the storage racks and is designed to prevent access to the articles stored within article transport storage unit 238 when the closing member is axially aligned with opening 262.

Again, it will be appreciated that the compartments of a particular article transport storage unit can be designed to receive a variety of types of articles, as desired. It will further be appreciated that the number of compartments in the interior of a unit can be varied to accommodate a different quantity of articles slated for inventory at a dispensing machine. In addition, an article transport storage unit may be designed to hold a plurality of types of articles and articles having a plurality of sizes and shapes, as desired.

The storage rack unit 268 also includes a centrally positioned, locking rotational mechanism 278 designed to permit selective rotation of the storage rack unit within the interior of article transport storage unit 238. It will be appreciated that storage rack unit 268 cannot be rotated within article transport storage unit 238, absent locking rotational mechanism 278 being actuated by a cooperating unlocking mechanism. It will further be appreciated that the shaft 252 within article dispensing machine 230 includes a cooperating unlocking mechanism and that additional unlocking mechanisms are available at a centralized inventory supply center. In the arrangement shown, the article transport storage unit 238 includes locking pins 280 that, when depressed, permit the storage rack unit to be rotated.

With the present invention, the article transport storage units 238 are filled with inventory at a centralized inventory supply center. Once filled with articles slated for dispensing machine inventory, an unlocking mechanism is brought into cooperating engagement with locking mechanism 278 and implemented to cause rotation of storage rack unit 268 to align closing member 276 with opening 262. In particular, pins 280 are depressed and the storage rack unit 268 is rotated until closing member 276 is aligned with opening 262. Thereafter, the unlocking mechanism is removed from engagement with locking mechanism 278 and access to the contents within article transport storage unit 238 is prevented. These steps are preferably performed by authorized system administration personnel.

Thereafter, a particular article transport storage unit 238 is then delivered to its destined article dispensing machine 230. This delivery can be made by third party delivery companies, such as overnight courier services.

The authorized serviceman initiates the appropriate routine for removal of the previously installed article transport storage unit. A variety of mechanisms can provide access to the machine by the serviceman. For example, a peripheral device, such as a personal digital assistant having an infrared transmitter, can initiate the removal process. Additionally, the delivered article transport storage unit 238 can include a radio frequency identification tag that can similarly initiate the removal process. Additionally, the serviceman can enter appropriate commands at the user interface (e.g., touch screen and/or keypad) to initiate the unit removal process.

In any event, any additional inventory to be offloaded is delivered from storage rack unit 248 to storage rack unit 268 in the article transport storage unit 238 and loaded into unit 238. This offloading process is carried out by robotic arm 256 and shaft 252, which has been brought into engagement with the locking rotational mechanism 278 of the previously installed unit.

The article transport storage unit ejection process is then commenced. Shaft 252 is actuated to rotate storage rack unit 268 until closing member 276 is axially aligned with opening 262. Thereafter, shaft 252 is raised, or alternatively article transport storage unit 238 is lowered, to bring the shaft out of engagement with the locking rotational mechanism 278 of the previously installed article transport storage unit 238. In particular, fingers (not shown) associated with the shaft can be brought out of engagement with locking pins 280 so that the pins are no longer depressed. This causes the previously installed article transport storage unit 238 to be locked and prevents access to the articles forming the contents of the unit. The door associated with opening 236 is opened. The previously installed article transport unit 238 is then automatically ejected from dispensing machine 230 so that it can be removed through opening 236.

The article transport storage unit 238 is then removed and delivered back to an inventory supply center by the third party freight company for restocking of appropriate articles slated for inventory of a particular dispensing machine.

When the removed article transport storage unit arrives back at the inventory supply center, its contents can be emptied and it can be refilled with articles, based on the desired inventory at its newly assigned dispensing machine. Thereafter, that unit can be closed, locked and then delivered to its assigned dispensing machine to update the inventory of articles available for consumption at that machine.

Following removal of the previously installed article transport storage unit, the delivered article transport storage unit 238 is inserted into article transfer opening 236 for installation within dispensing machine 230. The installation processor may be completed by using either a tractor, or by manual effort. After being partially inserted into opening 236, a tractor (not shown) completes the installation process. The article transport storage unit 238 is automatically positioned so that it is centrally aligned with shaft 252. The automatic positioning and installation of article transport storage unit 238 can be actuated by a sensor mechanism that detects that the unit has been inserted into article transfer opening 236. It will be understood that the process may be performed either manually, or automatically.

Upon installation of the article transport storage unit 238 into the dispensing machine, the unit is raised so that the unlocking fingers associated with shaft 252 are brought into engagement with and press against pins 280 of locking rotational mechanism 278 and an inventory storage process is then commenced. Shaft 252 rotates storage rack unit 268, successively causing articles stored within article transport storage unit 238 to be aligned with opening 262. Robotic arm 256 is then actuated to grab each article of inventory, remove that article from the unit, carry that article to its desired location on one of the storage racks 250 of storage rack unit 248 and insert that article into the proper compartment.

In its preferred form, electronic records are stored within a storage unit (e.g., hard drive unit) related to each of the inventory supply and removal process. For example, the delivered article transport storage unit is preferably identified and accepted by the dispensing machine prior to commencement of the removal and installation processes.

In addition, each article of inventory removed from the storage rack unit fixed within the dispensing machine housing and delivered to the storage rack unit contained within the article transport storage unit is preferably scanned and identified by the dispensing machine. Similarly, each article of inventory removed from the storage rack unit contained within an installed article transport storage unit and delivered to the storage rack fixed within the dispensing machine housing is preferably scanned and identified by the dispensing machine, along with an identification of its stored position on the storage rack unit. Electronic records are preferably stored in the system regarding this information.

Each article of inventory dispensed from a dispensing machine is also preferably scanned and an electronic record is created indicating the consumer who rented and/or purchased the media. In addition, articles of inventory returned to a dispensing machine by a customer and inserted into the article transfer opening thereof are preferably scanned and identified by the dispensing machine (for example with a bar code reader or scanner in electronic communication with the dispensing machine controller, positioned proximate the media dispending/return opening) along with an identification of its later stored position on the storage rack unit.

These electronic records can be shared among dispensing machines within a network thereof, and can also be shared with a centralized office via the Internet or any other electronic data communication link. These electronic records can be used to ensure that the inventory process is carried out efficiently and accurately.

Electronic records will also be transmitted to the machines indicating the new articles slated for inventory and uploaded into the machine. Therefore, when new inventory is loaded into a machine, each article can be inspected and scanned for verification.

Article dispensing machine 230 incorporates a slot loading drive in electronic communication with a storage unit (e.g., hard drive) for the machine. The DVD drive can receive an uncased DVD from the robotic arm. The END drive then reads the content from the DVD media. The content is stored on the storage unit in the form of one or more computer files. The content is then available for fast access and presentation on the plasma video monitor. Accordingly, video, such as video related to a desired advertisement or trailer, can be read from DVD media at the machine location. The video content read from the END media is stored in the storage unit and can be accessed and played on display monitor 245, as desired.

As a consumer approaches a dispensing machine, the consumer observes the display monitor and the user interface. The consumer may also observe a plasma/LCD monitor displaying marketing information, or a lightbox containing marketing information for branding the vending apparatus 30. The consumer then enters the appropriate commands at the user interface control system associated with the dispensing machine to select a DVD to be dispensed by the machine. The user interface control system 49 can employ simple menus and a fixed set of keys for consumers to make their selections, it can employ break-resistant touch screens, or it can employ a combination of both. Once a selection has been made, the consumer would then merely insert his/her magnetically encoded dispense activation card into the card reader slot positioned at the front of the dispensing machine and, in response, the machine will dispense the selected DVD without the need for further input by the consumer.

It is not necessary for a consumer to become a member of a video rental program in order to rent a movie. As an alternative, consumer can simply pay for rentals by credit card instead. With appropriate hardware, the machine is also configurable to accept currency.

For those consumers having a rental membership, the DVD rental experience can more readily be customized. The member can insert his/her membership card into the card reader and enter his/her personal identification number ("PIN") when prompted through the user interface control system. In response to these commands, the consumer is presented with a customized, personal start-up menu. From this personalized menu, which can be customized to have suggested titles scroll across the screen based on past renting patterns of the particular member and/or all members at the particular hosting location, the member selects a previously reserved movie or selects a new movie from the list of titles embodied in DVD media contained within the inventory of the dispensing machine. Once the selection has been made, the robotic arm incorporated in the machine will grab and cause the selected DVD to be dispensed, preferably in less than twenty seconds. The specific user request made at the machine (e.g., renting a new movie or payment by credit card) is then sent via satellite feed or DSL or cable modem or via the Internet to a centralized system office in real-time for processing. Such a procedure ensures accurate and rapid handling of every user request as well as secure billing to any credit card account of the consumer.

When a consumer returns a DVD to a dispensing machine, he/she, if he/she is a member, can insert the membership card into the card reader on the front of the machine, enters his/her personal identification number when prompted and inputs the appropriate additional commands to initiate the return process. The consumer then inserts the DVD into the dispensing/receiving receptacle on the front of the machine. A bar code reader inside the machine then scans the returned DVD for its unique code and places the returned DVD back into the physical inventory of the machine to await the next rental of that DVD. As an added convenience, consumers will have the option of returning a DVD to machines other than the one from which they originally rented the movie, preferably but not necessarily for an additional charge to cover any additional incremental administrative costs.

The machines and software are preferably configured to automatically produce and deliver a printed receipt to consumers renting or purchasing DVDs from a machine. They can also preferably send an email receipt to a consumer, or cause a hardcopy receipt to be delivered to a consumer by mail upon request. In addition, consumers can rent and/or purchase DVDs remote from the dispensing machines through use of the system website, already described.

Figure 24:
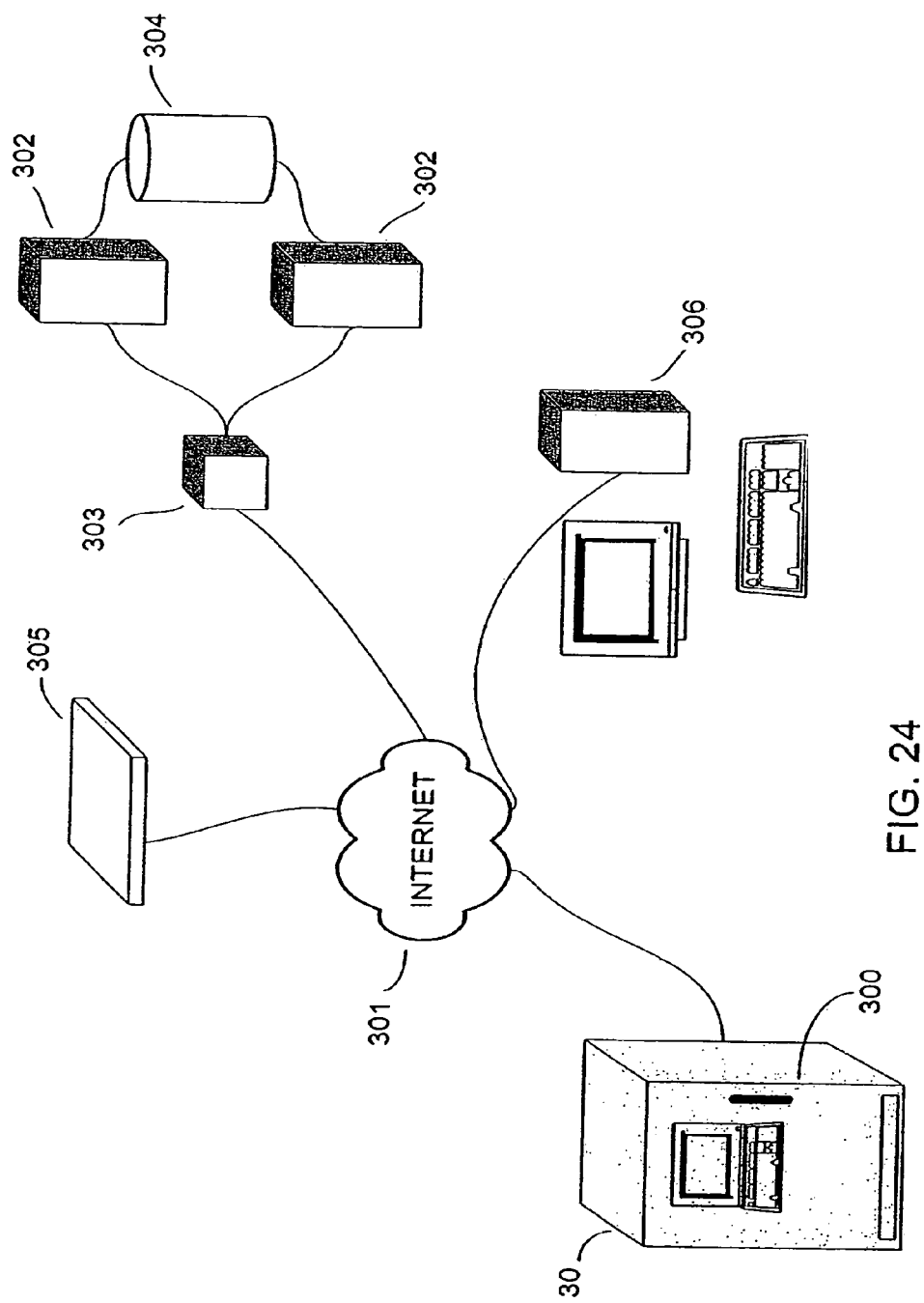
FIG. 24 is an illustration of a system for communicating and processing information in a network of article dispensing machines and vending apparatus and a remote control center.

Referring now to FIG. 24, a system is provided for communication between the article dispensing machine 30 and a central controller 302, preferably located remotely from the article dispensing machine 30. It will be understood that as used herein, the terms "central controller" and "central server" are synonymous, and refer to a microprocessor operating computer software that is configured to perform the software tasks described herein. Article dispensing machine 30, as described previously herein, is electronically controlled, and is equipped for that purpose with electronic circuitry including a vending controller 300. The vending controller 300 is responsible for generating the user interface, processing commands received from the user interface, displaying information to the user and communicating with the vending network.

Generally, in terms of hardware architecture the server 302 includes a processor and/or controller, memory, and one or more input and/or output (I/O) devices (or peripherals) that are communicatively coupled via a local interface. The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

Processor/controller is a hardware device for executing software, particularly software stored in memory. Processor can be any custom made or commercially available processor, a central processing unit (CPU), an auxiliary processor among several processors associated with the server 302, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., or a 68xxx series microprocessor from Motorola Corporation. Processor may also represent a distributed processing architecture such as, but not limited to, SQL, Smalltalk, APL, KLisp, Snobol, Developer 200, MUMPS/Magic.

Memory can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett- Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). Operating system essentially controls the execution of other computer programs and provides scheduling, input-output control, file and data management, memory management, and communication control and related services.

Steps and/or elements, and/or portions thereof of the present invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, the software embodying the present invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

The I/O devices may include input devices, for example but not limited to, input modules for PLCs, a keyboard, mouse, scanner, microphone, touch screens, interfaces for various medical devices, bar code readers, stylus, laser readers, radio-frequency device readers, etc. Furthermore, the I/O devices may also include output devices, for example but not limited to, output modules for PLCs, a printer, bar code printers, displays, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, and a router.

If the server 302 is a PC, workstation, PDA, or the like, the software in the memory may further include a basic input output system (BIOS). The BIOS is a set of essential software routines that initialize and test hardware at startup, start the O/S, and support the transfer of data among the hardware devices. The BIOS is stored in ROM so that the BIOS can be executed when server 302 is activated.

When server 302 is in operation, processor is configured to execute software stored within memory, to communicate data to and from memory, and to generally control operations of server 302 pursuant to the software. The present invention and the O/S, in whole or in part, but typically the latter, are read by processor, perhaps buffered within the processor, and then executed.

When the present invention is implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For that purpose, article dispensing machine 30 is equipped with network communication equipment and circuitry. In a preferred embodiment, the network communication equipment includes a network card such as an Ethernet card. In a preferred network environment, each of the plurality of article dispensing machines 30 on the network is configured to use the TCP/IP protocol to communicate via the network 301. It will be understood, however, that a variety of network protocols could also be employed, such as IPX/SPX, Netware, PPP and others. It will also be understood that while a preferred embodiment of the present invention is for article dispensing machine 30 to have a "broadband" connection to the network 301, the principles of the present invention are also practicable with a dialup connection using a standard modem. Wireless network connections are also contemplated, such as wireless Ethernet, satellite, infrared and radio frequency networks.

Vending controller 300 is configured to transmit information to, and receive information from, the network 301. While the Internet is the preferred network method for interconnecting the network 301 of the plurality of article dispensing machines 30, it will also be understood that a private or closed network is also practicable herewith. The network 301 is preferably the Internet, but may be any network for placing the plurality of article dispensing machines 30 in communication with the central controller 302. The network 301 serves to communicate information regarding vending transactions, and is also therefore referred to herein as a "transaction network," though as used herein, the terms "network" and "transaction network" are synonymous.

The central controller 302 is responsible for communicating with the vending controller 300 via the network 301. The central controller 302 is preferably located at a central station that is remote from the plurality of article dispensing machines 30. The central controller 302 operates as the server for communicating over the network 301 between the plurality of article dispensing machines 30. The central controller 302 receives communication from the article dispensing machines 30, and also transmits information to the machines 30. For example, when a DVD rental transaction is performed at the article dispensing machine 30, transaction data such as the rented DVD title is then transmitted from the machine 30 to the central controller 302 via the network 301. It will be understood that servers in general, such as the central controller 302, are often distributed.

As shown in FIG. 24, there are preferably a plurality of central controllers 302. Thus, the controllers 302 are arranged in a "load balanced" architecture to improve the speed and efficiency of the network. To accomplish the implementation of multiple controllers 302, the controllers 302 are in communication with a router/distributor 303. The router 303 receives communication from the network 301, and distributes the communication to one of the plurality of controllers 302. Likewise, when one of the controllers 302 transmits information, that information is received by the router 303 and then transmitted to the network 301.

The central controller 302 is in communication with a central database 304. The database 304 stores information regarding the transaction network. For example, the database 304 stores data regarding the vending inventory at each of the plurality of article dispensing machines 30. The database 304 also stores sales information regarding the sales quantities of the vending merchandise stored in the machines 30. For example, the database 304 stores information regarding the sales totals for each DVD title and for each machine 30 vending location. Database 304 also stores user information and rental transaction information, such as user IDs, PINs, the date on which DVDs are due to be returned and the date on which DVDs were rented from the machines 30.

Database 304 is preferably a relational database, although other types of database architectures may be used without departing from the principles of the present invention. For example, database 304 may be a SQL database, an Access database or an Oracle database, and in any such embodiment have the functionality stored herein. Database 304 is also preferably capable of being shared, as illustrated, between a plurality of central controllers 302 and its information is also preferably capable of being transmitted via network 301. It will be understood that a variety of methods exist for serving the information stored in database 304, such as ODBC, MySQL and CFML.

The central controller 302 and database 304 are also preferably accessible by a personal computer 306. The personal computer 306 will be understood as comprising hardware and software consistent with marketable personal computers, such as a display monitor, a keyboard and mouse and a microprocessor. The personal computer also comprises Internet browser software such as Mozilla or Internet Explorer. Using the browser software, a user at the personal computer 306 can access a web interface through the central controller 302. To that end, central controller 302 preferably comprises web server software such as IIS or Apache. It will be understood that a variety of web server software and web browser software exists to implement the principles of the present invention without departing therefrom. Through the web browser software, the personal computer 306 communicates with the central controller 302 and allows the user to login to a central command functionality of the central controller 302 and to view and modify data stored in the database 304. The browser interface also allows the user to perform certain system functions, which will affect the inventory and behavior of the article dispensing machines 30.

In a preferred embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 24, the financial server 305 is illustrated as a single server, although the financial server 305 may comprise an entire sub-network of financial servers 305 responsible for processing financial information.

When a user interfaces with the article dispensing machine 30 and provides financial information such as a credit card number, that information is transmitted from the machine 30 via the network 301. In one embodiment, the financial information is transmitted directly from the machine 30 to the financial server 305. In another embodiment, the information is transmitted to the central controller 302 first, and is then transmitted to the financial server 305. In either of those embodiments, financial server 305 is responsible for processing the financial information received from the user at the article dispensing machine 30. In another embodiment, financial server 305 software is comprised in the central controller 302, and financial transactions are performed by the central controller 302 without a separate financial server 305.

Figure 25:
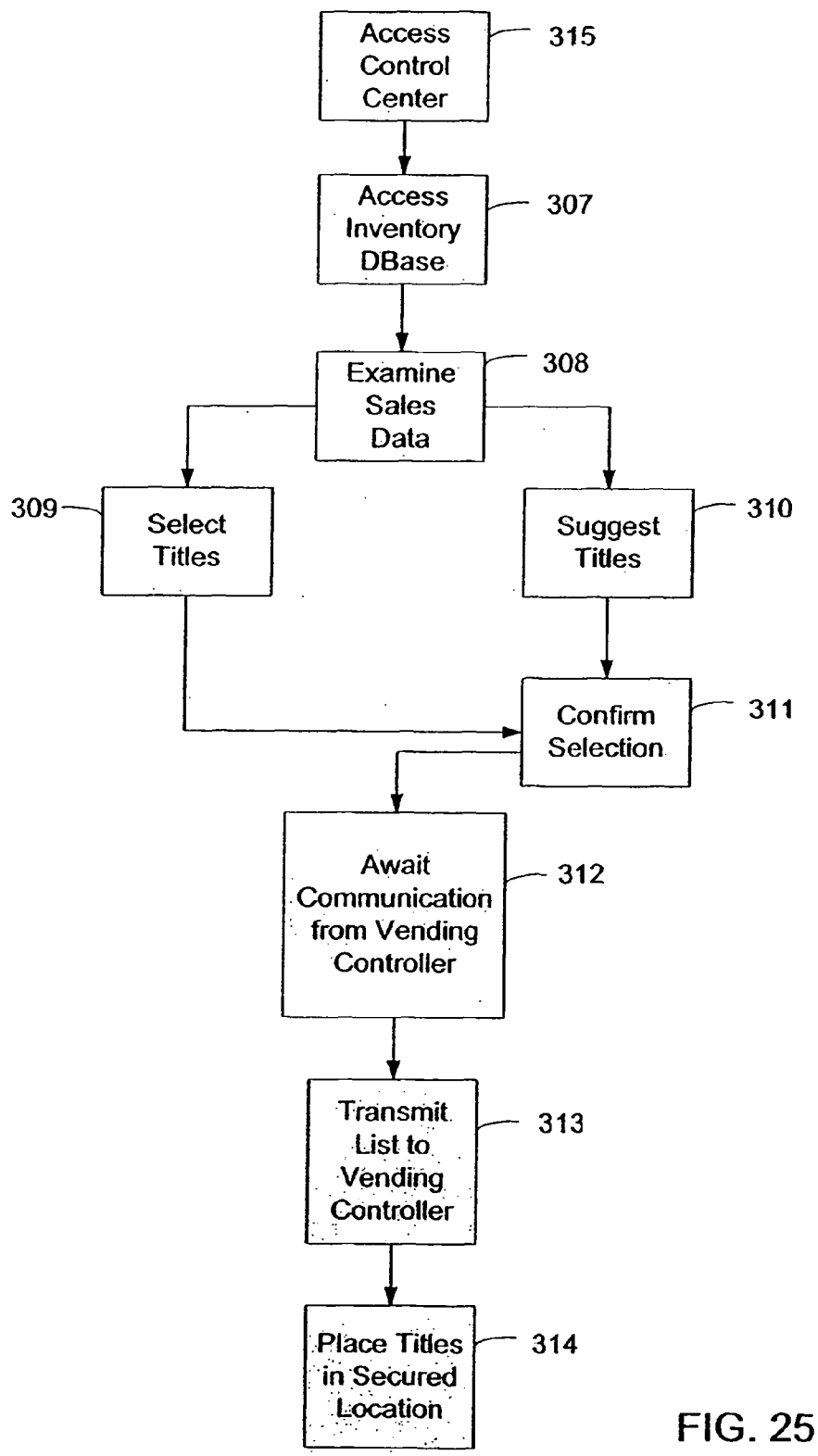
FIG. 25 is a flowchart illustrating the order of operations performed by a vending apparatus and remote control center in a system and method for regulating vending merchandise.

Referring now to FIG. 25, a system and method is illustrated for regulating vendible media products. A plurality of vendible media products are provided in a first vending apparatus 30 (also referred to herein as article dispensing machine 30), located at a first vending location. A list of vendible media products is received from a remote control location from the vending location, wherein the list identifies a subset of the vendible media products at the vending location. A signal is then generated to place the subset of vendible media products at the vending location in a predetermined area within the vending apparatus 30 for removal from the vending apparatus 30 at the vending location. The system and method allows for the user, or the system itself, to remotely determine a set of DVD titles that will be removed from the vending inventory of the article dispensing machine 30.

First, as shown in step 315, the central controller 302 is accessed. Step 315 can be performed remotely, by a user at a personal computer 306 (through the web browser interface described previously), or can be performed by a user at the remote control location. Alternatively, step 315 can be performed automatically by a microprocessor executing software embodying the method for regulating vendible media products. In other words, the method for regulating vending merchandise can be performed manually by a user, or can be performed automatically by a processor configured to perform the steps of the method described herein. The inventory database 304 is queried next, as shown in step 307. The query of the database comprises first a determination of the inventory stored in the vending apparatus 30. In effect, a query is run to determine which DVDs are in the machine inventory.

Next, in step 308, sales data stored in the database 304 is queried. In one embodiment, the analysis of the sales data in step 308 is to determine how long the vendible media products have been stored in the vending inventory. For example, it is desirable to have a large quantity of new releases in the vending inventory, because new releases are frequently the most popular titles for rental and/or purchase. To store the new releases, older titles must first be removed. Thus, the querying of the sales data in step 308 allows for the selection of DVD titles that have been stored in the vending inventory for longer than a predetermined period of time.

In another embodiment, the querying and analysis performed in step 308 comprises a profitability analysis to determine which vendible media products (such as DVD titles) are selling well and which are not. For example, a vending inventory may comprise ten copies of DVD Title A and ten copies of DVD Title B. It can be determined in step 308 which title is selling better. For example, all ten copies of DVD Title A may be vended from the inventory, while only one copy of DVD Title B may be vended. In that event, the sales data analysis performed in 308 can determine that it is advantageous to reduce the supply of DVD Title B in the vending inventory and increase the supply of DVD Title A. The analysis in step 308 therefore allows the system or user to determine which vendible media products should be removed from the vending inventory and which vendible media products should be added to the vending inventory.

In step 309, a manual user selection of vendible media products is made based on the analysis performed in step 308. In one embodiment, the querying in step 308 is performed manually by a user who personally analyzes the sales data stored in the database 304. In that embodiment, the user then selects the vendible media products, in step 309, that are to be removed from the vending inventory at the vending apparatus 30. In another embodiment, a microprocessor executing computer software is used to generate, in step 310, a set of vendible media products. The computer software embodies the analysis performed in step 308. For example, the software can be configured to automatically suggest the removal of vendible media products that have been in the vending inventory for longer than a predetermined period of time, such as two months. As another example, the software can be configured to automatically suggest the removal of vendible products that are renting or selling below a predetermined threshold, such as 20%. As another example, the software can embody an algorithm to suggest an adjustment of the vending inventory to meet demand. (E.g., if the vending inventory contains ten copies of Title A, but only two copies are vended at any point in time, the software can be configured to suggest the removal of eight of the copies of Title A.) The manual vendible media selection in step 309 and the automatic selection in step 310 have the same result, and both are based on the querying and analysis performed in step 308. The difference is that step 309 is performed manually by a user, while step 309 is performed automatically by a microprocessor executing computer software. In addition, the two steps 309, 310 can be performed jointly, such as where the software suggests a set of vendible media products and the user adjusts the suggested set or adds to the selected set. Either embodiment is practicable in accordance with the principles of the present invention, and both embodiments are jointly practicable as well.

The next step in the method, illustrated as step 311, is to confirm the selection made in either or both of step 309 and 310. Step 311 is optional, yet particularly helpful if the vendible media product selection was made automatically, as shown in step 310, without user input. In that embodiment, the confirmation of the selection performed in step 311 assures user oversight of the method. Upon completion of steps 310 and 311, a list of vendible media products to be removed from the venting inventory is ready for transmission to the vending controller 300.

In one embodiment, illustrated in step 312, the central controller 302 at the central location then awaits for communication from the vending controller 300. Communication between the central server 302 and the vending controller 300 is bi-directional, such that both controllers 300, 302 can transmit data to and receive data from the other controller 300, 302. However, it is advantageous for the central server 302 to only transmit data in response to communication from the vending controller 300. It will be understood that in certain types of computer networks, the network address (e.g., IP address) of a network terminal will be static, and in other types of computer networks the network address will change. In TCP/IP networks, for example, network addresses are frequently static. But in PPP networks, network addresses are frequently changing. For that reason, it is advantageous in the present system for data transmissions from the central server 302 to the vending controller 300 to be made in response to communication from the vending controller 300. That relieves the central server 302 of the burden of determining the network address for each of the vending controllers 300. By comparison, the network address of the central server 302 in that embodiment is preferably made static.

Thus, in step 312, the central server 302 awaits a communication from the vending controller 300. Such a communication is made, for example, when a rental transaction has occurred at the vending apparatus 30. In that embodiment, the central server 302, in response to the communication from the vending controller 300, transmits the list of vendible media products to be removed from vending inventory to the vending controller 300. That step is illustrated as step 313. In another embodiment, the system proceeds to step 313 without awaiting communication from the vending controller 300.

The vending controller 300 receives the list of vending inventory from the central server 302, and in response thereto, generates in step 314 a signal to place the identified set of vendible media products in a predetermined location for removal from the vending location. As described previously, that step is physically accomplished by instructing the robotic arm 46, 256 to remove the vendible media products (e.g., DVDs) from the vending inventory and place them in the portable vending management module (also referred to herein as an article transport unit) 38. Thus, when service personnel arrive to add inventory to the vending apparatus 30, the service personnel need simply remove the vending management module 38, as described previously. That saves the need for the service personnel to manually instruct the machine to place the vendible media products in the predetermined location, because the vending controller 300 has already instructed the robotic arm 46, 256 to perform that step. In another embodiment, the predetermined location for removal can be the article transfer opening 44, 144, 244. In that embodiment, the service personnel identifies herself, and in response, the vending controller 300 automatically delivers the inventory identified in steps 310 and 311 through the article transfer opening 44, 144, 244.

Figure 26:
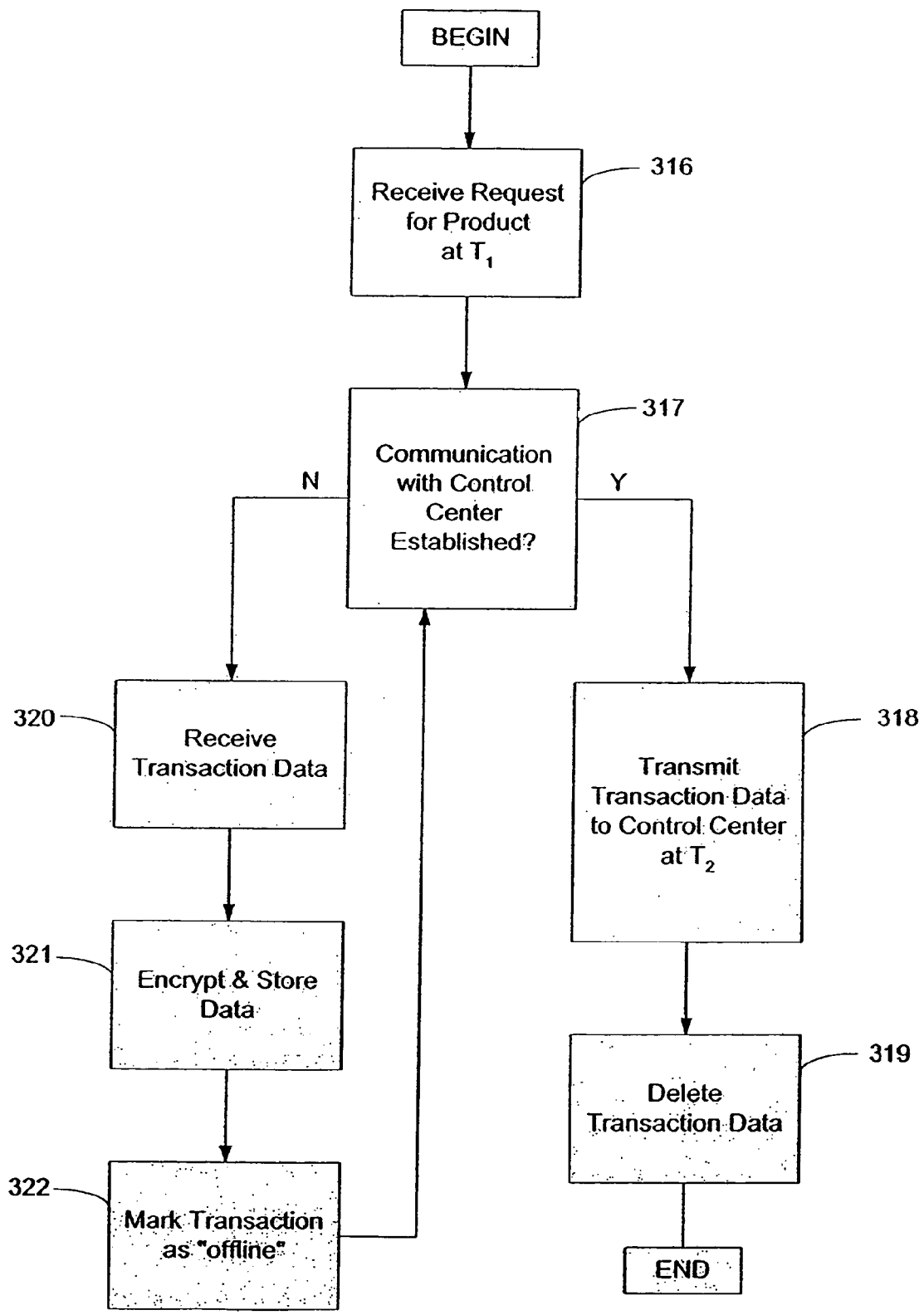
FIG. 26 is a flowchart illustrating the order of operations performed by a vending apparatus and remote control center in a system and method for offline vending of a media product.

Referring now to FIG. 26, there is illustrated a system and method for the offline vending of a vendible media product. The present invention provides for vendible media products to be distributed and the transaction recorded, without requiring network connectivity between the vending controller 300 and the network 301. Beginning with step 316, the vending controller 300 receives a request from a user for a vendible media product. For example, the user may request to rent a DVD from the vending apparatus 30. The vending controller 300 then determines, in step 317, whether communication with the central server 302 is capable of being established. It will be understood that there are a variety of ways to perform that function, including a "ping check" to determine whether the vending controller 300 is in communication with the network 301. Such a check also enables a determination of whether the central server 302 is in communication with the network. If the ping is successful, communication is capable of being established between the controllers 300, 302. If the ping is unsuccessful, communication is temporarily not capable of being established.

In the event that communication is capable of being established, the system then proceeds along an "online" mode of operation. In the "online" mode of operation, the transaction data (e.g., DVD title rented, user identification information, user financial information, rental term, etc.) is transmitted to the central server 302 in step 318. Then, in step 319, the transaction data is deleted from the memory of the vending apparatus 30. The "online" mode of operation is thus to receive transaction data and vend a selected vendible media product from the vending inventory, without storing the transaction data at the vending location.

However, in the event that the vending controller 300 determines, in step 317, that communication is not capable of being established, the system then proceeds in an "offline" mode of operation. In the "offline" mode, the system is still capable of vending and receiving media products, and therefore a loss of connectivity does not harm the operation of the system. In one embodiment, the vending controller 300 and/or central controller 302 checks the inventory database 304 to determine whether user has exceeded a predetermined number of rentals. If the user has exceeded the predetermined number of rentals, then the transaction is not performed.

In a preferred embodiment, the system restricts the number of rentals that can be made from a vending apparatus 30 while the vending apparatus is unable to establish a connection to the transaction network 301. In another embodiment, the system restricts the amount of time during which a vending apparatus 30 will be operational while the vending apparatus 30 is unable to establish a connection to the transaction network 301. In another embodiment, the system restricts the number of rentals that can be made by any one specific user while the vending apparatus 30 is unable to establish a connection to the transaction network 301. It will be understood that such restrictions are embedded in the computer software and/or operating system of the vending controller 300.

In the offline mode, the system receives transaction data in step 320. Next, in step 321, the vending controller 300 stores the transaction data in a vending memory located at the vending location and in communication with the vending controller 300. Preferably, the transaction data stored in the memory is also encrypted. A variety of methodologies are known for encrypting stored data. In a preferred embodiment, the transaction data is asymmetrically encrypted using a public/private key encryption algorithm, wherein the public key is published by the central server 302. In a preferred embodiment, the transaction data is timestamped as having occurred at the time of the transaction. Thus, when the transaction data is ultimately uploaded to the central server 302, the data will accurately reflect the time of the transaction, not the time of the upload.

In a preferred embodiment, the vending controller 300 then marks the transaction data as having occurred while the vending apparatus 30 was in an "offline" state, as illustrated in step 322. Identifying the transaction data as having occurred "offline" assists in generating statistical reports regarding the number of transactions that occur "online" versus "offline", and also assists in identifying network connectivity problems at the plurality of vending locations.

As illustrated in step 317, the system then returns to a status of determining whether communication with the central server 302 is capable of being established. If communication is capable of being established, the stored transaction data is uploaded to the central server 302, illustrated in step 318, and the transaction data is then deleted from the memory, illustrated in step 319.

It will be understood that the transaction data can comprise not only vending information such as DVD rental information, but can also comprise vending purchases, such as the purchase of a DVD from the vending inventory. Furthermore, the transaction data can also comprise return information, such as the return of a rented DVD to the vending inventory.

Figure 27:
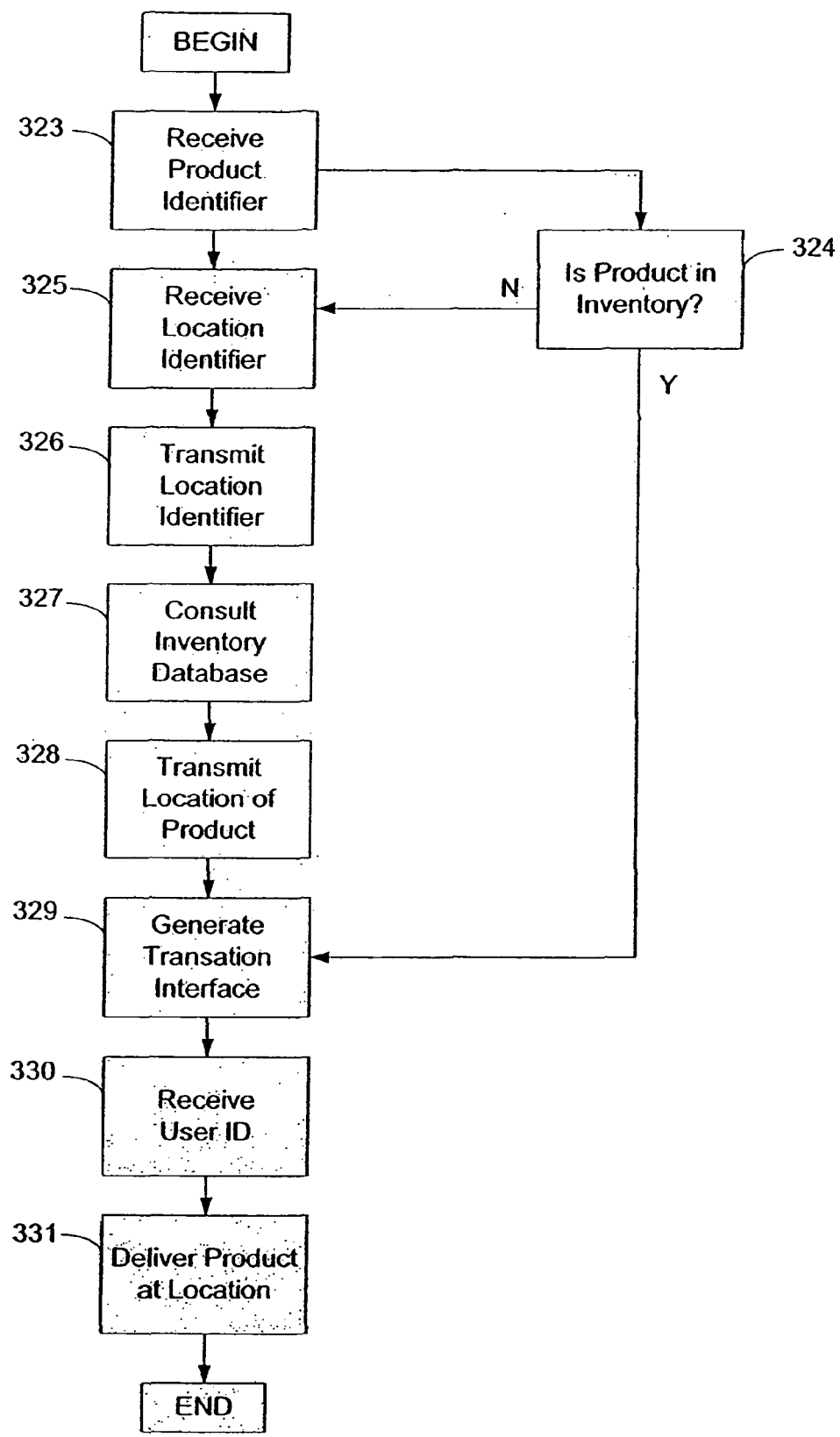
FIG. 27 is a flowchart illustrating the order of operations performed by a vending apparatus and remote control center in a system and method for communicating vending information for a vendible media product.

Referring now to FIG. 27, there is illustrated a system and method for communicating vending information for a vendible media product. A vending request is received for the vendible media product at a first location. Then, it is determined whether the vendible media product is in a first vending inventory within a first vending apparatus at the first location. Next, it is determined whether the vendible media product is in a second vending inventory within a second vending apparatus at a second location, wherein that determination is performed if it is determined that the vendible media product is not at the first location. Then, inventory data is transmitted, wherein the data indicates whether the vendible media product is in the second vending inventory apparatus at the second location. The system and method for communicating vending information allows for a user at a first location to receive information indicating a second location at which a vendible media product is located and can be rented or purchased. In one embodiment, the first location is a vending apparatus 30. In another embodiment, the first location is a personal computer 306.

The method for communicating vending information begins as illustrated at step 323, where the system receives a vendible media product identifier from a user. The product identifier simply identifies the vendible media product for which the user is searching. For example, if the user wishes to rent a DVD Title A, the product identifier received in step 323 will identify the requested vendible media product as DVD Title A. Next, in step 324, the system determines whether the requested vendible media product is in inventory. In one embodiment, that determination is performed by vending controller 300, by checking the vending inventory at the vending location, and the result of the determination is displayed to the user via the display monitor 143. In another embodiment, that determination is performed by the central controller 302, by consulting or querying the inventory database 304, and is then communicated to the user via the Internet 301 and the web browser software on the personal computer 306.

If the requested vendible media product is in the vending inventory at the vending apparatus 30, a transaction interface is generated in step 329, as in the "normal" mode of operation described herein. If, however, it is determined in step 324 that the requested vendible media product is not in the vending inventory, the system proceeds to step 325, wherein the system receives a location identifier. The location identifier identifies the location of the user.

The location identifier can be received from several sources. First, the location identifier can be received manually from a user at the vending location. In that embodiment, the user interface 234, 42, 143 at the vending apparatus 30 requests that the user provide the location identifier. The user then supplies the location identifier using the keypad or touch screen 234, 42. In that embodiment, the location identifier can be data that is easy to recall for the user, such as a zip code. In another embodiment, the location identifier is received automatically, from the vending controller 300. The vending controller in that embodiment is provided with data identifying its own location, such as an address, an intersection, a global positioning identifier or other coordinate data identifying its physical location.

Next, in step 326, the location identifier is transmitted from the vending controller 300 to the central server 302. In essence, the vending controller 300 requests of the central server 302 the location of the requested vendible media product. In step 327, the central server 302 queries the database 304 to determine the location of the vendible media product. A query is performed on the database 304 to determine a vending apparatus 30 inventory having the requested vendible media product. The results of the query are then sorted according to their location, and are ranked according to the locations that are closest to the location identifier. For example, the first result will be the location of a vending apparatus 30 that is one block away, the second result will be the location of a vending apparatus 30 that is 1 mile away, and so on. Further, the system may be optionally configured to transmit any predetermined number of locations. For example, the system may transmit to the user only one recommended location having the requested vendible media product, or the system may suggest any number of locations having the product, wherein the suggestions are ranked in order of proximity to the location identifier.

In step 328, the location of a vending apparatus 30 having the requested vendible media product in its vending inventory is transmitted to the user. The location can be displayed on the touch sensitive display 234 at the vending apparatus 30. Then, in step 329, the system generates a transaction interface, wherein the user can rent or purchase the requested vendible media product, located at the second location, from the interface at the first location. Thus, the user interface at the first vending apparatus 30 allows the user to rent or purchase a vendible media product from the inventory at a second, remotely located vending apparatus 30. The user rents or purchases the vendible media product via the user interface at the first vending location, and the transaction data is transmitted to the central server 302, and then to a vending controller 300 at the second vending location. Then, at the second vending location, the vending controller 300 receives user identification, such as a credit card or identification card passed through the card reader 40, 142, 235 or a PIN provided by the user using the keypad 42. When the vending controller 300 at the second vending location has confirmed the identity of the user, the vending controller 300 generates a signal in step 331 to deliver the vendible media product to the user at the second vending location.

In another embodiment, a system for communicating vending information is provided to communicate the location of a requested vendible media product to a user using a personal computer 306. In that embodiment, the system for communicating vending information is embodied in an interactive website in communication with the central server 302. A user uses browser software at the personal computer 306 to visit the website, and provides first, in step 323, a requested vendible media product. For example, the user selects a DVD title from a list of titles displayed on the website. Then, in step 325, the user provides a location identifier such as a zip code. In step 326, the location identifier is transmitted from the user's personal computer 306 to the central server 302. The central server in step 327 consults with or queries the database 304 to determine the location of a vending apparatus 30 that both has the requested vendible media product in its vending inventory and is located within a proximity to the location identifier. In step 328, the central server transmits the location of that vending apparatus 30 to the user, thereby notifying the user of the location of the vending apparatus 30 that has the requested vendible media product.

In a preferred embodiment illustrated in step 329, the website then provides a transaction interface, whereby the user can purchase or rent the requested vendible media product using the personal computer 306 and the website. The user may then travel to the location of the vending apparatus 30 to receive the vendible media product that she rented or purchased through the website. In a preferred embodiment illustrated in step 330, the vending apparatus 30 receives a user identification from the user, such as a credit card, user identification card, username/password or PIN, and then in step 331 the vendible media product is delivered to the user, preferably through article transfer opening 44. In another embodiment, if the requested vendible media product is not located at the vending apparatus 30, the user may provide an electronic mail address; when the requested vendible media product is in the vending inventory at that vending apparatus 30, the user will be transmitted an electronic mail message indicating that the requested vendible media product is at that point in the inventory. Preferably, the electronic message further comprises a uniform resource locator, whereby the user can reserve the vendible media product via the Internet.

Figure 28:
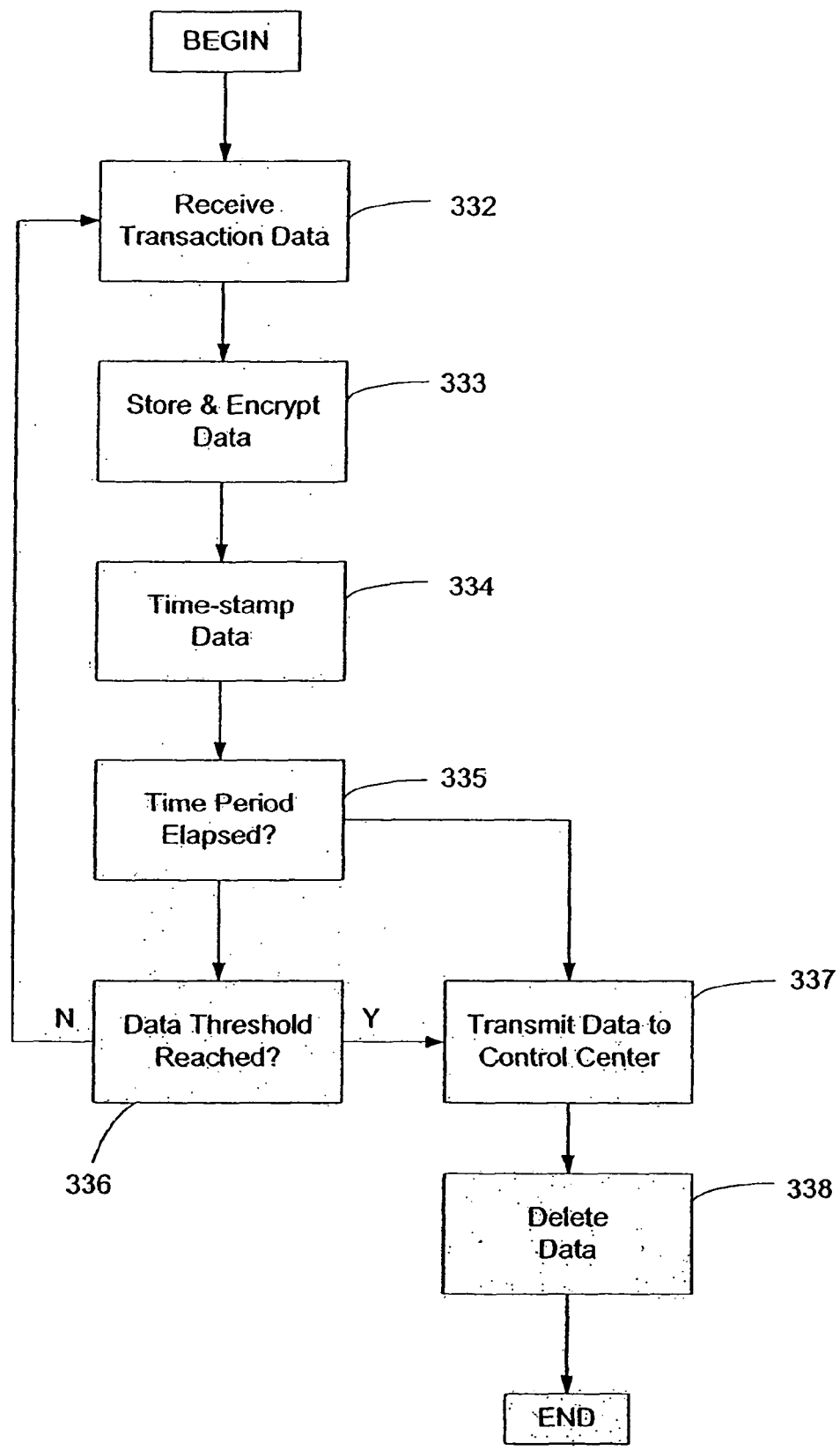
FIG. 28 is a flowchart illustrating the order of operations performed by a vending apparatus and remote control center in another system and method for communicating vending information for a vendible media product.

Referring now to FIG. 28, there is provided a system and method for communicating vending information. A vending controller 300 receives a plurality of transaction data from a plurality of users regarding a plurality of transactions, and stores each of the plurality of transaction data in a memory located within the vending apparatus 30. The vending controller 300 then receives a request for communication from the central server 302 and in response thereto, transmits the plurality of transaction data to the central server 302.

Initially, as illustrated in step 332, the vending controller receives transaction data from the user. The transaction data comprises information concerning the transaction performed by the vending apparatus 30. For example, the transaction data can comprise a user identification, a vendible media product identification (e.g., a serial number of a rented DVD) and financial information such as the user's credit or debit card number. The vending controller then stores the transaction data in a memory, illustrated in step 333, and preferably encrypts the data. As discussed herein, a variety of encryption schemes are practicable with the present invention. A preferred encryption scheme is an asymmetric public/private key encryption scheme, wherein the public key is published by the central server 302. In a preferred embodiment illustration in step 334, the transaction data is also timestamped, so that the transaction data when uploaded to the central server 302 will reflect the actual time of the transaction as opposed to the time of the upload.

In step 335, the vending controller 300 checks to determine whether a predetermined period of time has elapsed since the transmission of transaction data to the central server 302. The predetermined period of time is configurable by vending personnel at either the vending controller 300 or the central server 302. The predetermined period of time determines the frequency with which the vending controller 300 uploads transaction data to the central server 302. For example, if the predetermined period of time is two minutes, the vending controller 300 will transmit any stored transaction data to the central server 302 every two minutes.

In step 336, the vending controller 300 checks to determine if the stored transaction data has exceeded a predetermined storage threshold. The storage threshold is configurable by vending personnel at either vending controller 300 or the central server 302. The storage threshold determines a memory storage limit. If the limit is exceeded, the vending controller 300 uploads transaction data to the central server 302. For example, if the predetermined storage threshold is 1 megabyte, the vending controller 300 will transmit any stored transaction data to the central server 302 upon a determination that the stored transaction data exceeds 1 megabyte in memory storage.

The vending controller 300 and its attendant computer software can be figured to upload transaction data upon either or both of the expiration of the predetermined time interval and the reaching of the predetermined storage threshold. In other words, either or both of those events can trigger the uploading of the transaction data. The option of which event to use, or to use both, is configurable by vending personnel at either the vending controller 300 or the central server 302.

As illustrated in step 337, upon the triggering of one or both of the aforementioned events, the transaction data is uploaded to the central server 302, similarly to the "normal" mode of operation. In step 338, the transaction data is then deleted from the memory at the vending apparatus 30.

The present invention further provides a system for communicating vending information via a transaction network, as illustrated in FIG. 24. The system further comprises a remote control center, which is a physical location housing the central server 302. The central server (and thereby, the remote control center) is in communication with the vending controller 300. The central server 302 receives a communication from the vending controller 300 at a predetermined time interval, as discussed herein. The central server 302 also receives a plurality of transaction data from the vending controller 300, wherein each of the plurality of transaction data corresponds to a rental transaction from the vending apparatus 30. In a preferred embodiment, each of the plurality of transaction data corresponds in particular to a rental transaction for a DVD.

The present invention further provides a system for communicating vending information comprising a transaction network as illustrated in FIG. 24 and a vending controller 300 in communication with the transaction network. The vending controller 300 transmits, at a predetermined time interval, a communication to a central server 302 located at a remote control center. The vending controller 300 is also preferably configured to receive a request for information from the central server 302. The vending controller 300 transmits a plurality of transaction data to the central server 302, wherein each of the plurality of transaction data corresponds to a rental transaction.

Figure 29:
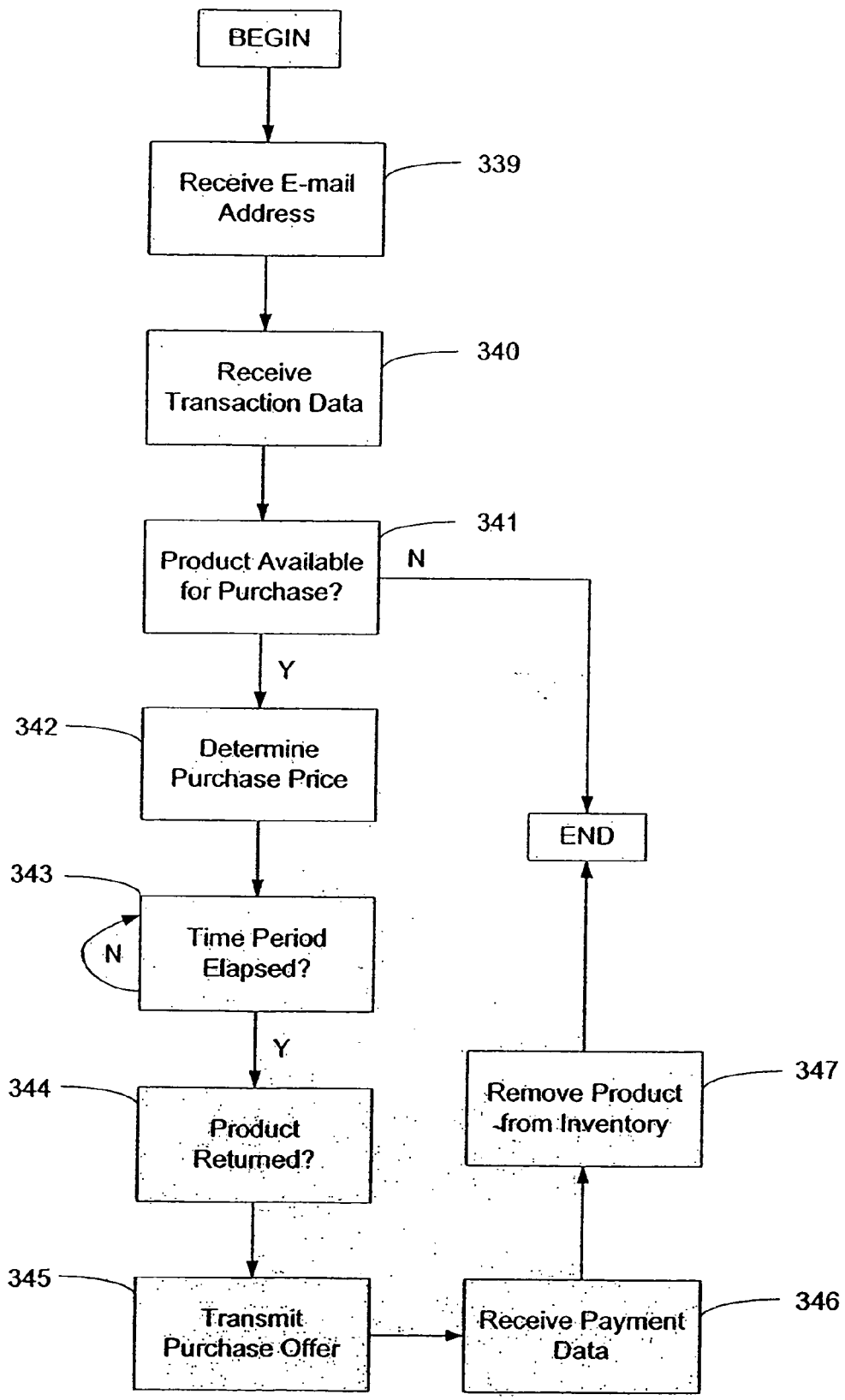
FIG. 29 a flowchart illustrating the order of operations performed by a vending apparatus and remote control center in a system and method for selling a rental media product.

Referring now to FIG. 29, there is illustrated a system and method for selling a rental media product, whereby a user who rents a vendible media product from a vending apparatus 30 may then have the option to purchase the vendible media product. Transaction data is received from a user interface, wherein the transaction data comprises an electronic mail address for a user. The rental product is then vended from the vending apparatus 30 to the user, and an electronic mail message is transmitted to the electronic mail address, wherein the electronic mail message comprises an invitation to purchase the rental media product.

The vending controller initially receives transaction data from a user, as illustrated in step 340. The transaction data comprises information related to the specific transaction performed at the vending apparatus 30, such as vending product information (e.g., the serial number of a rented DVD), user identification information and financial information such as the user's credit or debt card number. The vending controller 300 also receives an electronic mail address from the user. It will be understood, however, that an electronic mail address comprises not only traditional electronic mail such as POP and IMAP electronic mail systems, but also comprises instant messaging protocols and alphanumeric protocols as well. Thus, the electronic mail address received by the vending controller 302 is an address to which a message may be electronically transmitted, and is not limited to traditional electronic mail.

After the vending controller 300 receives the transaction data and electronic mail address from the user, the remainder of the method can then be performed immediately, while the transaction is still occurring at the article dispensing machine 30, or can occur later by electronic mail. In either embodiment, the steps of the method remain largely the same. First, a controller checks to determine whether the product is available for purchase. That check may be performed by either the vending controller 300 or the central server 302. In one embodiment, the vendible media rental product is offered for sale immediately, while the user is still physically present at the article dispensing machine 30. In that embodiment, the vending controller 300 checks a local database to determine whether the requested vendible media rental product has been flagged as a vending product that can be offered for sale. Optionally, the vending controller transmits information identifying the vending product to the central server 302 and receives from the central server 302 information that identifies the requested vendible media rental product as a vending product that can be offered for sale.

In another embodiment, the central server 302 performs the check to determine whether the vendible media rental product can be offered for sale. Typically, that step is performed by querying a database 304. A vendible media rental product may be flagged as a vending product that can be offered for sale either by vending personnel, manually, or by the system automatically. Computer software operated by a microprocessor at the central server 302 can be configured to determine whether a product should be offered for sale. For example, the software can be configured to determine the percentage of vendible media rental products of a certain type that are being rented. The software can then suggest that the percentage of the products not being rented be offered instead for sale. For instance, if only 20% of the inventory of DVD Title A is ever rented by a vending apparatus 30 at any time, the software can be configured to automatically suggest that the remaining 80% of the vending inventory of DVD Title A be offered for sale to users at the vending apparatus 30. That determination of whether a product should be offered for sale, and the quantity and price at which the product should be offered, may thus be made automatically by the system, or may be made manually by the user. In either event, the vending controller 300 and/or central server 302 determine in step 341 whether the requested vendible media rental product has been identified as a vending product that can be offered for sale.

If the controller 300, 302 determines that the vendible media rental product has not been identified as a product that can be offered for sale, the method for selling the product terminates. If, however, it is determined in step 341 that the product can be offered for sale, the controller 300, 302 then determines the sale price of the vending product. In one embodiment, the central server 302 consults or queries database 304 to determine a user-defined sale price. The user-defined sale price is a price established and recorded in the database 304 by vending personnel, who have manually determined the price at which the vendible media rental product should be sold. In another embodiment, the sale price is recorded in the database 304 automatically by computer software executed by the central server 302 or another controller located at the remote control center. The software is configured to determine the price at which the vending inventory should be offered for sale in order to both meet customer demand at the vending apparatus 30 and meet predetermined thresholds of profitability established by the vending personnel.

In another embodiment, the sale price of a vendible media rental product is determined by the vending controller 300 at the article dispensing machine 30. The sale price can be stored in an inventory database local to the machine 30, or can be identified on the vendible media rental product itself. The vending controller 300 can then generate a user interface comprising an offer to the user to purchase the vendible media rental product, so that the product is offered for sale immediately to the user upon vending.

In another embodiment, the vendible media rental product is offered for sale at a later time, after it has been vended to the user, such as in a vending rental transaction. A controller located at the remote control location, such as the central server 302, generates a purchase offer and transmits the purchase offer to the user-provided electronic mail address, as illustrated in step 345. In a preferred embodiment, the message transmitted to the user in step 345 includes a website address, which the user can then visit using personal computer 306 and thereby electronically purchase the rented product. Because the user has already provided financial transaction information to the vending apparatus 30 at the time of the rental of the vendible media rental product, the user need not provide financial information again. Rather, the user need only provide user identification information, such as the last four digits of the credit or debit card used during the rental transaction, or a zip code corresponding to the financial account used during the rental transaction. Alternatively, the message transmitted to the user-provided electronic mail address can comprise instructions, wherein the instructions instruct the user to physically visit a vending apparatus 30 to purchase the vendible media rental product. Alternatively, the purchase offer can be transmitted to the user upon returning the product to the vending apparatus 30.

In a preferred embodiment, a controller at the remote control center such as the central server 302 determines whether a predetermined period of time has elapsed, as illustrated in step 343. The predetermined period of time determines the time interval at which purchase offers for the vendible media rental product will be transmitted to the user. The predetermined time period is configurable by an administrative user, such as vending personnel at the remote control location or an administrative user accessing the control facility using a personal computer 306. For example, if the predetermined period of time is configured to be one day, then the system will transmit a purchase offer to the user once per day. If the controller determines that the predetermined period of time has not elapsed, the controller checks again in a "loop" fashion and does not proceed until the predetermined period of time has elapsed.

In a preferred embodiment, a controller at the remote control location such as the central server 302 determines whether the vendible media rental product has been returned by the user before transmitting a purchase offer to the user. If the product has been returned by the user to the vending apparatus 30, the purchase offer is not transmitted to the user-provided electronic mail address. If, however, the rental product has not been returned to the vending apparatus 30, then the purchase offer is transmitted to the user-provided electronic mail address.

In a preferred embodiment, the vendible media rental product is removed from the vending inventory after it has been purchased by the user, illustrated in step 347. That step may be accomplished by marking the vending product as "sold" in the inventory database 304, and may also be accomplished by deleting the vendible media rental product from the inventory database 304. It will be understood that the steps of transmitting the purchase offer to the user-provided email address, generating the transaction interface for the purchase of the vending product, and reflecting such purchase in the inventory database can be accomplished by either the central server 302, the vending controller 300 or another controller at a location remote from the vending apparatus 30. In a preferred embodiment, those steps are performed by a controller located at the remote control location.

The present invention provides a system for selling vendible media rental products, wherein a central server 302 at a central location receives transaction data from a vending controller 300 at a vending location. The transaction data comprises an identifier, which identifies a rental product, and further comprises an electronic mail address. The system further comprises an electronic mail application, preferably residing on a server 302 at the central location. The electronic mail application transmits an electronic mail message to the electronic mail address, wherein the message comprises an invitation to purchase the rental product. The system further comprises a purchase application, preferably residing on a server 302 at the central location. The purchase application receives a second transaction data from a user, wherein the second transaction data comprises a request to purchase the rental product.

Figure 30:
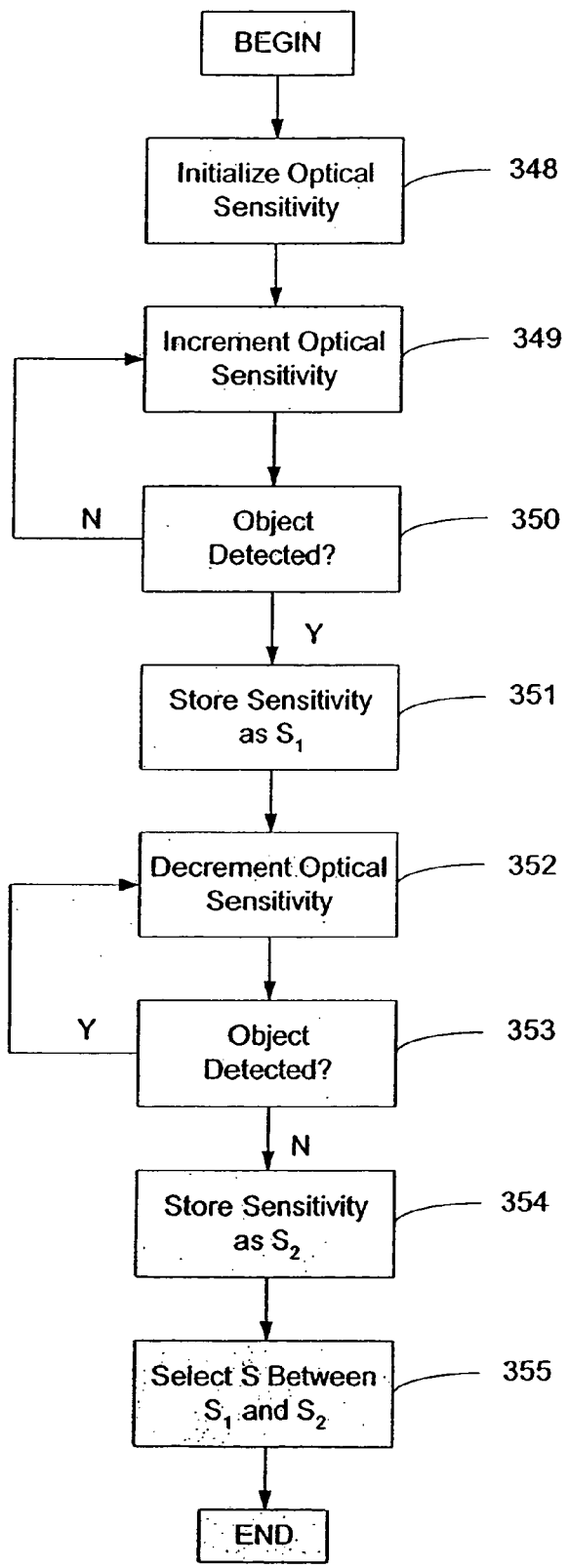
FIG. 30 is a flowchart illustrating the order of operations performed by a vending apparatus in a system and method for calibrating the vending apparatus for vending a media product.

Referring now to FIG. 30, there is illustrated a system and method for calibrating a vending apparatus 30. As used herein, the term "vending apparatus" refers to a vending-machine style device, such as article dispensing machine 30. The vending apparatus 30 is equipped with an optical sensor 370 for sensing objects stored in the inventory of the apparatus. A variety of forms of optical sensors are practicable with the present invention without departing from the principles thereof, including an optical laser scanner, a magnetic scanner, an optical bar code reader, an ultraviolet optical scanner and an infrared optical scanner. It will be understood that optical sensors such as optical sensor 370 have sensitivity settings that determine the amount of light that will be sensed by the optical sensor 370. It will be further understood that such optical sensors are operated by an optical sensitivity controller, which controls the optical sensitivity of the optical sensor and processes data received by the optical sensor.

Figure 32:
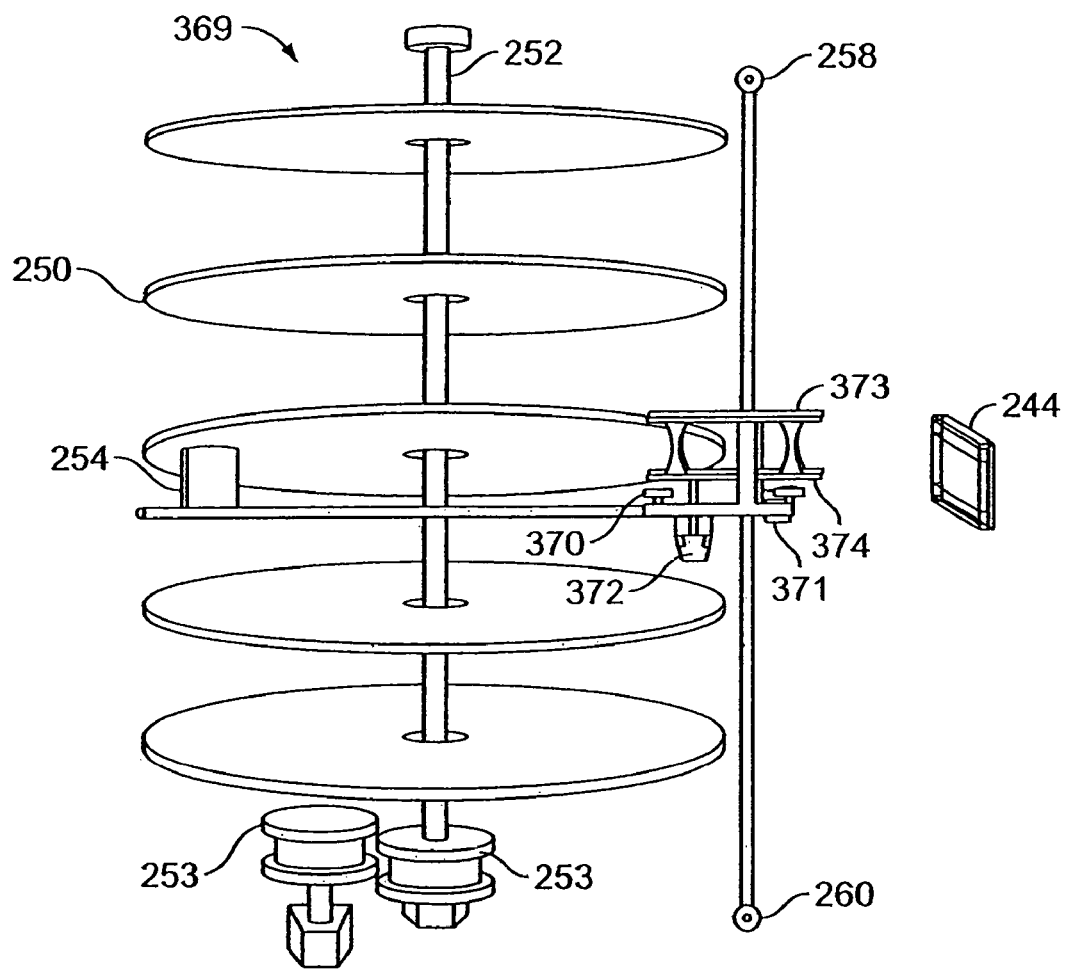
FIG. 32 is an illustration of the internal components of a vending apparatus for use in a system and method for calibrating the vending apparatus.

The optical sensor and its controller are preferably mounted on a selector arm 373, as illustrated in FIG. 32. As illustrated in step 348, one step of the method for calibrating the vending apparatus is to initialize the optical sensor 370 such that the optical sensor 370 has an initial optical sensitivity setting of zero.

As illustrated in step 349, the optical sensitivity setting of the optical sensor 370 is then incremented, such that the optical sensitivity setting of the optical sensor 370 is greater than zero. The optical sensor controller then checks, in step 350, to determine whether the optical sensor 370 has optically sensed one of the objects in the inventory of the vending apparatus. If the optical sensor 370 has not sensed one of the objects, then the optical sensor controller again increments the optical sensitivity setting of the optical sensor 370. As illustrated by steps 349 and 350, this "loop" is repeated until the optical sensor 370 optically senses one of the objects in the inventory of the vending apparatus 30.

Upon the optical sensing of one of the objects, the optical sensor controller stores the optical sensitivity setting of the optical sensor 370 as a first optical sensitivity setting, illustrated in step 351. It will be understood that the setting may also be stored by another controller within the vending apparatus, such as the vending controller 300. Then, as illustrated by step 352, the optical sensor controller decrements the optical sensitivity setting of the optical sensor 370, such that it is less than the first optical sensitivity setting at which the optical sensor 370 sensed the object. The controller 371 then determines, in step 353, whether the optical sensor 370 no longer detects the object. If the optical sensor 370 does continue to detect the object, the optical sensor controller 371 again decrements the optical sensitivity setting of the optical sensor 370, and performs the same check to determine whether the optical sensor 370 continues to sense the object. As illustrated by steps 352 and 353, this "loop" continues until the optical sensor 370 is no longer able to optically sense the object in the vending apparatus inventory.

Upon the inability of the optical sensor 370 to sense the vending inventory object, the optical sensor controller 371 stores the optical sensitivity setting of the optical sensor 370 as a second optical sensitivity setting, illustrated in step 354. It will be understood that the second setting may also be stored by another controller within the vending apparatus, such as the vending controller 300. The combination of the first and second optical sensitivity settings establishes an upper and lower bound of optical sensitivity, within which range the optical sensor 370 is capable of sensing an object in the vending apparatus inventory.

As illustrated in step 355, the optical sensor controller 371 selects a third optical sensitivity setting, wherein the third optical sensitivity setting is within the range defined by the first and second optical sensitivity settings. In one embodiment, the third optical sensitivity setting is the average of the first and second optical sensitivity settings. It will be understood that the selection of the third optical sensitivity setting can be performed by another controller within the vending apparatus 30, such as the vending controller 300. It will be understood that an optical sensor 370 is used to optically sense the object in the vending inventory. However, other types of sensors can be used without departing from the principles of the present invention, such as radio frequency sensors.

Figure 31:
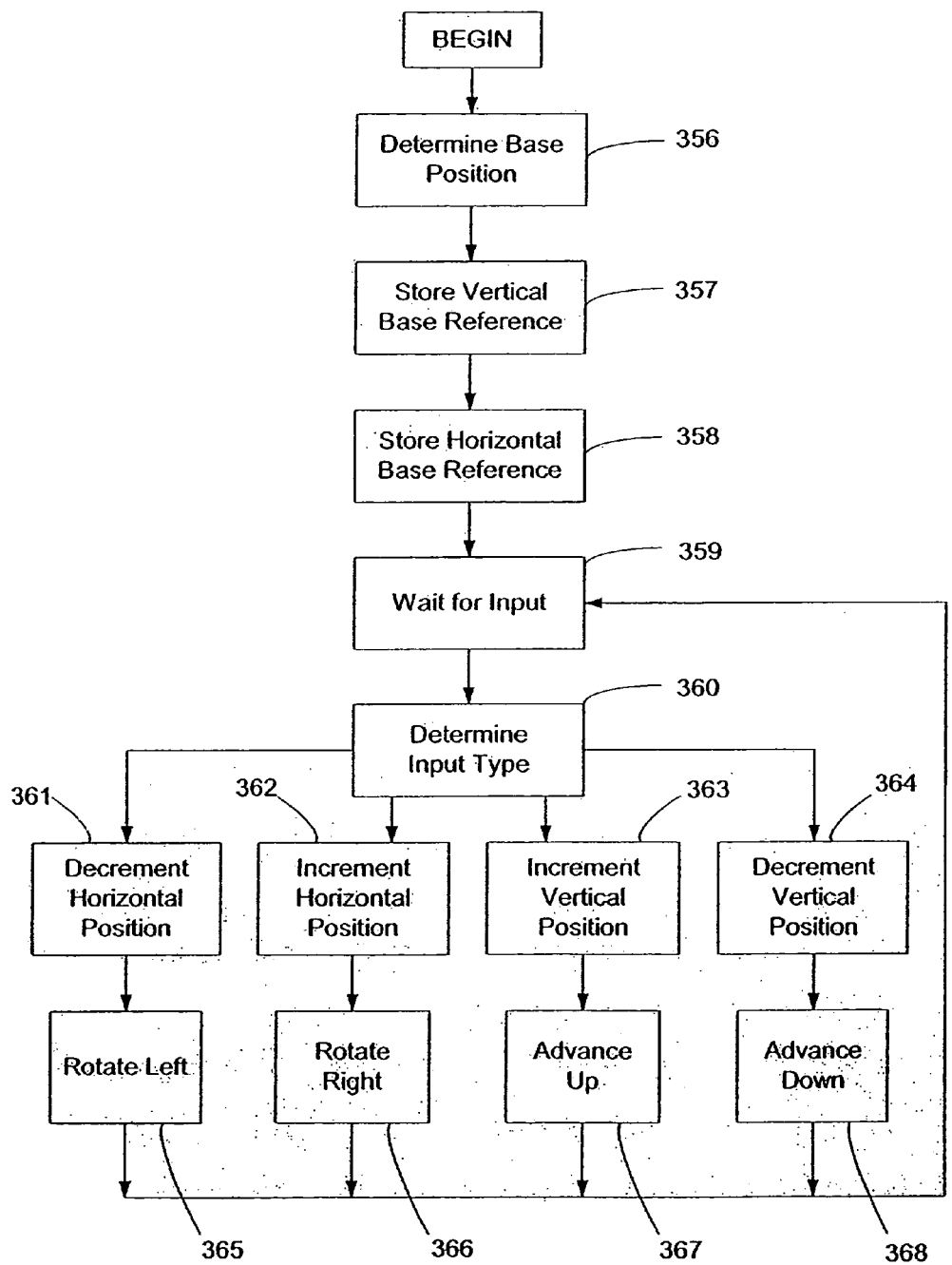
FIG. 31 is a flowchart illustrating additional elements in the order of operations performed by a vending apparatus in a system and method for calibrating the vending apparatus.

Referring now to FIG. 31, a system and method for calibrating a vending apparatus 30 is provided. Illustrated in step 356 an optical sensor 370 senses a first position on a compartmentalized storage device, such as the storage device 369 illustrated in FIG. 32. The optical sensor controller 371 records that position as a horizontal base reference position in step 357. The optical sensor 370 then senses a second position on the compartmentalized storage device 369, in step 358, and the optical sensor controller 371 records that position as a vertical base reference position in step 359. In a preferred embodiment, the vertical and horizontal base reference positions are the same position, forming a position denoted by a coordinate pair such as (0,0).

A selector arm 373 on which the optical sensor 370 is preferably located is then moved, as illustrated in step 360. While the selector arm is being moved, the optical sensor 370 tracks the motion of the selector arm 373. A variety of methodologies for tracking the movement of the selector arm 373 are practicable with the present invention. In one embodiment, the selector arm 373 is operated by a controller, which directs the movement of the selector arm 373 by a predetermined distance. The predetermined distance corresponds to a dimension (height, width or depth) of one of the objects stored in the inventory of the vending apparatus. For example, the selector arm controller can instruct the selector arm to move "up" a distance of seven inches, wherein the dimension of seven inches corresponds to a height of a DVD stored in the inventory of the vending apparatus. The sensor 370 then senses the new position of the selector arm 373 after the motion of the selector arm 373 has been completed. Alternatively, the sensor 370 can sense the motion of the selector arm 373 while the selector arm 373 is in motion.

In another embodiment, the selector arm controller instructs the selector arm 373 to move in a direction (up, down, left, right), and the sensor 370 optically scans the inventory of the vending apparatus until a new vending object is detected. Upon detection of the new vending object, the sensor 370 transmits a signal to the selector arm controller to stop the motion of the selector arm 373. In that embodiment, the selector arm 373 is in effect driven by input from the sensor 370. For example, the selector arm controller can direct the selector arm 373 to move "up," at which time the sensor 370 optically senses DVD Title A in the inventory. When the sensor 370 optically senses DVD Title B in the inventory, the sensor 370 transmits a signal to the selector arm controller to stop the movement of the selector arm 373.

In a preferred embodiment, the compartmentalized storage device 369 comprises a plurality of compartmentalized rows 250 wherein each of the compartmentalized rows 250 comprises a plurality of compartments 254. Each of the compartments 254 corresponds to a horizontal position, and each of the rows corresponds to a vertical position, such that each compartment 254 within the storage device 369 has a position defined by a coordinate pair such as (0,0). The present invention provides a system and method for sensing the position of a selector arm 373 with respect to the storage device 369, and for directing the selector arm 373 to a compartment 254 of the storage device 369.

In one embodiment, the sensor 370 senses an object within the storage device 369, as described herein. The sensor 370 then communicates that data to a controller within the vending apparatus, such as vending controller 300. The controller 300 then determines, by consulting or querying a vending database within the vending apparatus, the position of the selector arm 373 with respect to the storage device 369. For example, the inventory database can store information relating DVD Title A to position (1,2), denoting that DVD Title A is stored in the first compartmentalized row 250, in the second compartment 254 within that row. Then, at a later time, the controller 300 can require the selector arm to be positioned relative to another compartment 254 on the storage device 369, which stores for example DVD Title B. The controller 300 consults or queries the inventory database to determine the compartment 254 in which DVD Title B is stored, for example, the compartment 254 denoted by the coordinate pair (3,7). The controller 300 then transmits that position to the selector arm 373, which moves the selector arm to the third compartmentalized row 250 and the seventh compartment 254 within that row 250. The optical sensor 370 can then be used to verify the position of the selector arm relative to the storage device 369, or can be used to control the motion of the selector arm 373 while it is being moved, as described herein.

Referring to FIG. 32, the storage compartment 369 is adjacent to the selector arm 373. FIG. 32 is a relief illustration of the interior of the vending apparatus 30 illustrated in FIGS. 19, 20 and 21. The compartmentalized storage device 369 is preferably a carousel-style, cylindrical storage facility having a plurality of compartmentalized rows 250 wherein each of the rows 250 has a plurality of compartments 254. In each of the compartments 254 can be stored a vending product, such as a DVD. A motor 253 comprised of a plurality of wheels rotates the storage device 369 about a vertical axis 252. Positioned adjacent to the storage device 369 is the selector arm 373, which moves vertically along a second vertical axis 258. The selector arm is driven by a second motor 260, which may be positioned on the vertical axis 258, as illustrated. Alternatively, the second motor 260 may be positioned on the selector arm 373. In a preferred embodiment, the motors 253, 260 are stepper motors. The selector arm 373 comprises at least one conveyor 374 such as a conveyor belt 374, which contacts one of the media products in one of the compartments 254 and conveys the product to the article transfer opening 44, 144, 244, whereby it is delivered to a user on the exterior of the article dispensing machine 30. The conveyor 374 is driven by a motor 372. The sensor 370 is preferably, as illustrated, mounted on the selector arm 373, as is the sensor controller 371.

Referring again to FIG. 31, the system and method for calibrating the vending apparatus uses a coordinate-style map to remove products from, and place products into, the storage device 369. In one embodiment, the controller (such as the vending controller 300 or the sensor controller 371) analyzes the coordinates of a vending product stored within one of the compartments 254. The coordinates comprise a vertical coordinate and a horizontal coordinate, wherein the vertical coordinate refers to one of the plurality of compartmentalized rows 250 and the horizontal component refers to one of the compartments 254 within that row 250. The controller 371 then analyzes the vertical coordinate of the coordinate pair to determine whether to advance the selector arm 373 up or down along the vertical axis 258. If the vertical coordinate is greater than the present vertical base reference position of the selector arm 373, as determined in step 367, the controller 371 instructs the motor 260 to advance the selector arm 373 in an "up" direction along the vertical axis 258, as illustrated in step 363. If the vertical coordinate is less than the present vertical base reference position of the selector arm 373, as determined in step 368, the controller 371 instructs the motor 260 to advance the selector arm 373 in a "down" direction along the vertical axis 258, as illustrated in step 364. Thus, the selector arm 373 is positioned at the vertical coordinate received from the controller 300, 371, wherein the vertical coordinate refers to one of the plurality of compartmentalized rows 250.

The controller 371 also analyzes the horizontal coordinate of the coordinate pair, wherein the horizontal coordinate refers to one of the storage compartments 254 in one of the rows 250. If the horizontal coordinate is greater than the present horizontal base reference position of the selector arm 373, as determined in step 366, the controller 371 instructs the motor 253 to rotate the storage device 369 in a clockwise direction, as illustrated in step 362. If, however, the horizontal coordinate is less than the present horizontal base reference position of the selector arm 373, as determined in step 365, the controller 371 instructs the motor 253 to rotate the storage device 369 in a counterclockwise direction, as illustrated in step 361. Thus, after the rotation is complete, the selector arm 373 will be aligned with the storage compartment 254 corresponding to the coordinate pair.

It will be understood that a motor 253 capable of rotating in a single direction (i.e., clockwise or counter-clockwise) is practicable with the present invention, because the storage device 369 is cylindrical. In particular, if the horizontal coordinate of the coordinate pair is less than the present horizontal base reference position of the selector arm 373, the controller 371 can instruct the motor 253 to rotate the storage device 369 clockwise until the selector arm 373 is aligned with the correct compartment 254. Thus, either a unidirectional or bidirectional motor 253 can be used to rotate the storage device 369.

Figure 33:
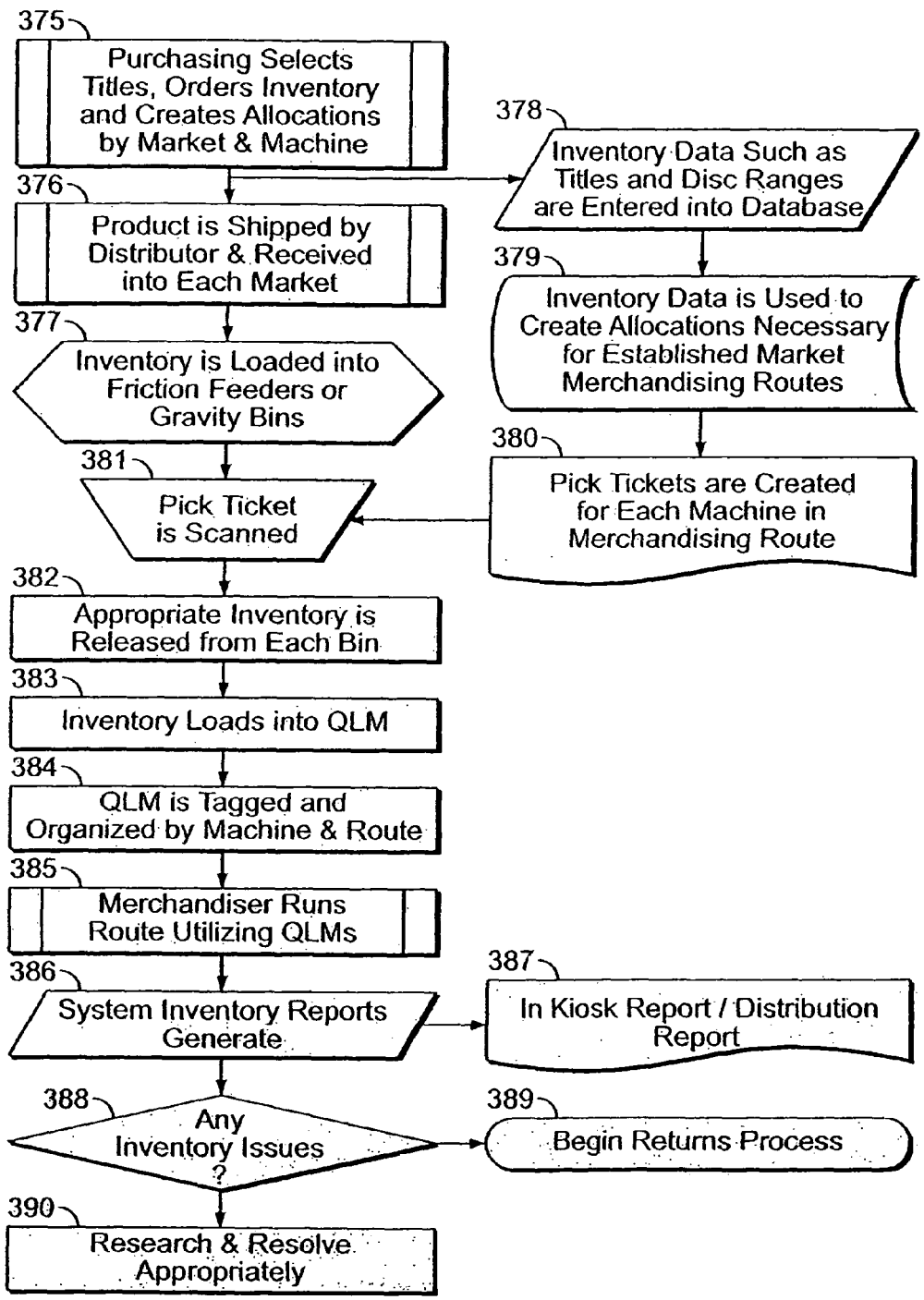
FIG. 33 is a flowchart illustrating the order of operations performed by a vending apparatus and remote control center in a system and method for managing vending inventory of a plurality of vendible media products.

Referring now to FIG. 33, a system and method for managing vending inventory is illustrated. An inventory descriptor is generated, wherein the inventory descriptor corresponds to a set of vendible media products. The set of vendible media products comprises a first and second vendible media product storeds in first and second locations 391, respectively. A signal is generated to dispense the first vendible media product from the first location 391, and a second signal is generated to dispense the second vendible media product from the second location 391. The set of vendible media products is then secured in a vending delivery module 238.

An inventory descriptor is generated in step 380, wherein the descriptor corresponds to a set of vendible media products such as DVDs, wherein the set of vendible media products comprises first and second vending products stored in first and second locations 391, respectively. A signal is then generated, in step 382, to provide the first vendible media product from the first location 391 and the second vendible media product from the second location 391. The first and second products are then, in step 383, secured within a vending delivery module 238.

The generation of the inventory descriptor is illustrated in steps 375, 378, 379 and 380. In step 375, the vending supplier selects the vending products that it wishes to purchase from the product supplier. For example, the operator of vending apparatus 30 selects a plurality of DVD titles that it wishes to supply in the vending apparatus 30. The vending supplier also determines, for each of the vending locations, a set of inventory that will be placed at that vending location. Next, in step 378, those inventory allocations are entered into a database 304. The inventory data in the database is used to create delivery allocations, in step 379, corresponding to merchandising routes. For example, the inventory allocation for a first vending apparatus 30 located along merchandising route A will be organized so as to coincide with the inventory allocation for a second vending apparatus 30 that is also located along merchandising route A. Thus, the product inventories for multiple vending apparatuses 30 are organized based on merchandising routes, to assure a more efficient method of distribution of the products.

In step 380, an inventory descriptor is generated, wherein the inventory descriptor refers to a set of vendible media products. The inventory descriptor identifies the quantity and type of each of the vendible media products that will be in the inventory of the vending delivery module 238 which the inventory descriptor identifies. For example, if the vending supplier wishes to secure 10 copies of DVD Title A and 20 copies of DVD Title B within a vending delivery module 238, an inventory descriptor will be generated in step 380 that identifies those inventory allocations. The inventory descriptor itself may be an optically readable media, such as a bar code, an infrared code or an ultraviolet code, or may also be a radio frequency identifier that is readable by a radio frequency receiver.

In step 376, the vendible media products that have been selected by the vending supplier are shipped to the supplier. In step 377, the products are arranged in predetermined locations 391. The predetermined locations 391 can be storage bins or friction feeders. Each predetermined location 391 stores a particular type of vendible media product. For example, all of the copies of DVD Title A will be stored in storage bin A, all copies of DVD Title B will be stored in storage bin B, etc. In step 381, the inventory descriptor is scanned. The scanning can be performed by an optical sensor such as a bar code reader, an ultraviolet reader or an infrared reader, and can also be performed by a radio frequency receiver. Based on the scanning of the inventory descriptor, the vendible media products identified by the inventory descriptor are released from the predetermined locations 391 according to the quantities specified by the inventory descriptor, as illustrated in step 382. For example, if the inventory descriptor specifies 10 copies of DVD Title A and 20 copies of DVD Title B, then upon scanning that inventory descriptor, a controller will generate a signal to release 10 DVD products from storage bin A and 20 DVD products from storage bin B.

Figure 34:
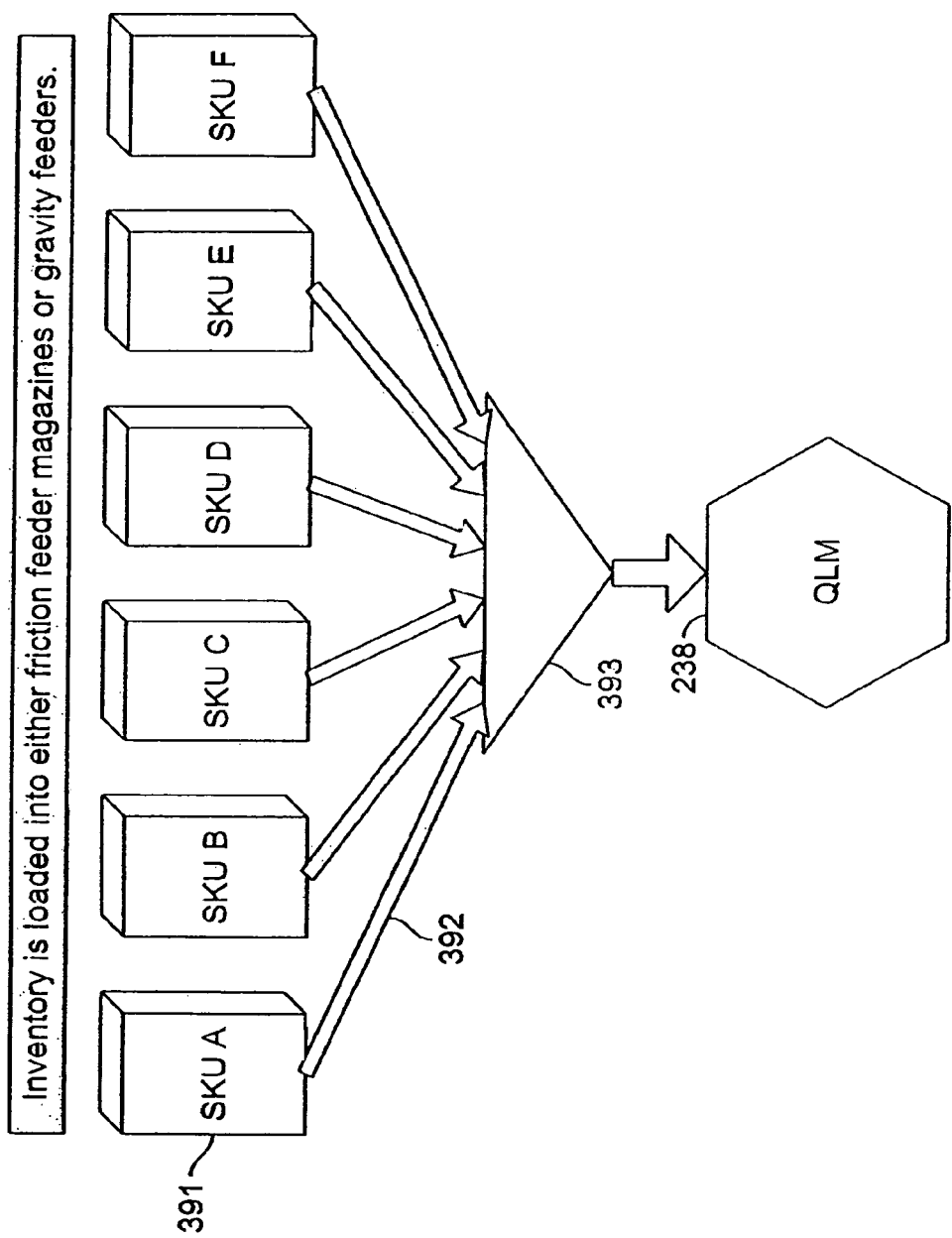
FIG. 34 is a schematic diagram of the elements of a system for managing vending inventory of a plurality of vendible media products.

In step 382, the set of vendible media products identified by the inventory descriptor is secured in the vending delivery module 238. The physical process of securing the vendible media products is described elsewhere herein. Referring to FIG. 34, a system for securing the vendible media products within the vending delivery module 238 is illustrated. The vendible media products are stored within predetermined locations 391, such as storage bins or friction feeders. Each of the locations 391 stores a particular type of vendible media product. The vendible media products are delivered from the locations 391 to the vending module by a conveyor 392. In one embodiment, the conveyor 392 is a conveyor belt, along which the vendible media products travel from the storage locations 391 to the vending delivery module 328. Upon arrival, they are either placed manually into the vending module 238, or are automatically fed into the vending delivery module 238 by use of a funnel sorter 393. In another embodiment, the conveyor 392 is gravity itself, and the vendible media products are dropped from the storage locations 391, which are located above a sorter 393, and are thereby delivered to the vending delivery module 238.

Referring again to FIG. 33, the inventory descriptor is attached to the vending delivery module 238, as illustrated in step 384. The vending delivery modules 238 are then organized according to a merchandising route, such that a plurality of vending delivery modules 238 can be delivered to a plurality of vending apparatuses 30 in a single merchandising trip. In step 385, vending personnel deliver the vending delivery modules 238 to the vending locations and insert the vending delivery modules 238 into the vending apparatuses 30, as described elsewhere herein. The vendible media products are thereby delivered to the vending apparatus 30. In step 386, the system optionally generates inventory reports. The reports can be generated at the remote control center, by a user using a personal computer 306 accessing the control functionality of the remote center via a web browser or by the vending controller 30 at the vending location. The inventory report contains data identifying the inventory in the vending apparatus 30, including the inventory that has been rented from, returned to and purchased from the vending apparatus 30.

In step 388, the system determines whether there are any problems that have arisen as a result of the inventory delivery process. One example of a problem that may arise is that a vending delivery module 238 may have been mistakenly delivered to the wrong vending location. Another example of a potential problem is that a vending delivery module 238 may have been tampered with, and vendible media products may be missing from the vending delivery module 238. Thus, in step 388, the system analyzes the inventory report generated in step 387 to determine if any such problems have arisen. The analysis of the inventory report may be performed either manually by a user or automatically by the vending controller 300 or the central server 302. The analysis is performed by comparing the inventory report generated in step 387 with the merchandising list set generated in steps 378 and 379. The analysis may be performed by the central server 302 by comparing the inventory database 304 data with the inventory report generated in step 386 and uploaded to the central server 302 by the vending controller 300. Alternatively, the analysis may be performed by the vending controller 300 by comparing local inventory database data with central database 304 data received from the central server 302.

If in step 388 it is determined that inventory was incorrectly delivered, the vending controller 300 can initiate a return process in step 389, whereby incorrectly delivered vendible media products are placed within a vending delivery module 238 at the vending location for pickup by vending personnel. Alternatively, as illustrated in step 390, any problems identified in step 388 can be investigated and addressed manually by vending personnel at either the remote control location or the vending location.

Figure 43:
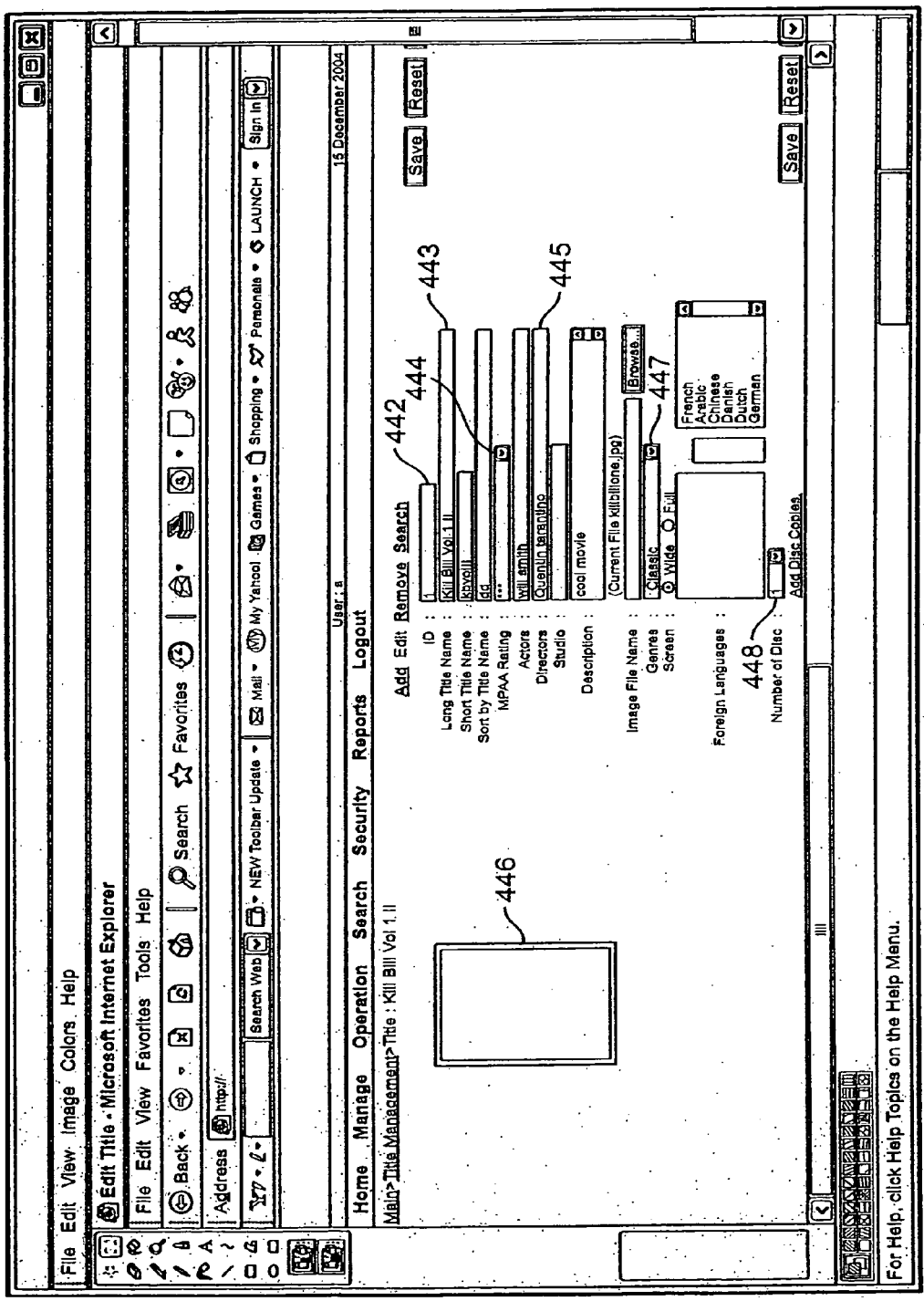
FIG. 43 an illustration of is a user interface for entering inventory information to an inventory database in accordance with a system for managing vending inventory.
Figure 44:
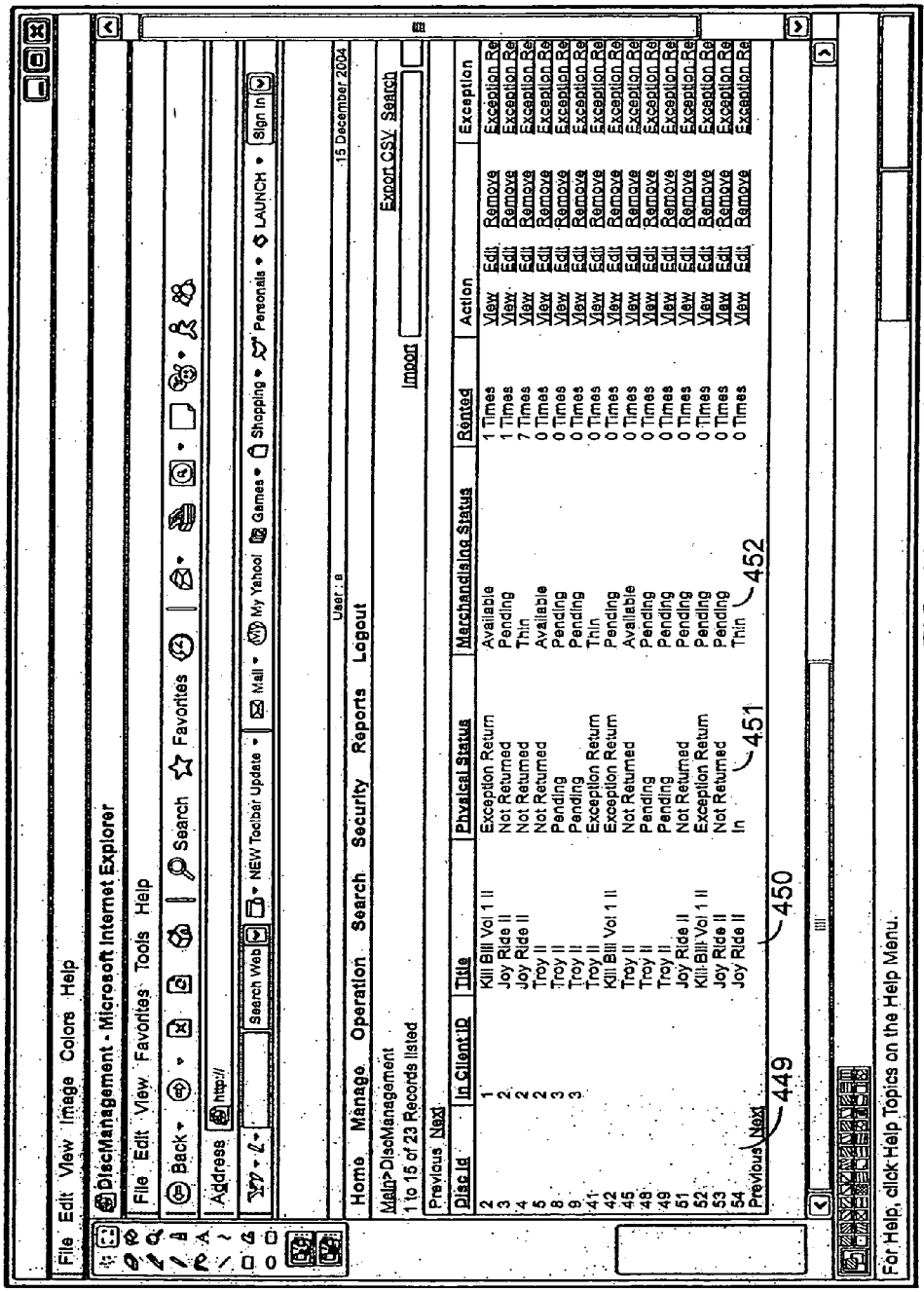
FIG. 44 an illustration of a user interface for viewing a vending inventory at a vending apparatus, in accordance with the principles of the present invention.

Referring now to FIGS. 43 and 44, a system and method for managing a plurality of vendible media products is illustrated. In step 427, a vending delivery module 238 is received containing a plurality of vendible media products. For example, a vending delivery module 238 can be received containing vendible media products that have been returned from a vending apparatus 30 as products that are no longer to be rented at the vending apparatus 30 because they have exceed a predetermined shelf life period of time. In step 428, the plurality of vendible media products are removed from the vending delivery module 238, preferably by rotating an interior axis within the vending delivery module 238, as described elsewhere herein. In step 429, each of the plurality of vendible media products is scanned, preferably by a scanner 440. The scanner 440 can be an optical scanner such as a bar code reader, an infrared scanner or an ultraviolet scanner. The scanner 440 can also be a radio frequency receiver, wherein each of the plurality of vendible media products is affixed with a radio frequency product identifier.

As the vendible media products are scanned, the identifying information from the vendible media products (e.g., title of the product, serial number of the product, SKU, etc.) are electronically transmitted to a server for recordation in the inventory database 304. Using that information from the database 304, packing lists are then generated in step 434, and the vendible media products are gathered into groups according to their type.

After a vendible media product is scanned, a determination is made as to whether the vendible media product has been identified, as illustrated in step 431. If the product is not identified in step 430, it is collected in a universal predetermined location 391, such as a storage bin, as illustrated in FIG. 44. If the vendible media product is identified in step 403, the product is delivered from the vending delivery module 238 to a predetermined storage location 391, such as a storage bin, according to the type of the vendible media product. For example, if the vendible media product is identified in step 330 as being a DVD having the title "Crossroads", the vendible media product is delivered in step 433 from the vending delivery module 238 to the predetermined storage bin 391, wherein the storage bin 391 collects all vendible media products having the title "Crossroads". The plurality of vendible media products are thus sorted according to their type, based on information received from the vendible media products during the scan performed in step 429.

To deliver the vendible media product from the vending delivery module 238 to the predetermined location 391, a conveyance means such as a conveyor belt 441 can be used. Alternatively, a friction feeder or a funnel can be used to sort the plurality of vendible media products. In step 436, each of the plurality of predetermined locations 391 is gathered according to its type. In step 437, it is determined, preferably by a server such as the central server 302, whether the vendible media products are to be reallocated to the plurality of vending apparatuses 30. For example, vending personnel may determine that while the "Crossroads" type of vendible media product did not rent sufficiently in a first vending location, the "Crossroads" type of vendible media product does rent sufficiently in a second vending location. Based on that assessment, the vending personnel can stored information in database 304 that will indicate that a predetermined number of vendible media products of the "Crossroads" type are to be reallocated from the first vending location to the second vending location. Thus, in step 437, the server determines whether the vendible media products in the storage locations 391 are to be reallocated by querying the inventory database 304. If it is determined that the vendible media products are to be reallocated, then in step 438 the vendible media products are delivered to a vending delivery module 238 for reallocation according to the system and method described elsewhere herein.

If it determined in step 437 that a vendible media product is not to be reallocated (e.g., it is damaged, or is to be returned to a media supplier), then in step 439 the appropriate measures are taken by vending personnel to appropriate the vendible media product. Determining whether a vendible media product is not to be reallocated is also made by querying the inventory database 304, wherein vending personnel can record information in the database 304 signaling that the vendible media product is not to be reallocated.

Figure 35:
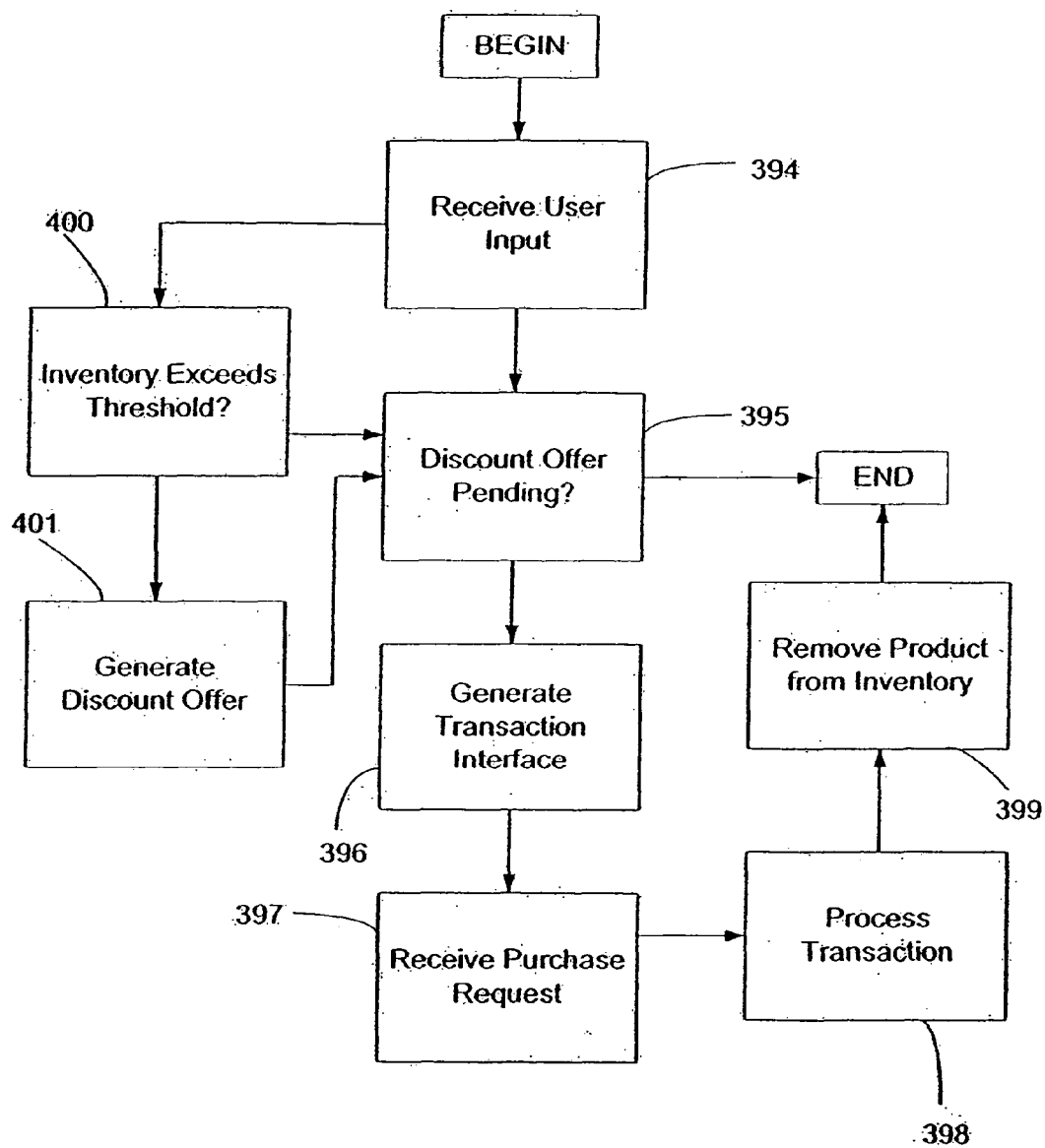
FIG. 35 is a flowchart illustrating the order of operations performed by a vending apparatus and remote control center in a system and method for vending vendible media products.

Referring now to FIG. 35, there is illustrated a system and method for marketing vendible media products. A first user input command is received, and it is determined whether a discount offer notification is pending. A communication for display on a user interface is generated, wherein the communication is structured to communicate an offer for at least one of the vendible media products at a discount price.

A user input command is received at the vending location of the article dispensing machine 30, as illustrated in step 394. The user input command can be a request by a user to rent a vendible media product such as a DVD, a command to return a previously rented DVD or another type of input command such as a command to browse the vending inventory or learn more about a vendible media product in the vending inventory. The vending controller 300 then determines whether a discount offer notification is pending. The discount offer information can be stored in a local inventory database, or it can be stored remotely in the central database 304. In the latter scenario, the discount offer is transmitted from the central server 302 to the vending controller 300. In that case, the central server 302 makes the determination as to whether a discount offer notification is pending.

A discount offer is an offer to sell or rent a vendible media product at a discounted price. For instance, if the normal cost of a DVD rental is $1.00 per day, a discount offer may be to rent the product at $0.50 per day. If the normal cost of a DVD purchase is $18.00, a discount offer may be to purchase the product for $12.00. Whether a discount offer notification is pending for any particular vendible media product is preferably stored either in a central database 304, or in a vending database local to the vending apparatus 30. Alternatively, whether a discount offer notification is pending or not can be determined at the time of the receipt of the user request and therefore need not be stored in a database. If in step 395 it is determined that there is no discount offer notification pending, the method terminates because no such offer is available to be transmitted to the user.

If, however, it is determined in step 395 that a discount offer notification is pending, then in step 396, a user interface is generated by the vending controller 300, wherein the interface serves to receive a user input command to receive the vendible media product according to the discount offer. For example, if the discount offer is to rent a DVD for $0.050 instead of $1.00, as determined in step 395, then the vending controller 300, in step 396, generates a user interface which notifies the user of that discount offer and receives the user's acceptance of that offer. The user interface can be presented using the audiovisual means previously described, such as the keypad and touch screen 234, 42.

In step 397, the vending controller receives, via the user interface generated in step 396, a request by the user to accept the discount offer. For example, the user may request to rent a DVD at a discounted rate of $0.50 per day or purchase a DVD at a discounted price of $12.00. In one embodiment, the discount offer is for a vendible media product that has been previously delivered to the user. For example, the vendible media product may be delivered to the user as a rental at a first time, and then when the user returns the vendible media product to the vending apparatus 30, the vending controller 300 may generate a discount offer for the user to purchase the rental product she is returning at that second time. Based on the user's acceptance of the discount offer in step 397, the discount transaction is processed in step 398 according to the transaction processing routine described herein. For example, the local vending inventory is updated to reflect the transaction, the transaction data is transmitted to the central server 302 and the vendible media product is delivered to the user through the article transfer opening 44. If the discount offer was for a purchase of a vendible media product, the product is then preferably removed from the local inventory database and the central inventory database 304, as illustrated in step 399.

The present invention also provides a system and method for determining whether a discount offer will be provided for a vendible media product. A preferred basis for making that determination is having an oversupply of a vendible media product in the inventory. For example, if the vending inventory contains 20 copies of DVD Title A, but only 80% of those copies are rented from the vending apparatus 30 at any point in time, the other 20% of the copies can be offered at a discounted rental rate, or can be offered for sale at a discounted purchase price. In step 400, the vending controller 300 determines whether the inventory of a particular vendible media product exceeds a predetermined threshold. The threshold can be determined as a percentage of inventory that does not get rented or sold, or it can be a quantitative measure of an inventory. For example, if the predetermined threshold is 20 copies of DVD Title A and 30 copies of that title are in the inventory, the vending controller 300 will determine in step 400 that 10 copies of DVD Title A are to be offered for discounted rental or sale. Alternatively, the analysis of whether the inventory exceeds a predetermined threshold can be made by the central server 300, or manually by a user using a personal computer 306 to access the control functionality of the remote control center via Internet browser software. If it is determined in step 400 that the inventory exceeds the predetermined threshold, then in step 401 the discount offer is generated.

In one embodiment, the discount offer is generated based on the genre of a previously delivered vendible media product. The vending controller 300 or central server 302 can, in step 395, determine the genre of a vendible media product previously rented or purchased by the user and can then offer discount offers for other vendible media products having the same genre. For example, the user can select to rent a DVD in step 394, wherein the genre of the DVD is "comedy." The vending controller 300 or central server 302 can then, in step 395, offer discounted rental rates to the user for other DVD titles that are also in the "comedy" genre, thereby encouraging the user to rent or purchase additional vendible media products that have already been identified of potential interest to the user.

Figure 36:
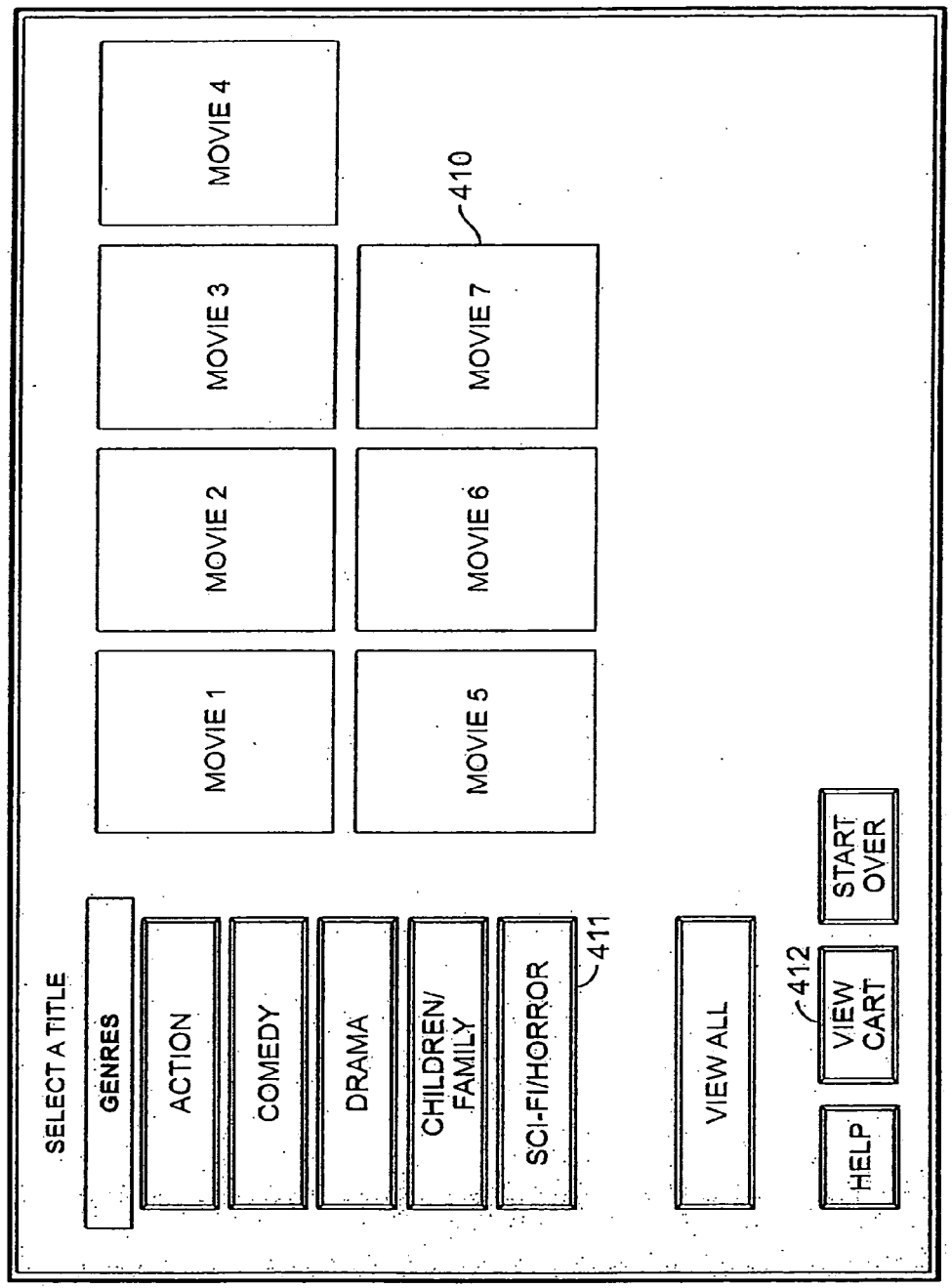
FIG. 36 is an illustration of a user interface for selecting a vendible media product at a vending apparatus.

Referring now to FIG. 36, there is illustrated a vendible media product selection interface for the purchase of vendible media products such as DVDs. The user interface is preferably displayed on a touch screen interface 243, 42. The user interface comprises a plurality of icons 410 representing vendible media products. The user interface further comprises genre selectors 411, corresponding to a type of vendible media product. The genre selectors 411 allow the user to select a particular type of product, thereby generating a user interface that will display all of the vendible media products in that particular genre. The interface also comprises a "checkout" function 412, which allows the user to view the vendible media products she has selected to rent and/or purchase.

Figure 37:
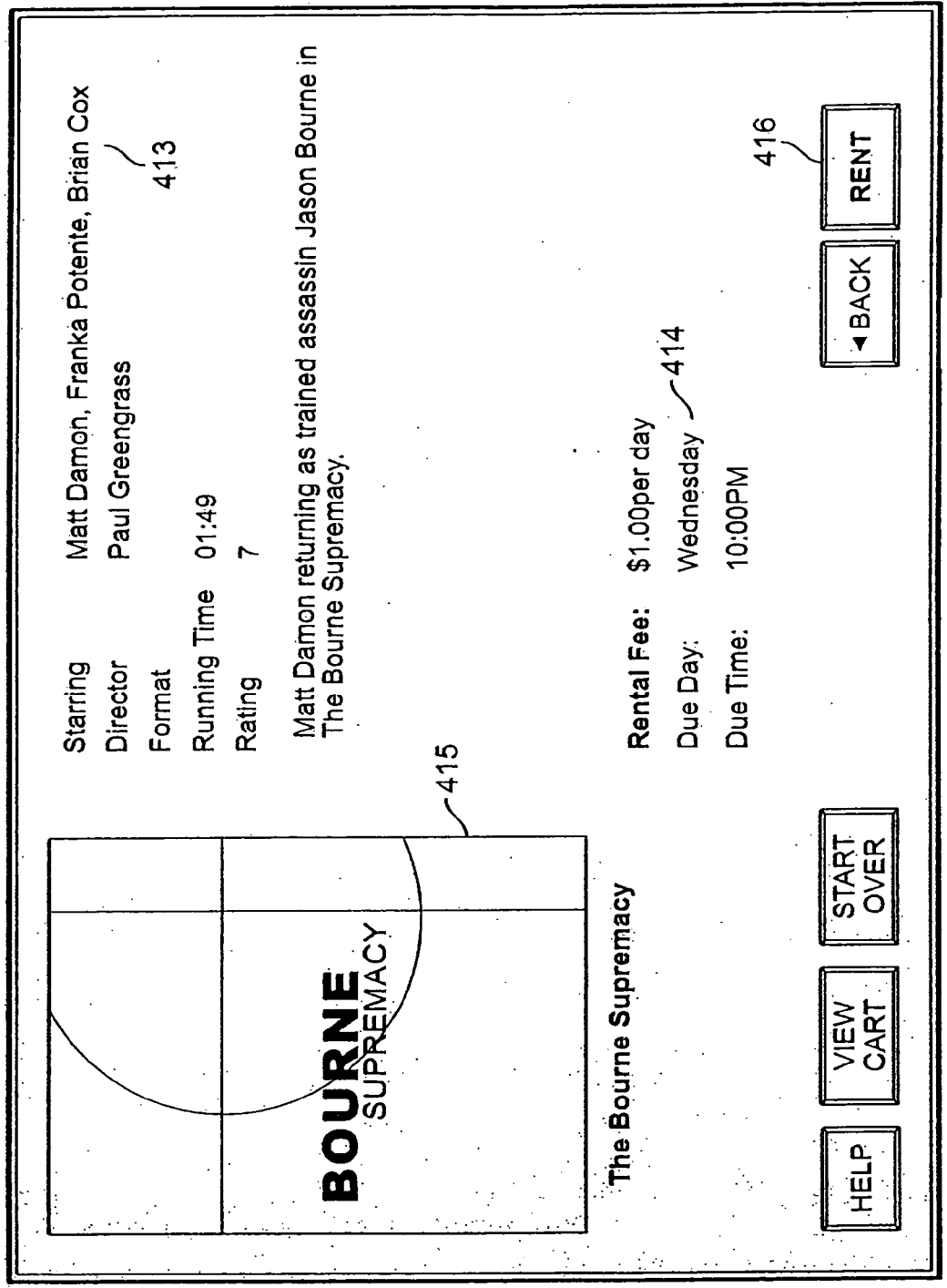
FIG. 37 is an illustration of a user interface for displaying information regarding a vendible media product and initiating a rental transaction for the vendible media product.

Referring now to FIG. 37, there is illustrated a vendible media product display interface for the purchase of vending products such as DVDs. The interface comprises vendible media product information 413, which provides to the user a description of the vendible media product. As illustrated, the vending product information 413 can comprise the title of the product, its run time, a user rating, any restrictions such as MPAA ratings and a description of the contents of the product. The interface also preferably comprises an image 415 for promoting the product, such as a "splash screen" image or other promotional image. The interface also preferably comprises transaction details 414, such as the price of the rental and/or purchase of the product, and the date by which the product is expected to be returned to the vending apparatus 30. The interface also preferably comprises a transaction completion function 416, whereby the user can request to rent and/or purchase the vendible media product.

Referring now to FIG. 38, there is illustrated a transaction interface for renting and/or purchasing vendible media products such as DVDs. The transaction interface allows the user to select multiple vendible media products to rent and/or purchase, using a "shopping cart" functionality known to one of skill in the art. The interface comprises a list of a plurality of vendible media products that have been selected by the user, wherein the list comprises detailed information 417 relating to the selected vendible media products, such as the title of the product and the rental and/or purchase price of the product. The interface also preferably comprises a "remove" function 418, whereby the user may edit the list of selected products to remove a product she no longer desires to rent and/or purchase. The interface also preferably comprises a "checkout" function 419, whereby the user can select to complete the transaction to rent and/or purchase the products listed in the interface.

Figure 39:
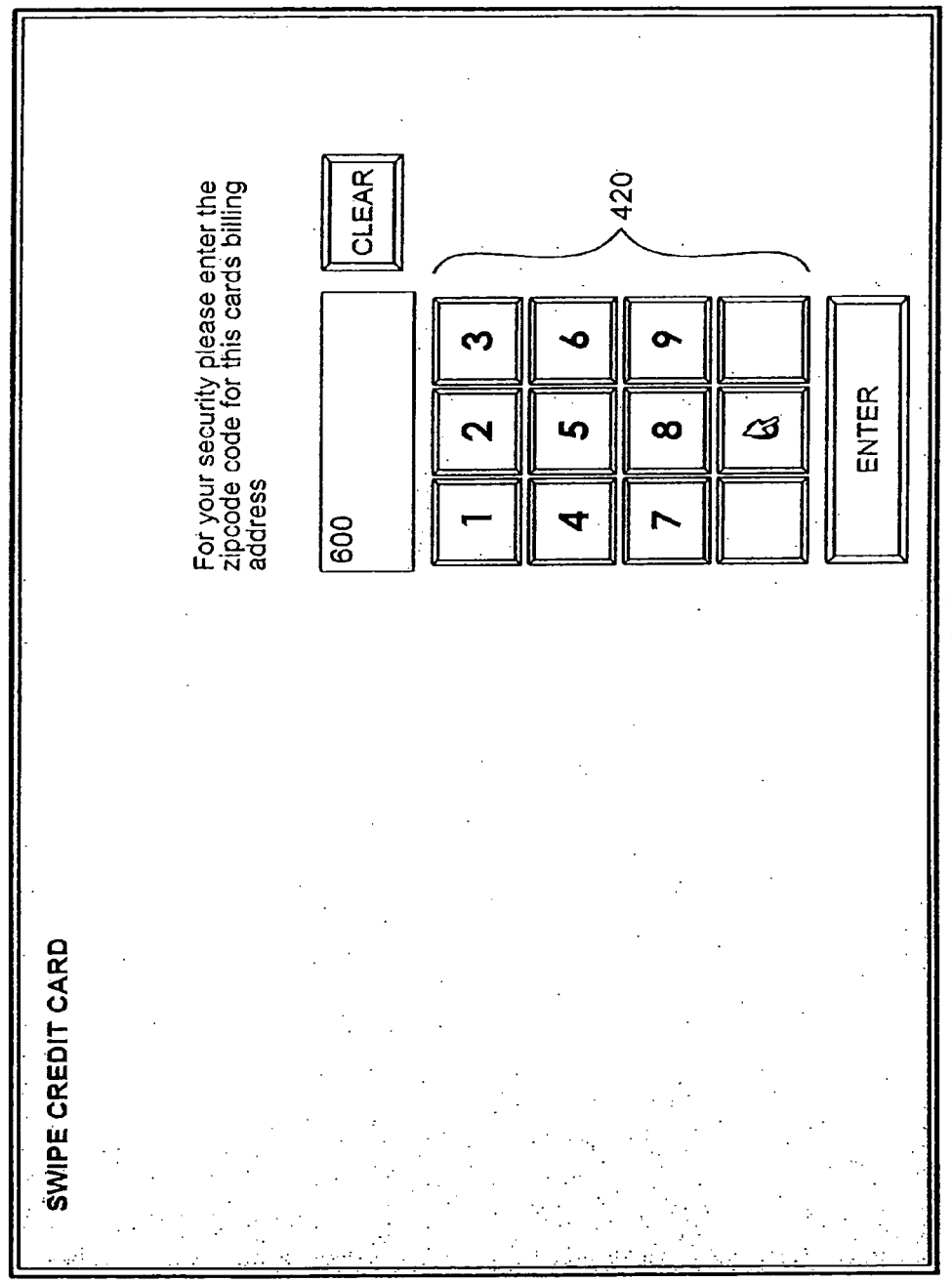
FIG. 39 is an illustration of a security interface for providing security information during a rental and/or purchase transaction of a vendible media product at a vending apparatus.

Referring now to FIG. 39, there is illustrated a security interface for the rental or purchase of a vendible media product such as a DVD. The security interface comprises a touch sensitive number pad 420, as illustrated, or a touch sensitive keypad. When the user provides financial information such as a credit card or debit card number, preferably by sliding the credit or debit card through a financial card reader on the exterior of the article dispensing machine 30, the security interface illustrated in FIG. 39 is preferably displayed, providing additional security to the transaction. The user can be prompted, as illustrated, to provide a security identifier associated with the financial account, such as the zip code associated with the billing address of the financial account. Alternatively, the user can be prompted to enter a PIN or a CVV number using the number pad 420.

Figure 40:
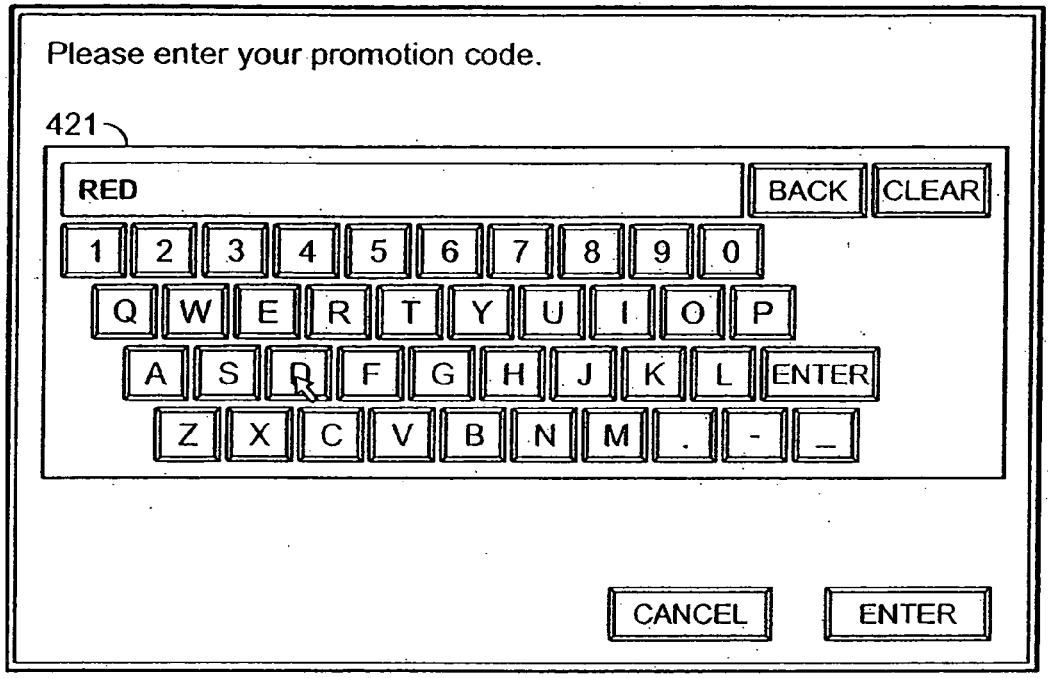
FIG. 40 is an illustration of a user interface for providing promotional information during the transaction of a vendible media product at a vending apparatus.

Referring now to FIG. 40, there is illustrated a promotional interface for use in renting and/or purchasing vendible media products such as DVDs. The promotional interface comprises an entry function 421 such as a touch-sensitive keyboard displayed on the display screen, as illustrated. The keypad allows the user to enter a promotional code, thereby entitling the user to a discount offer for the rental and/or purchase of a vending product.

Figure 41:
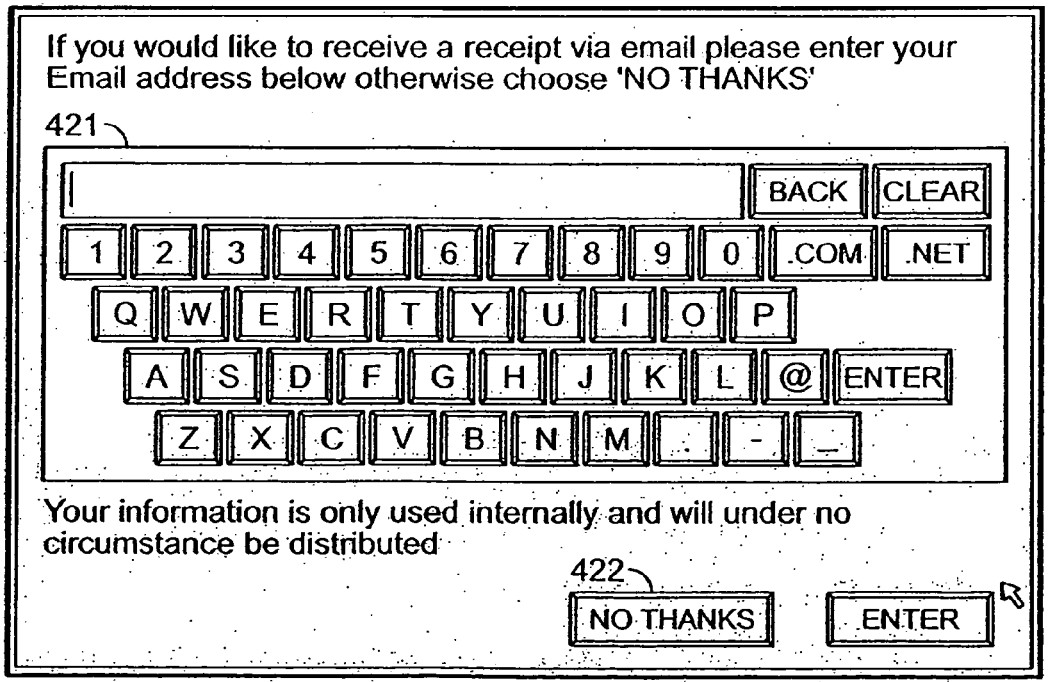
FIG. 41 is an illustration of a user interface for providing an electronic mail address during the transaction of a vendible media product at a vending apparatus.

Referring now to FIG. 41, there is illustrated an electronic mail address interface, through which the user can provide an electronic mail address to which will be transmitted promotional offers, discount offers and/or offers for the sale of vendible media products. The interface comprises a touch-sensitive keyboard 421 displayed on the display screen, whereby the user can provide her electronic mail address. The interface also preferably comprises a denial function 422, whereby the user can elect not to provide an electronic mail address to the system.

Figure 42:
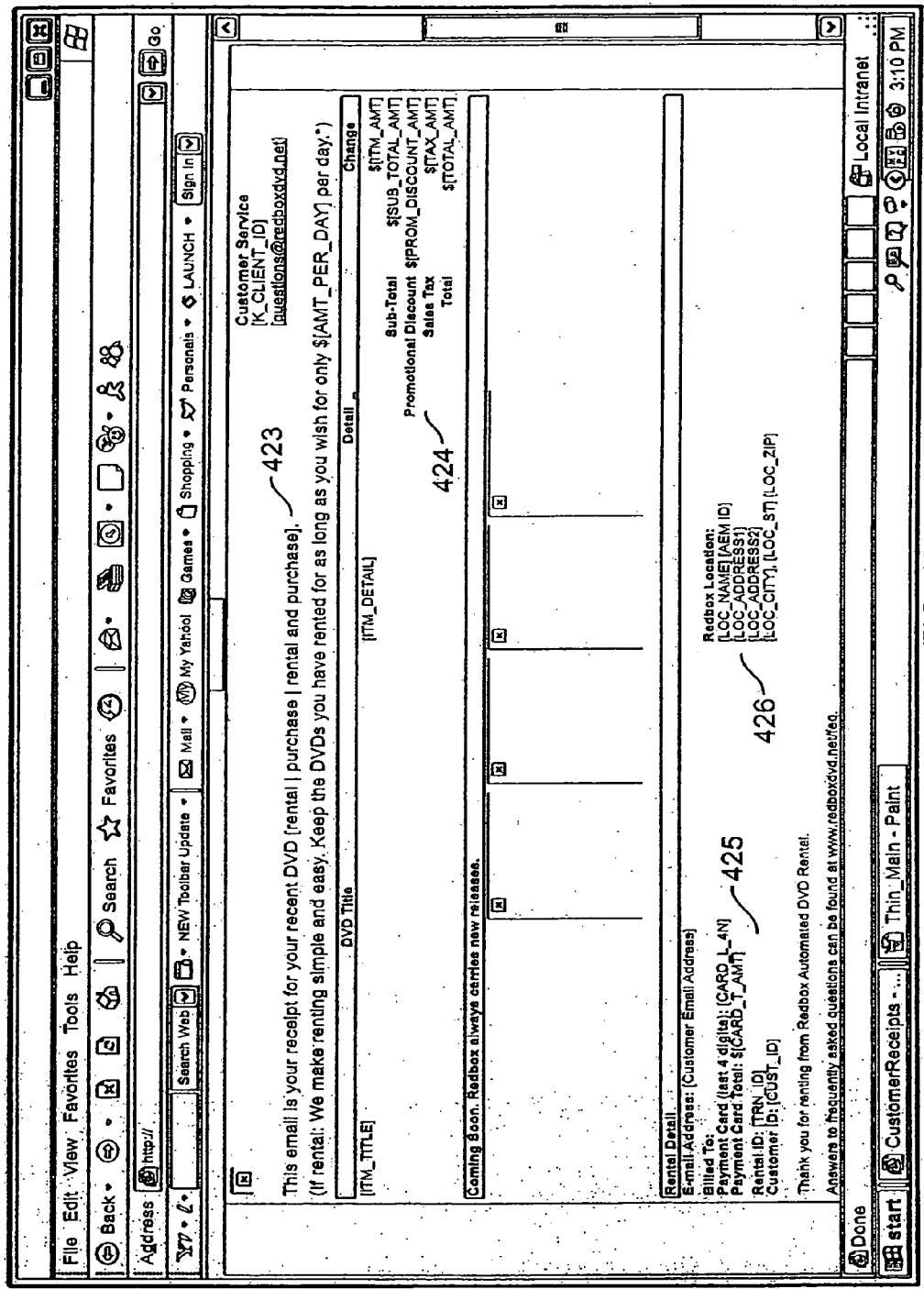
FIG. 42 an illustration of is a user interface for configuring an electronic mail message to be transmitted to a user-provided mail address according to the principles of the present invention.

Referring now to FIG. 42, a user interface is illustrated for configuring an electronic mail message to be transmitted to a user-provided electronic mail address according to the system and method for selling vendible media products. The user interface is intended to be used by an administrative vending personnel user employing personal computer 306 and interfacing with the central server 302 via the Internet browser software of personal computer 306. Through the interface, the user can specify the text 423 of the electronic mail message that will be received by the customer user, and can also specify the price portion 424 of the transaction data that will be transmitted to the customer. The user interface allows the administrative user to format the presentation of a receipt for the transaction, as illustrated, and can also be used to transmit to the customer user an option to purchase the vendible media rental product, or to rent or purchase additional vendible media products at a discounted price. The user interface also allows the administrative user to view and, if desired, transmit to the user-provided electronic mail address payment information 425 that has been provided by the user during the transaction, and location information 426 specifying the vending location at which the transaction occurred. It will be understood that the user interface provides a template for electronic mail messages, and need not be accessed or modified by the administrative user for every receipt or discount offer. The template is used by an electronic mail application embodied in computer software executed by the central server 302 to send the template to the customer users. It will be understood that the electronic mail application retrieves information from the inventory database 304 and enters the information from the database 304 into the template and then automatically transmits the electronic mail message to the user-provided electronic mail address.

Referring now to FIG. 43, a user interface is illustrated for entering inventory information to the inventory database 304, wherein the inventory information specifies a type of vendible media product. The user interface is intended to be used by an administrative vending personnel user employing personal computer 306 and interfacing with the central server 302 via the Internet browser software of personal computer 306. The user interface allows the administrative user to determine the information that will be displayed to a customer user at the vending apparatus 30 pertaining to a particular type of vendible media product. The interface allows the user to specify the title 442 of the vendible media product, and additional information 445 related to the vendible media product, such as the actors starring in a DVD movie, the director of the movie and a description of the movie. The interface also allows the user to specify a user rating 444 or an MPAA rating 444 that will be displayed to customer users. The interface also allows the administrative user to specify a genre 447 of the vendible media product, and further to specify the quantity 448 of the vendible media products.

The quantity 448 of vendible media products entered into the user interface can specify the quantity of that type of vendible media products located at a particular vending location, or the quantity that type of vendible media product in aggregate throughout the vending inventories of the vending apparatuses 30 or the quantity of that type of vendible media product that will be ordered from a vendible media supplier and then delivered to the vending inventory of the vending apparatuses 30. The user interface also allows the administrative user to specify an image 446 that will be displayed to the customer user pertaining to the vendible media product, such as a trailer image, a screenshot or a promotional poster image.

Referring now to FIG. 44, a user interface is illustrated for viewing the vending inventory at a vending apparatus 30. The user interface is intended to be used by an administrative vending personnel user employing personal computer 306 and interfacing with the central server 302 via the Internet browser software of personal computer 306. The user interface is generated by querying database 304 to retrieve a listing of the vendible media products located in the vending inventory of a particular vending apparatus 30. The user interface displays an identifier 449 that uniquely identifies each of the vendible media products, such as a product identifier. The interface also displays a title 450 of the vendible media product, and the physical status 451 of the product, indicating for example whether the vendible media product is prevent in the inventory, has been rented or is missing. The interface also displays a quantity indicator 452 that indicates the quantity of that type of vendible media product in the inventory. For example, if the quantity of that type of vendible media product in the vending inventory is below a predetermined threshold, the interface will display that vendible media product supply as being "thin" or below the threshold.

Figure 45:
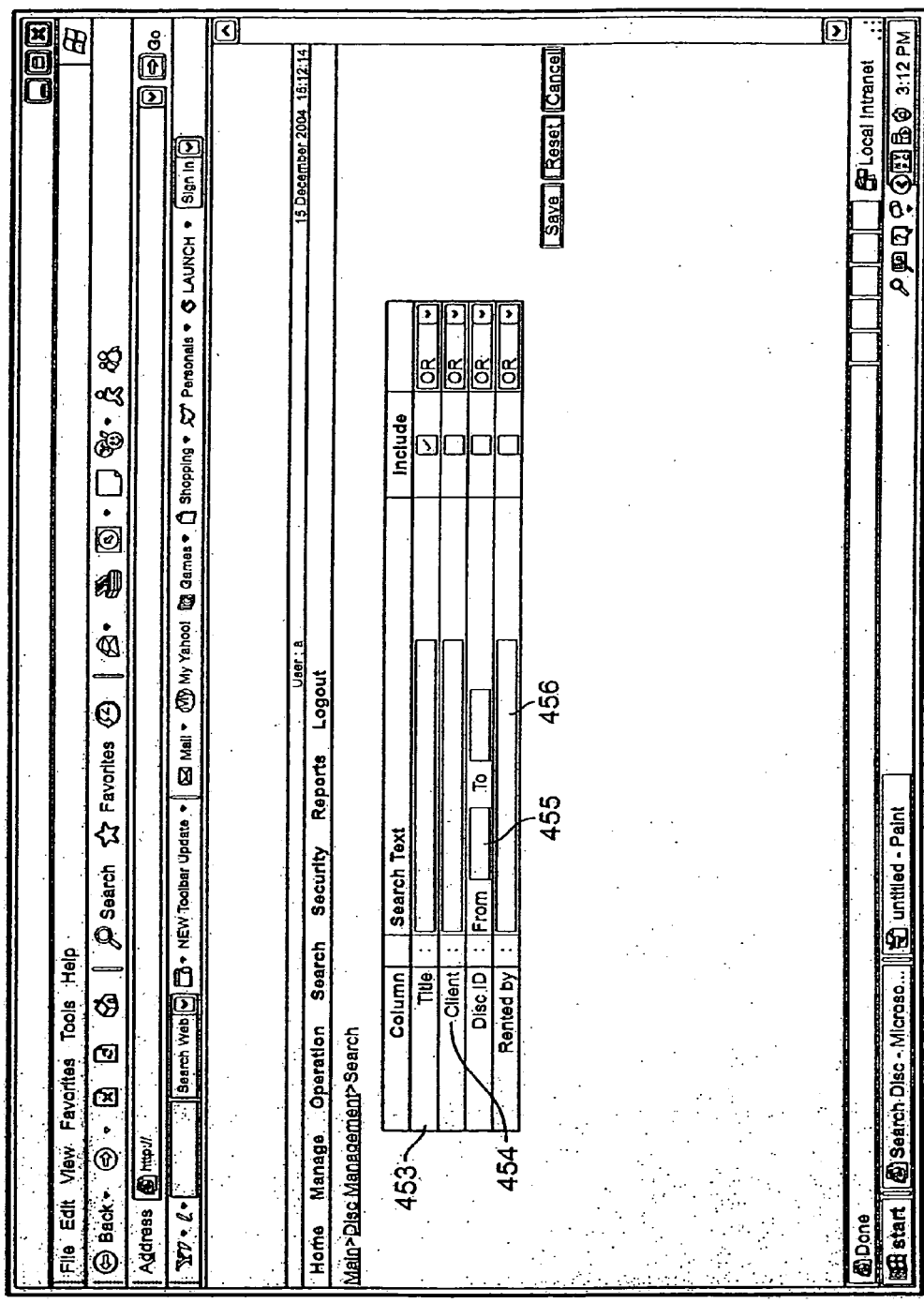
FIG. 45 is an illustration of a user interface for displaying the results of a query of an inventory database storing data related to a system for vending vendible media products.

Referring now to FIG. 45, a user interface is illustrated for querying the inventory database 304 to retrieve vending information regarding the vendible media products. The user interface is intended to be used by an administrative vending personnel user employing personal computer 306 and interfacing with the central server 302 via the Internet browser software of personal computer 306. The interface allows the administrative user to query the database according to the title 453 of the vendible media product, a vending location 454, a unique product identifier 455 or a customer user name 456. Information stored in the database 304 pertaining the query will be displayed in the user interface, as illustrated in FIG. 46.

Figure 46:
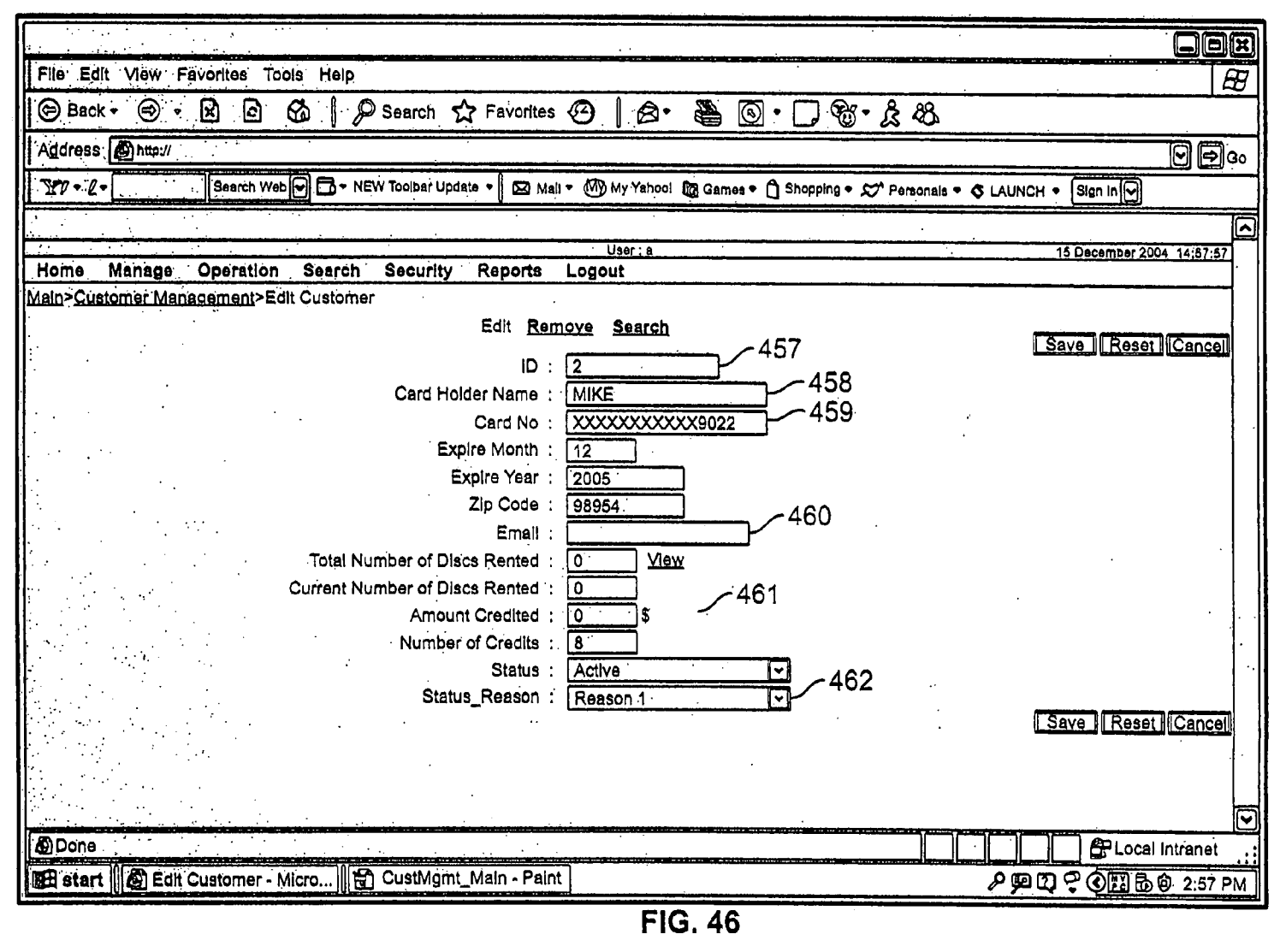

Referring now to FIG. 46, a user interface is illustrated for viewing and editing customer user information. The user interface is intended to be used by an administrative vending personnel user employing personal computer 306 and interfacing with the central server 302 via the Internet browser software of personal computer 306. The interface allows the administrative user to view the customer's name 458 and a unique customer identification code 457. The interface also allows the administrative user to view the customer user's financial information 459, such as the user's credit card account information. In a preferred embodiment, the customer user's credit or debit card number is stored in the database 304, but the administrative personnel, as illustrated, cannot view the information via the interface. The interface also allows the administrative user to view and/or edit the customer user's electronic mail address 460, and the customer user's aggregate data 461 relating to the number of vendible media products that have been rented and/or purchased by that customer user. The interface also allows the administrative user to set a privilege 462 that will determine the type of customer user; for example, specifying whether the customer user is able to rend vendible media products at the vending apparatus 30 or whether the customer user is a preferred customer. It will be understood that any changes made via the interface can then be stored in the database 304 for later retrieval via the interface or download to a vending controller 300.

Figure 47:
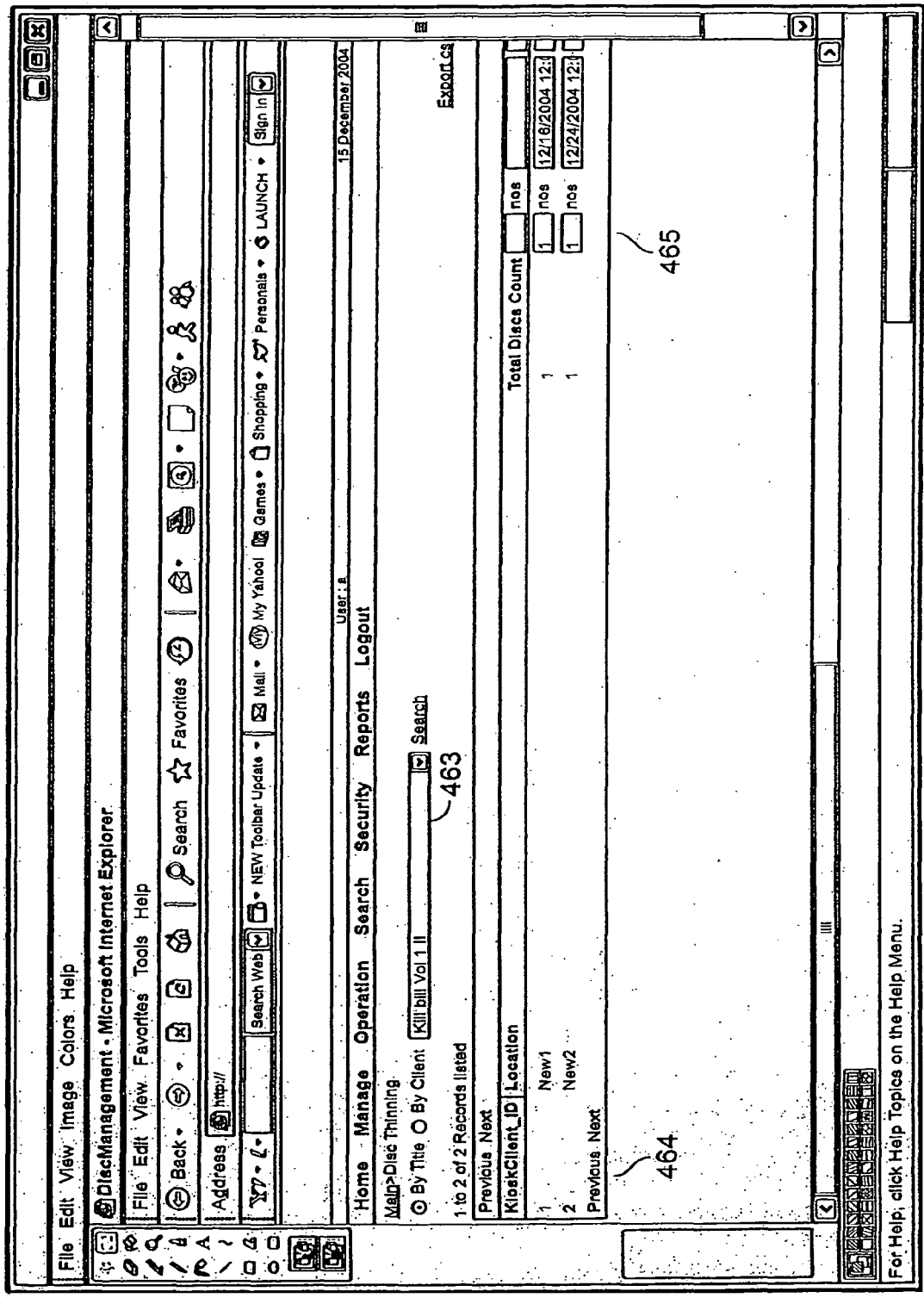
FIG. 47 is an illustration of a user interface for selecting vendible media products in a vending inventory of a vending apparatus for removal from the vending apparatus.

Referring now to FIG. 47, a user interface is illustrated for selecting vendible media products in a vending inventory of a vending apparatus 30 that will be removed from the vending apparatus 30. The user interface is intended to be used by an administrative vending personnel user employing personal computer 306 and interfacing with the central server 302 via the Internet browser software of personal computer 306. The user interface allows an administrative user to query the database 304 for vendible media products meeting an inventory description 463 such as the title of a type of vendible media product. The interface then displays a list of database 304 entries of vendible media products meeting that inventory description 463. The interface displays the location 464 of the vendible media product, and allows the user to select a quantity 465 of the vendible media product to be removed from the vending apparatus 30. The administrative user then submits the information to the database 304, and it is then downloaded to the vending controller 300. The identified vendible media products are then placed in a predetermined location for removal from the vending apparatus 30 according to the system and method described elsewhere herein.

Figure 48:
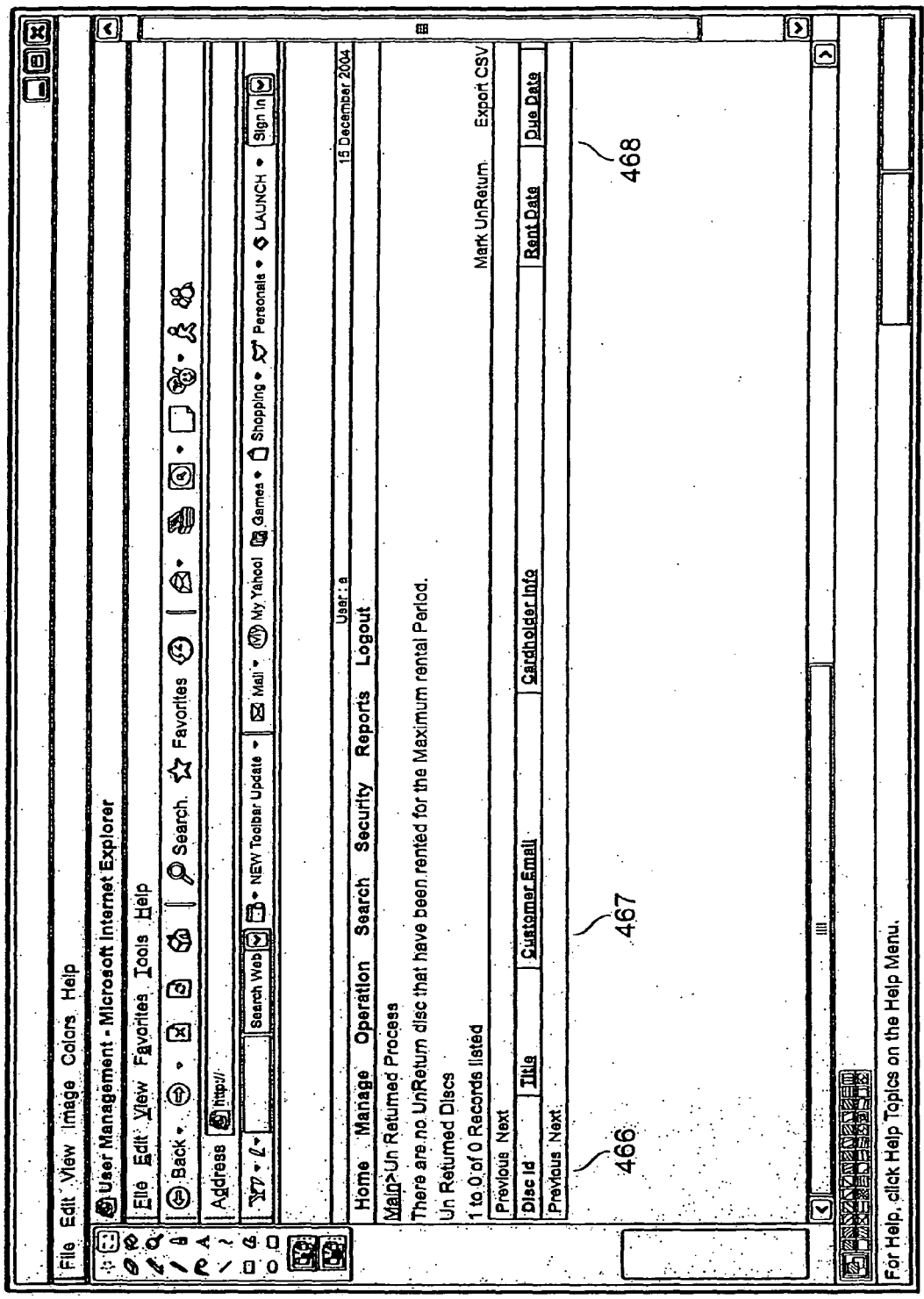
FIG. 48 is an illustration of a user interface for viewing vendible media products that have been rented from a vending apparatus.

Referring now to FIG. 48, a user interface is illustrated for viewing vendible media products that have been rented longer than a predetermined period of time. The user interface is intended to be used by an administrative vending personnel user employing personal computer 306 and interfacing with the central server 302 via the Internet browser software of personal computer 306. The interface queries the database 304 based on the rental time information 468 of the vendible media product descriptions stored in the database 304, and retrieves a list of vendible media products that have been rented, and not returned, for long than a predetermined period of time. The administrative user, via the interface, may specify the predetermined period of time. For example, the user can select to view a list of vendible media products that have been rented and not returned for longer than one week. The interface then displays a product identifier 466 identifying the vendible media product, such as a unique product code or a title of the product. The interface also displays contact information 467 for the customer user, such as the user's electronic mail address, by which the administrative user can contact the customer user to notify her of the late status of the rented vending media product.

Figure 49:
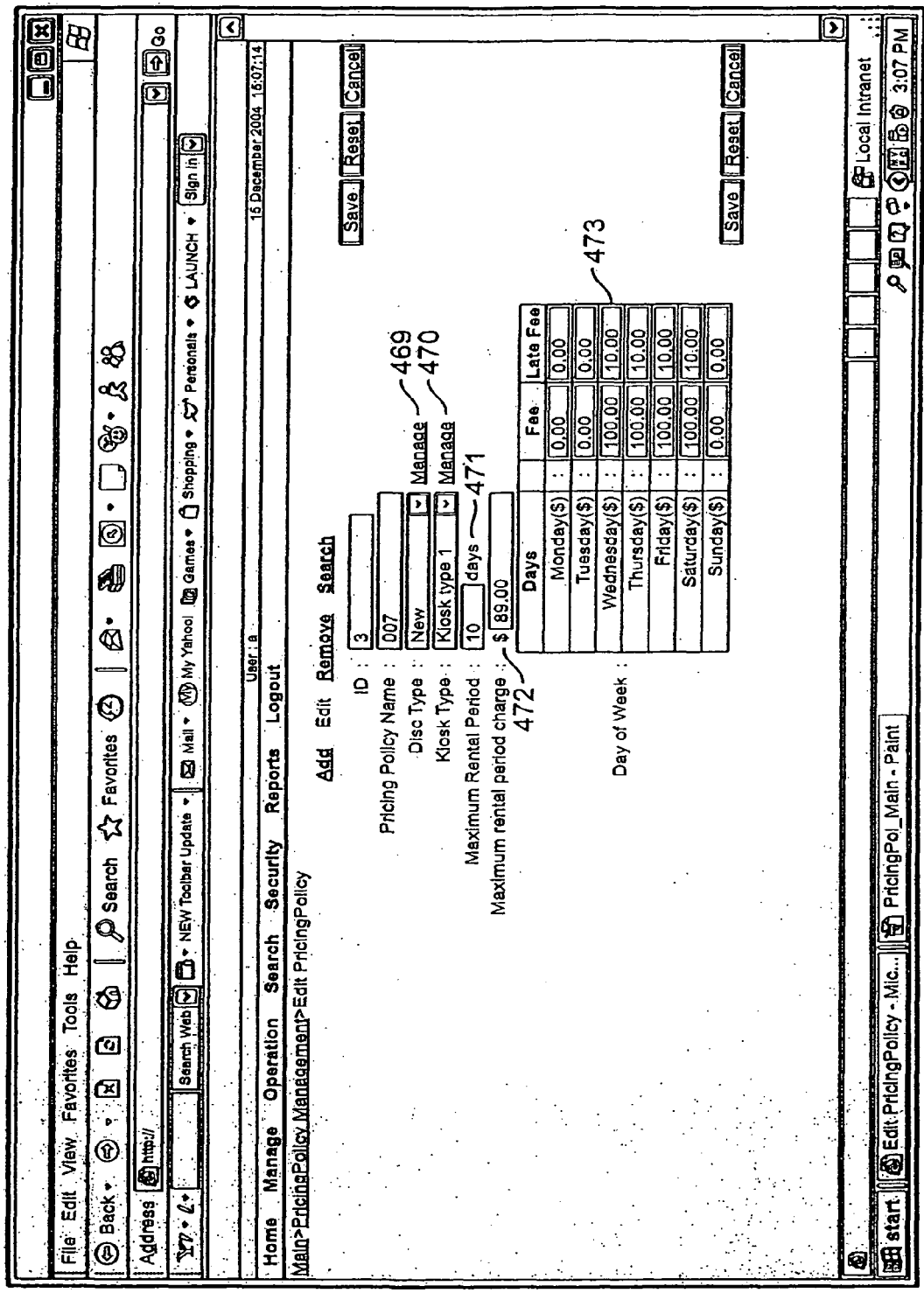
FIG. 49 is an illustration of a user interface for displaying pricing policy information for a plurality of vendible media products stored in a vending apparatus.

Referring now to FIG. 49, a user interface is illustrated for displaying pricing policy information for a plurality of vendible media products at a vending apparatus 30. The user interface is intended to be used by an administrative vending personnel user employing personal computer 306 and interfacing with the central server 302 via the Internet browser software of personal computer 306. It will be understood that the fields illustrated in the user interface are populated with data retrieved from the inventory database 304. The interface allows the user to specify a pricing policy for a vending location, or for a particular type of vendible media product. For example, the administrative user can use a media selector 469 to determine a pricing policy for a particular type of vendible media product, or can use a location selector 470 to determine a pricing policy for a set of vending apparatuses 30 or an individual vending apparatus 30. The interface allows the user to determine a threshold of time 471 which will be considered a maximum rental period, beyond which the customer user will be charged for the full purchase price of the vendible media product. The interface also allows the administrator user to determine a threshold cost 472 as a maximum rental period cost, beyond which the customer user will not be charged for the rental of the vendible media product.

The interface also allows the user to specify pricing information 473, which defines a pricing policy for the rental and/or purchase of vendible media products. As illustrated, the interface allows the administrative user to customize the rental and/or purchase prices for vendible media products at a particular set or individual one of vending apparatuses 30, according to periods of time such as days of the week. For example, the administrative user can, via the interface, establish a different rental price for Thursday as opposed to Friday, and a different late fee charge for those days as well. Using the interface, the administrative user can also thereby establish discount periods and discount offers based on the time periods. It will be understood that after the user submits the requisite information in the interface, the data is then saved into the inventory database 304 and then downloaded to the vending controller 300.

Figure 50:
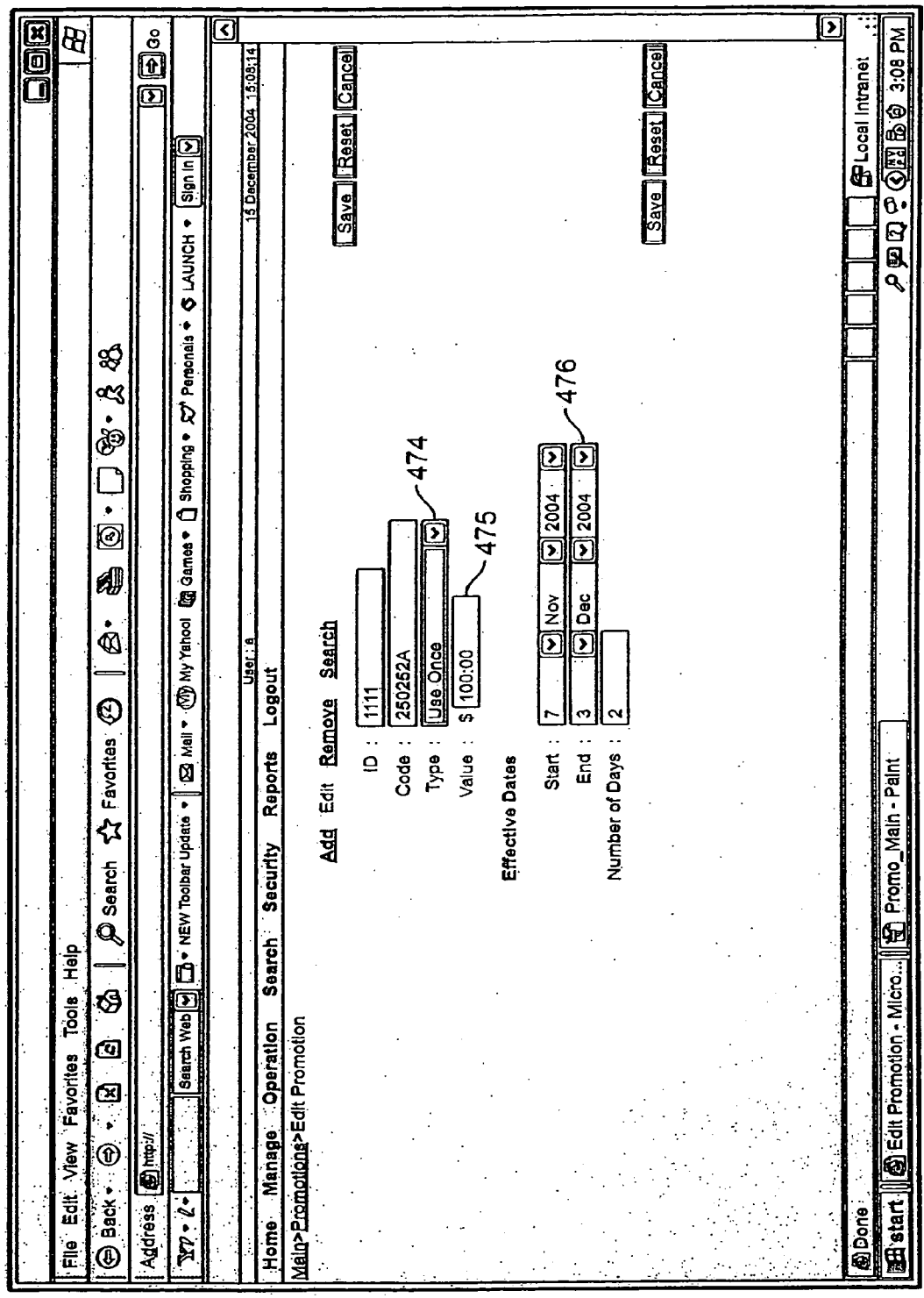
FIG. 50 is an illustration of a user interface for establishing a discount offer for a vendible media product vended from a vending apparatus; and, FIG. 51 is an illustration of a user interface for displaying and editing information pertaining to users of a vendible media distribution system.

Referring now to FIG. 50, a user interface is illustrated for establishing a discount offer. The user interface is intended to be used by an administrative vending personnel user employing personal computer 306 and interfacing with the central server 302 via the Internet browser software of personal computer 306. It will be understood that the fields illustrated in the interface are populated with data retrieved from the database 304. The interface allows the administrative user to determine the number of times 474 the discount offer will be offered, and the value 475 of the discount offer. The interface also allows the user to specify a duration 476 for the discount offer. The interface can also allow the user specify a particular type of vendible media for which the discount offer will be offered, and/or a particular location at which the discount offer will be offered. It will be understood that after the user submits the information via the interface, the information is stored in the database 304 for later download to the vending controller 300.

Figure 51:
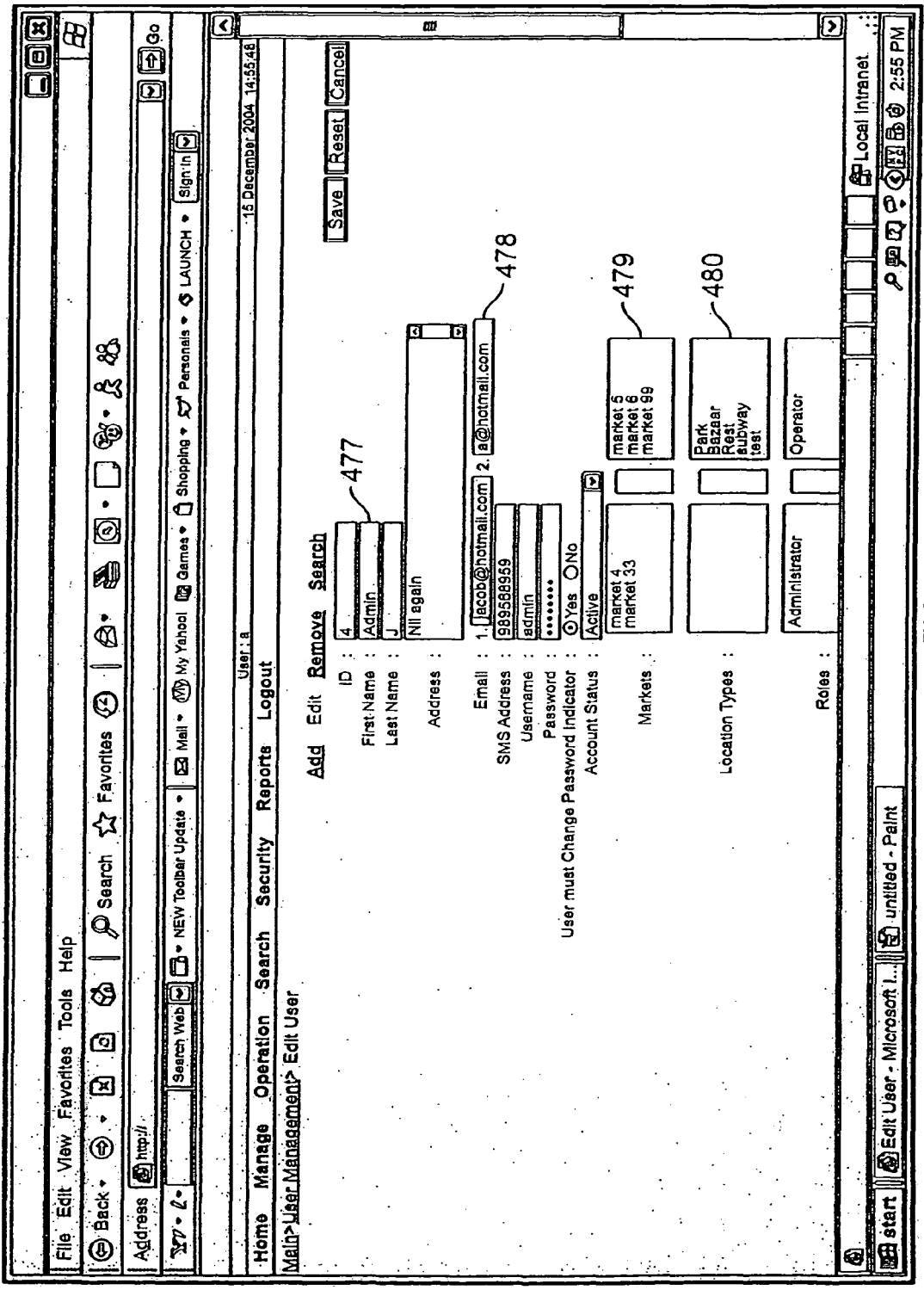

Referring now to FIG. 51, a user interface is illustrated for displaying and/or editing information pertaining to users of the vendible media distribution system. The user interface is intended to be used by an administrative vending personnel user employing personal computer 306 and interfacing with the central server 302 via the Internet browser software of personal computer 306. The interface allows the administrative user to view and change information pertaining to both customer users and administrative users. The interface allows the administrative user to view identification information 477 pertaining to the user, and contact information 478 pertaining to the user. The interface also allows the user to specify a set of vending apparatuses 479 for which an administrative user is responsible for administering; via the same interface, the administrative user also view a set of vending apparatuses 479 at which a customer user has transacted a vending transaction for a media product. The interface also allows the user to view and change a list 480 of vending apparatuses for which an administrative user is responsible for administering, or a list at which a customer user has performed a vending transaction. It will be understood that after the administrative user enters data into the interface, that data is uploaded to the database 304 for later download to the vending controller 300.

Any process descriptions or blocks in figures represented in the figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

While the specific embodiments have been illustrated and described, numerous modifications come to mind without significantly departing from the spirit of the invention, and the scope of protection is only limited by the scope of the accompanying Claims.

What is claimed is:

1. A method for managing vending inventory of vendible media products, comprising the steps of:
   receiving a vending module containing a plurality of vendible media products;
   reading an inventory descriptor, wherein the inventory descriptor identifies the vendible media products;
   identifying storage locations corresponding to the vendible media products wherein the storage locations are storage bins storing a plurality of entertainment media; and
   opening the vending module; and,
   conveying the vendible media products to the storage locations.

2. The method of claim 1 wherein, the step of opening comprises automatically unlocking the vending module.

3. A method for managing vending inventory of vendible media products, comprising the steps of:
   receiving a vending module containing a plurality of vendible media products;
   reading an inventory descriptor, wherein the inventory descriptor identifies the vendible media products;
   identifying storage locations corresponding to the vendible media products wherein the storage locations are storage bins storing a plurality of entertainment media;
   conveying the vendible media products to the storage location;
   generating an inventory descriptor corresponding to the plurality of vendible media products, wherein the plurality of vendible media products comprises a first and a second vendible media product stored in first and second locations, respectively;
   generating a first signal to dispense the first vendible media product from the first location;
   generating a second signal to dispense the second vendible media product from the second location; and,
   securing the plurality of vendible media products in a vending delivery module.

4. The method of claim 3, wherein the locations are storage bins storing a plurality of digital video discs.

5. The method of claim 3, further comprising the step of conveying the vendible media products to a vending delivery module via a conveyor belt.

6. The system of claim 3, wherein each of the vendible media products is a digital video disc.

7. The method of claim 3, wherein the inventory descriptor corresponds to a delivery route.

8. The method of claim 3, further comprising the step of:
   generating a signal to cause a conveyor belt to convey the vendible media products to the storage locations.

9. The method of claim 3, wherein the vending delivery module is secured upon receipt of the vending module, further comprising the steps of: opening a security provision of the vending delivery module; and, removing the vendible media products from the vending delivery module.

10. A method for managing vending inventory of digital video discs, comprising the steps of:
   storing a plurality of digital video discs in a plurality of storage compartments, wherein each of the plurality of storage compartments stores a type of digital video disc;
   generating an inventory descriptor, wherein the inventory descriptor identifies a set of digital video discs, wherein the set of digital video discs comprises a plurality of types of digital video discs;
   scanning the inventory descriptor;

causing a conveyor belt to convey the set of digital video discs from the plurality of storage compartments to a vending module;
securing the set of digital video discs in the vending module; and
locking the vending module.

11. The method of claim 10, wherein the inventory descriptor corresponds to a delivery route.

12. The method of claim 10, wherein each of the vendible media products are digital video discs.

13. The method of claim 10, wherein the inventory descriptor is at least one of a bar code, an infrared symbol, an ultraviolet symbol and/or a radio frequency tag.

* * * * *